US012429798B2

(12) United States Patent
Wada et al.

(10) Patent No.: US 12,429,798 B2
(45) Date of Patent: Sep. 30, 2025

(54) CARTRIDGE, SUPPLY CONTAINER, AND IMAGE FORMING APPARATUS

(71) Applicant: CANON KABUSHIKI KAISHA, Tokyo (JP)

(72) Inventors: Koji Wada, Kanagawa (JP); Tsuyoshi Ogawa, Tokyo (JP); Hiroshi Takarada, Kanagawa (JP); Masaaki Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/512,899

(22) Filed: Nov. 17, 2023

(65) Prior Publication Data

US 2024/0085823 A1 Mar. 14, 2024

Related U.S. Application Data

(63) Continuation of application No. 17/871,762, filed on Jul. 22, 2022, now Pat. No. 11,846,895, which is a (Continued)

(30) Foreign Application Priority Data

Oct. 11, 2019 (JP) ................................ 2019-188139
Oct. 24, 2019 (JP) ................................ 2019-193591
Oct. 24, 2019 (JP) ................................ 2019-193592

(51) Int. Cl.
*G03G 15/08* (2006.01)
*G03G 15/00* (2006.01)
*G03G 21/18* (2006.01)

(52) U.S. Cl.
CPC ..... *G03G 15/0867* (2013.01); *G03G 15/0856* (2013.01); *G03G 15/5004* (2013.01);
(Continued)

(58) Field of Classification Search
CPC .......... G03G 15/0867; G03G 21/1814; G03G 2215/0872; G03G 15/0856;
(Continued)

(56) References Cited

U.S. PATENT DOCUMENTS 6,266,506 B1 * 7/2001 Kurz .................... G03G 15/087 399/262
8,744,287 B2 * 6/2014 Takahashi ............ G03G 15/556 399/53
2010/0092196 A1 * 4/2010 Mimura ............. G03G 15/0882 399/119

FOREIGN PATENT DOCUMENTS

JP 04338990 A * 11/1992
JP 09258542 A * 10/1997
(Continued)

*Primary Examiner* — Sandra Brase
(74) *Attorney, Agent, or Firm* — Canon U.S.A., Inc. IP Division

(57) ABSTRACT

A cartridge is configured to be attachable to a main body of an image forming apparatus and configured to receive toner supplied from a supply container. The cartridge includes a supply port configured to receive the toner supplied from the supply container, a shutter member configured to cover the supply port, and a locking member. The locking member is moved from a lock position to an unlock position to allow movement of the shutter member by using electric power supplied from the main body.

11 Claims, 64 Drawing Sheets

Related U.S. Application Data continuation of application No. 17/065,150, filed on Oct. 7, 2020, now Pat. No. 11,422,484.

(52) U.S. Cl.
CPC . *G03G 21/1814* (2013.01); *G03G 2215/0869* (2013.01); *G03G 2215/0872* (2013.01)

(58) Field of Classification Search
CPC ........... G03G 21/1832; G03G 15/0865; G03G 15/5004; G03G 2215/0869
See application file for complete search history.

(56) References Cited

FOREIGN PATENT DOCUMENTS

| | | | |
|---|---|---|---|
| JP | 2012108173 | A | 6/2012 |
| KR | 20010020691 | A | 3/2001 |

* cited by examiner

CARTRIDGE, SUPPLY CONTAINER, AND IMAGE FORMING APPARATUS

CROSS-REFERENCE TO RELATED APPLICATIONS

The present application is a continuation of U.S. patent application Ser. No. 17/871,762, filed Jul. 22, 2022 which is a continuation of U.S. patent application Ser. No. 17/065,150, filed on Oct. 7, 2020 and issued as U.S. Pat. No. 11,422,484 on Aug. 23, 2022, which claims priority from Japanese Patent Application No. 2019-188139 filed Oct. 11, 2019, Japanese Patent Application No. 2019-193591, filed Oct. 24, 2019, and Japanese Patent Application No. 2019-193592, filed Oct. 24, 2019, which are hereby incorporated by reference herein in their entirety.

BACKGROUND

Field of the Disclosure

The present disclosure generally relates to a cartridge for use in an image forming apparatus, a supply container for supplying an image forming apparatus with toner, and an image forming apparatus.

Description of the Related Art

Generally, an electrophotographic image forming apparatus develops an electrostatic latent image formed on the surface of a photosensitive member as a toner image by using toner and then forms an image on a recording medium by transferring the toner image from the photosensitive member to the recording medium. A process cartridge system and a sequential supply system are known as methods for supplying an image forming apparatus with toner that is consumed as a result of repetition of image formation. The process cartridge system is a system in which a photosensitive member and a developer container containing toner are combined as a process cartridge and, when a toner residual amount in the developer container is empty, the process cartridge is replaced with a new one.

On the other hand, Japanese Patent Laid-Open No. 8-030084 describes a sequential supply developing apparatus. The sequential supply developing apparatus includes a toner conveyance path for supplying toner to a developing roller and a developer supply case connected to the toner conveyance path. The sequential supply developing apparatus supplies toner from the developer supply case to the toner conveyance path in accordance with a detection result of a toner residual amount.

In recent years, image forming apparatuses are not limited to adopting the above-described process cartridge system, sequential supply system, and the like, and are desired by users for various ways of usage.

SUMMARY

An aspect of the present disclosure provides a cartridge configured to be attachable to a main body of an image forming apparatus and configured to receive toner supplied from a supply container. The cartridge includes: a supply port configured to receive the toner supplied from the supply container; a shutter member configured to be movable between a first position and a second position, the supply port being covered with the shutter member when the shutter member is located at the first position, the supply port being exposed when the shutter member is located at the second position; and a locking member configured to be movable between a lock position and an unlock position. Movement of the shutter member from the first position to the second position is restricted when the locking member is located at the lock position and movement of the shutter member from the first position to the second position is allowed when the locking member is located at the unlock position. The locking member is moved from the lock position to the unlock position by using electric power supplied from the main body.

Another aspect of the present disclosure provides an image forming apparatus including the cartridge of the above-described aspect, the main body including a power supply and a control unit configured to control the power supply. The control unit is configured to control the power supply such that, when an amount of toner contained in the cartridge is less than a first amount, electric power is supplied from the main body to the cartridge.

Further another aspect of the present disclosure provides a supply container attachable to a cartridge. The supply container includes: a frame configured to contain toner, the frame having an ejection port for ejecting toner contained in the frame; a pushing member attached to the frame, the pushing member being configured to be movable in a first direction, relative to the frame, from a first position to a second position, such that toner contained in the frame is ejected through the ejection port when the pushing member is moved in the first direction; and a movement restriction portion including a first part provided in one of the pushing member and the frame and a second part provided in an other one of the pushing member and the frame, the first part and the second part are brought in contact with each other to restrict movement of the pushing member in the first direction when the pushing member is located at an intermediate position between the first position and the second position. In a state where the pushing member is located at the intermediate position, the pushing member is configured to be movable relative to the frame such that the first part and the second part separate from each other.

Another aspect of the present disclosure provides a cartridge configured to be mounted on an image forming apparatus. The cartridge includes: a frame having a toner containing portion used to contain toner, a supply port for detachably mounting a supply container containing toner, a first opening, and a second opening, the supply port communicating with the toner containing portion, the first opening communicating the toner containing portion with an outside of the frame, the second opening communicating the toner containing portion with the outside of the frame; a first filter attached to the frame so as to cover the first opening, the first filter restricting passage of toner and allowing passage of air; and a second filter attached to the frame so as to cover the second opening, the second filter restricting passage of toner and allowing passage of air.

Further another aspect of the present disclosure provides a supply container used to supply toner to a cartridge mounted on an image forming apparatus. The supply container includes: a frame having a toner containing portion used to contain toner, the frame having a bottom portion and an opening portion, the bottom portion having an ejection port used to eject toner contained in the toner containing portion to the outside of the frame; a first movable member in the toner containing portion; a second movable member in the toner containing portion; and a pushing member fitted to the toner containing portion via the opening portion. When the pushing member is pushed toward the ejection port, toner in the toner containing portion is ejected through the ejection port. Each of the first movable member and the second movable member is restricted to exit through the ejection port to the outside of the frame and is freely movable relative to the frame inside the toner containing portion in a first direction, a second direction perpendicular to the first direction, and a third direction perpendicular to the first direction and the second direction.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the attached drawings.

First Embodiment (1) Image Forming Apparatus

Figure 1A:
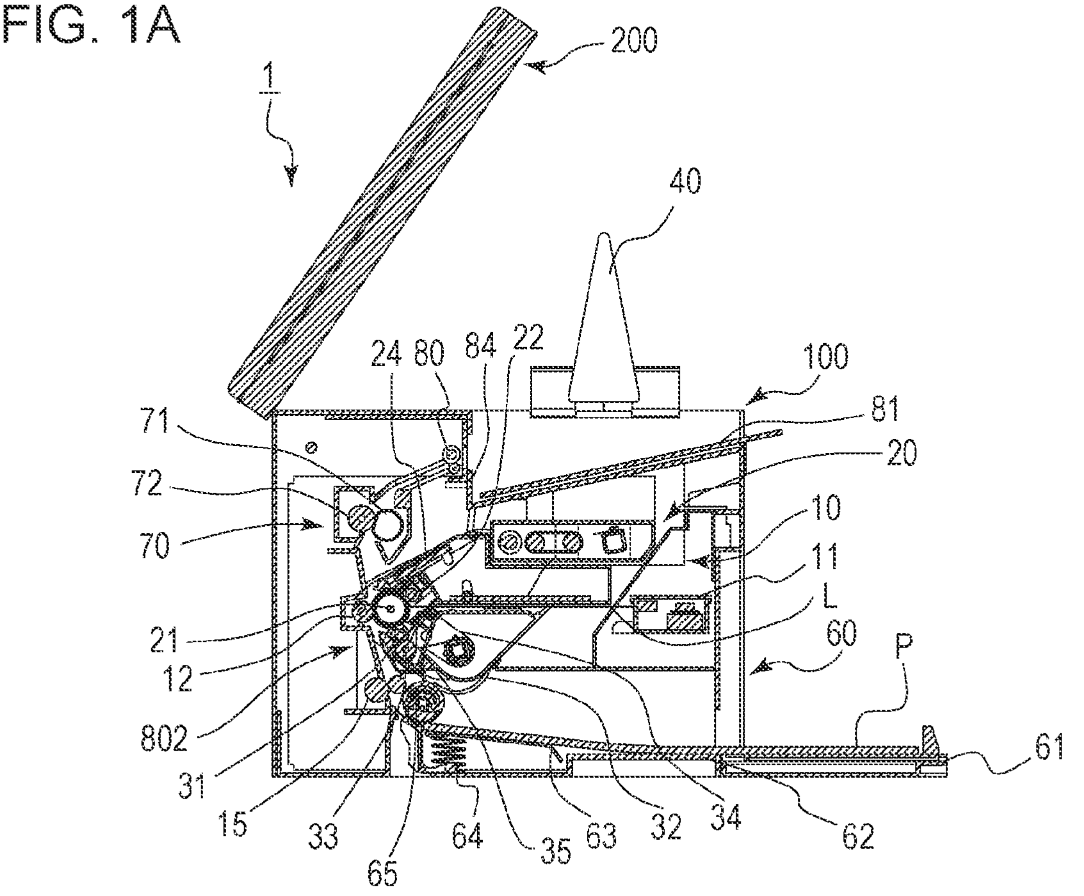
FIG. 1A is a cross-sectional view of an image forming apparatus according to a first embodiment.

FIG. 1A is a schematic diagram showing the configuration of an image forming apparatus 1 according to a first embodiment. The image forming apparatus 1 is a black and white printer that forms an image on a recording medium in accordance with image information input from an external device. Recording media include a variety of different sheet materials, including paper, such as plain paper and thick paper, a plastic film, such as a sheet for an overhead projector, a specially-shaped sheet, such as an envelope and index paper, and cloth.

(1-1) Overall Configuration

Figure 1B:
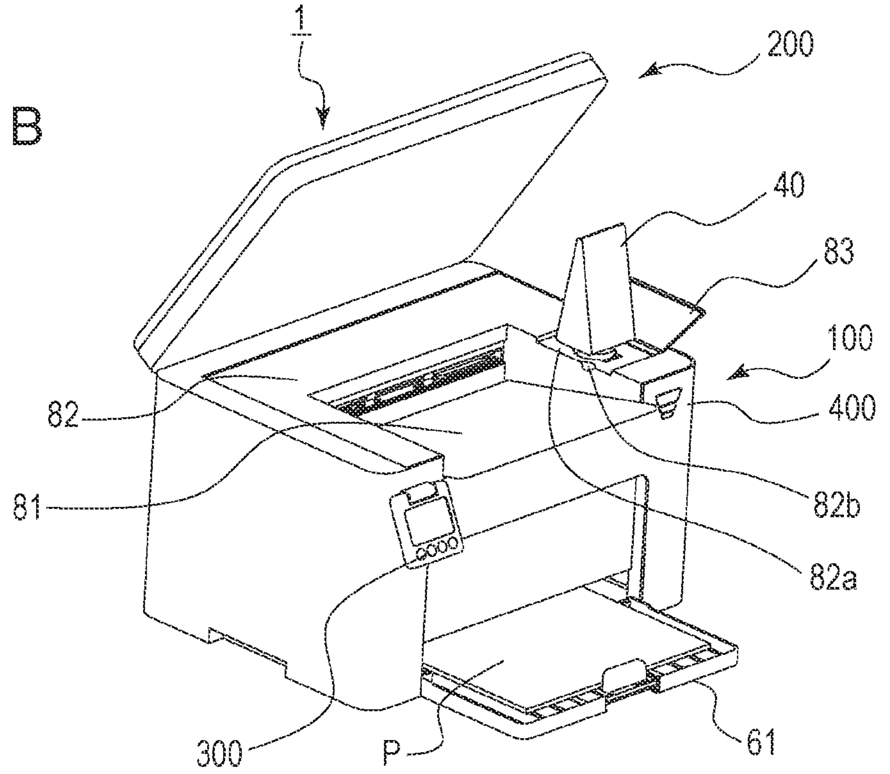
FIG. 1B is a perspective view of the image forming apparatus according to the first embodiment.

As shown in FIG. 1A and FIG. 1B, the image forming apparatus 1 includes a printer main body 100 as a main body of the apparatus, a reading apparatus 200 openably supported by the printer main body 100, and an operating unit 300 attached to the exterior surface of the printer main body 100. The printer main body 100 includes an image forming unit 10, a feed unit 60, a fusing unit 70, and a discharge roller pair 80. The feed unit 60 feeds a recording medium to the image forming unit 10. The image forming unit 10 forms a toner image on a recording medium. The fusing unit 70 fuses the toner image formed by the image forming unit 10 onto the recording medium. The discharge roller pair 80 discharges a recording medium having passed through the fusing unit 70 to the outside of the apparatus. The process cartridge 20 of the present embodiment adopts a direct supply system in which toner is directly supplied from the outside of the image forming apparatus 1 by using a toner pack 40 filled with toner for supply.

The image forming unit 10 is an electrophotographic image forming device including a scanner unit 11, the process cartridge 20, and a transfer roller 12. The process cartridge 20 includes a photosensitive drum 21, a charge roller 22 disposed around the photosensitive drum 21, a developing roller 31, and a cleaning blade 24.

The photosensitive drum 21 as an image carrier in the present embodiment is a photosensitive member formed in a cylindrical shape. The photosensitive drum 21 of the present embodiment has a photosensitive layer made of a negatively-charged organic photosensitive member on a drum-shaped substrate molded by using aluminum. The photosensitive drum 21 is driven to rotate at a predetermined process speed in a predetermined direction (clockwise direction in the drawing) by a motor.

The charge roller 22 contacts with the photosensitive drum 21 at a predetermined pressure contact force and forms a charging portion. The surface of the photosensitive drum 21 is uniformly charged at a predetermined potential by being applied with a desired charging voltage from a charging high voltage power supply. In the present embodiment, the photosensitive drum 21 is charged with negative polarity by the charge roller 22.

The scanner unit 11 performs scanning exposure of the surface of the photosensitive drum 21 by irradiating laser light L corresponding to image information input from the external device or the reading apparatus 200 to the photosensitive drum 21 with a polygon mirror. Through the exposure, an electrostatic latent image based on the image information is formed on the surface of the photosensitive drum 21. The scanner unit 11 is not limited to a laser scanner apparatus. For example, an LED exposure apparatus including an LED array in which a plurality of LEDs is arranged along a longitudinal direction of the photosensitive drum 21 may be adopted as the scanner unit 11.

A developing unit 802 includes the developing roller 31 as a developer carrier that carries a developer, a developer container 32 that is a frame of the developing unit 802, and a supply roller 33 capable of supplying a developer to the developing roller 31. The developing roller 31 and the supply roller 33 are rotatably supported by the developer container 32. The developing roller 31 is disposed at an opening portion of the developer container 32 so as to face the photosensitive drum 21. The supply roller 33 is in contact with the developing roller 31 so as to be rotatable, and toner as a developer contained in the developer container 32 is applied to the surface of the developing roller 31 by the supply roller 33.

The developing unit 802 of the present embodiment uses a contact developing system as a developing system. In other words, a toner layer on the developing roller 31 as a developing device contacts with the photosensitive drum 21 in a developing unit (developing region) in which the photosensitive drum 21 and the developing roller 31 face each other. A developing voltage is applied to the developing roller 31 by a developing high-voltage power supply. Under the developing voltage, toner on the developing roller 31 is transferred from the developing roller 31 to the drum surface in accordance with a potential distribution on the surface of the photosensitive drum 21. Thus, an electrostatic latent image is developed into a toner image. In the present embodiment, a reversal developing system is adopted. In other words, within the surface of the photosensitive drum 21 charged in a charging process, toner adheres to a region in which the amount of electric charge is attenuated as a result of exposure in an exposure process, with the result that a toner image is formed.

In the present embodiment, toner having a particle size of 6 μm and having a negative polarity as a normal charge polarity is used. Polymerized toner produced by polymerization is adopted as an example of the toner of the present embodiment. The toner of the present embodiment is a so-called non-magnetic single-component developer that does not contain a magnetic component and, therefore, the toner is carried on the developing roller 31 mainly by intermolecular force or electrostatic force (image force). Alternatively, a single-component developer that contains a magnetic component may be used. A single-component developer may contain an additive (for example, wax or silica microparticles) for adjusting the flowability and chargeability of toner in addition to toner particles. A two-component developer composed of non-magnetic toner and a magnetic carrier may be used as a developer. When a magnetic developer is used, for example, a cylindrical developing sleeve in which a magnet is disposed is used as a developer carrier. In other words, a developer contained in the developer container 32 is not limited to a single-component developer composed of a toner component and may be a two-component developer composed of toner and a carrier.

An agitating member 34 as an agitator may be provided inside the developer container 32. When the agitating member 34 is driven to rotate, the agitating member 34 agitates toner in the developer container 32 and feeds toner toward the developing roller 31 and the supply roller 33. The agitating member 34 plays a role in equalizing toner in the developer container 32 by circulating toner, not used for developing and stripped from the developing roller 31, in the developer container 32.

A developing blade 35 is disposed at the opening portion of the developer container 32 in which the developing roller 31 is disposed. The developing blade 35 restricts the amount of toner on the developing roller 31. Toner supplied to the surface of the developing roller 31 is made uniform into a thin layer by passing a portion facing the developing blade 35 with rotation of the developing roller 31, and is negatively charged through triboelectric charging.

The feed unit 60 includes a front door 61 openably supported by the printer main body 100, a stack tray 62, an intermediate plate 63, a tray spring 64, and a pick-up roller 65. The stack tray 62 makes up a bottom surface of a recording medium accommodation space that appears when the front door 61 is open. The intermediate plate 63 is supported by the stack tray 62 so as to be movable up and down. The tray spring 64 urges the intermediate plate 63 upward to press recording media P stacked on the intermediate plate 63 against the pick-up roller 65. The front door 61 closes the recording medium accommodation space in a state where the front door 61 is closed with respect to the printer main body 100, and supports the recording media P in cooperation with the stack tray 62 and the intermediate plate 63 in a state where the front door 61 is open with respect to the printer main body 100.

The transfer roller 12 as a transfer device transfers a toner image formed on the photosensitive drum 21 of the process cartridge 20 onto a recording medium. The present embodiment describes a direct transfer system in which a toner image formed on an image carrier is directly transferred from the image carrier onto a recording medium. Alternatively, an intermediate transfer system in which a toner image is transferred from an image carrier onto a recording medium via an intermediate transfer member, such as an intermediate transfer belt, may be adopted. In this case, for example, a transfer unit made up of an intermediate transfer belt, a primary transfer roller that primarily transfers a toner image from a photosensitive drum onto the intermediate transfer belt, and a secondary transfer roller that transfers the toner image from the intermediate transfer belt onto a recording medium functions as a transfer device.

The fusing unit 70 is of a heat fusing type and performs image fusing process by heating toner on a recording medium to melt. The fusing unit 70 includes a fusing film 71, a fusing heater, such as a ceramic heater, that heats the fusing film 71, a thermistor that measures the temperature of the fusing heater, and a pressure roller 72 that is in pressure contact with the fusing film 71.

Next, the image forming operation of the image forming apparatus 1 will be described. When an image formation command is input to the image forming apparatus 1, an image forming process is started by the image forming unit 10 in accordance with image information input from the reading apparatus 200 or an external computer connected to the image forming apparatus 1. The scanner unit 11 irradiates laser light L toward the photosensitive drum 21 in accordance with the input image information. At this time, the photosensitive drum 21 is preliminary charged by the charge roller 22, and an electrostatic latent image is formed on the photosensitive drum 21 when laser light L is irradiated to the photosensitive drum 21. After that, the electrostatic latent image is developed by the developing roller 31, and a toner image is formed on the photosensitive drum 21.

In parallel with the above-described image forming process, the pick-up roller 65 of the feed unit 60 feeds a recording medium P supported on the front door 61, the stack tray 62, and the intermediate plate 63. The recording medium P is fed to a registration roller pair 15 by the pick-up roller 65, and a skew of the recording medium P is corrected when the recording medium P abuts against a nip of the registration roller pair 15. The registration roller pair 15 is driven in synchronization with transfer timing of the toner image, obtained from exposure starting time of the scanner unit 11, and conveys the recording medium P toward a transfer portion that is a nip portion formed by the transfer roller 12 and the photosensitive drum 21.

A transfer voltage is applied from a transfer voltage power supply to the transfer roller 12, and the toner image on the photosensitive drum 21 is transferred onto the recording medium P conveyed by the registration roller pair 15. Residual toner on the surface of the photosensitive drum 21 after transfer is removed by a cleaning blade 24 that is an elastic blade in contact with the photosensitive drum 21. The recording medium P onto which the toner image has been transferred is conveyed to the fusing unit 70, and the toner image is heated and pressurized at the time of passage of a nip portion between the fusing film 71 and pressure roller 72 of the fusing unit 70. Thus, toner particles melt and then fix, with the result that the toner image is fused onto the recording medium P. The recording medium P having passed through the fusing unit 70 is discharged to the outside of the image forming apparatus 1 by the discharge roller pair 80, and is stacked on a discharge tray 81 formed at the top part of the printer main body 100.

The discharge tray 81 is inclined upward toward a downstream side in a discharge direction of a recording medium. A recording medium discharged onto the discharge tray 81 slides down on the discharge tray 81, and a trailing edge is aligned by a restriction surface 84.

(1-2) Openable Portions of Image Forming Apparatus

Figure 2A:
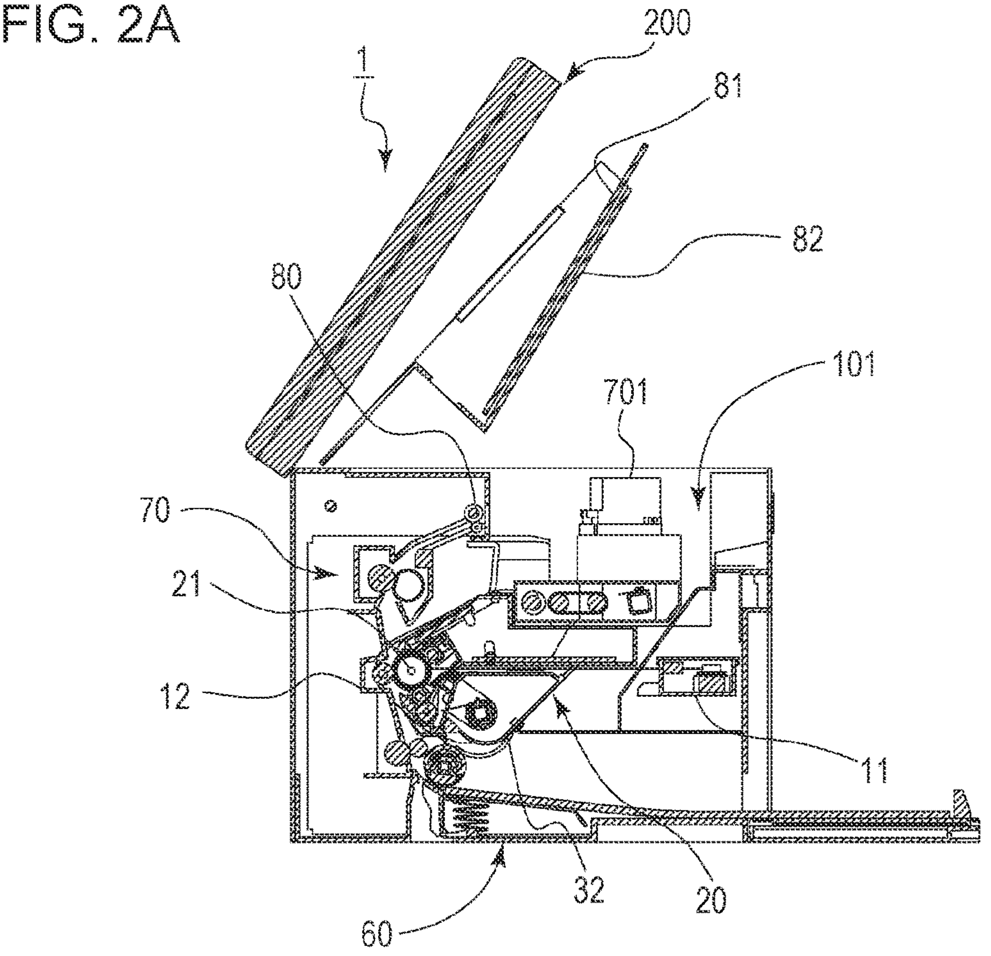
FIG. 2A is a cross-sectional view of the image forming apparatus according to the first embodiment.
Figure 2B:
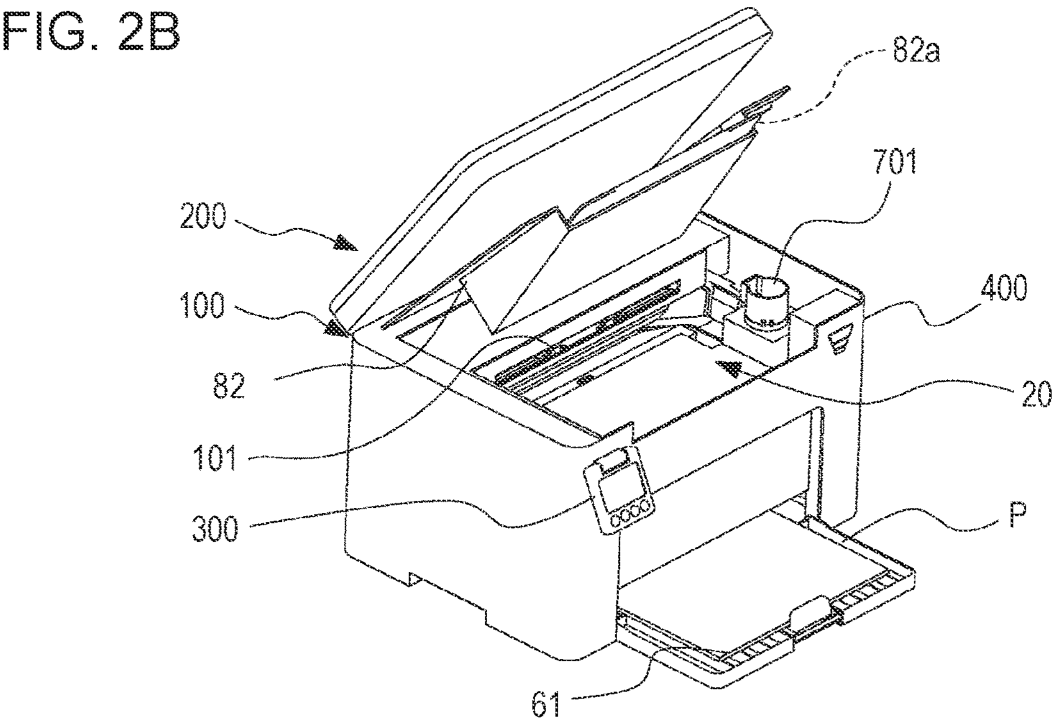
FIG. 2B is a perspective view of the image forming apparatus according to the first embodiment.
Figure 3:
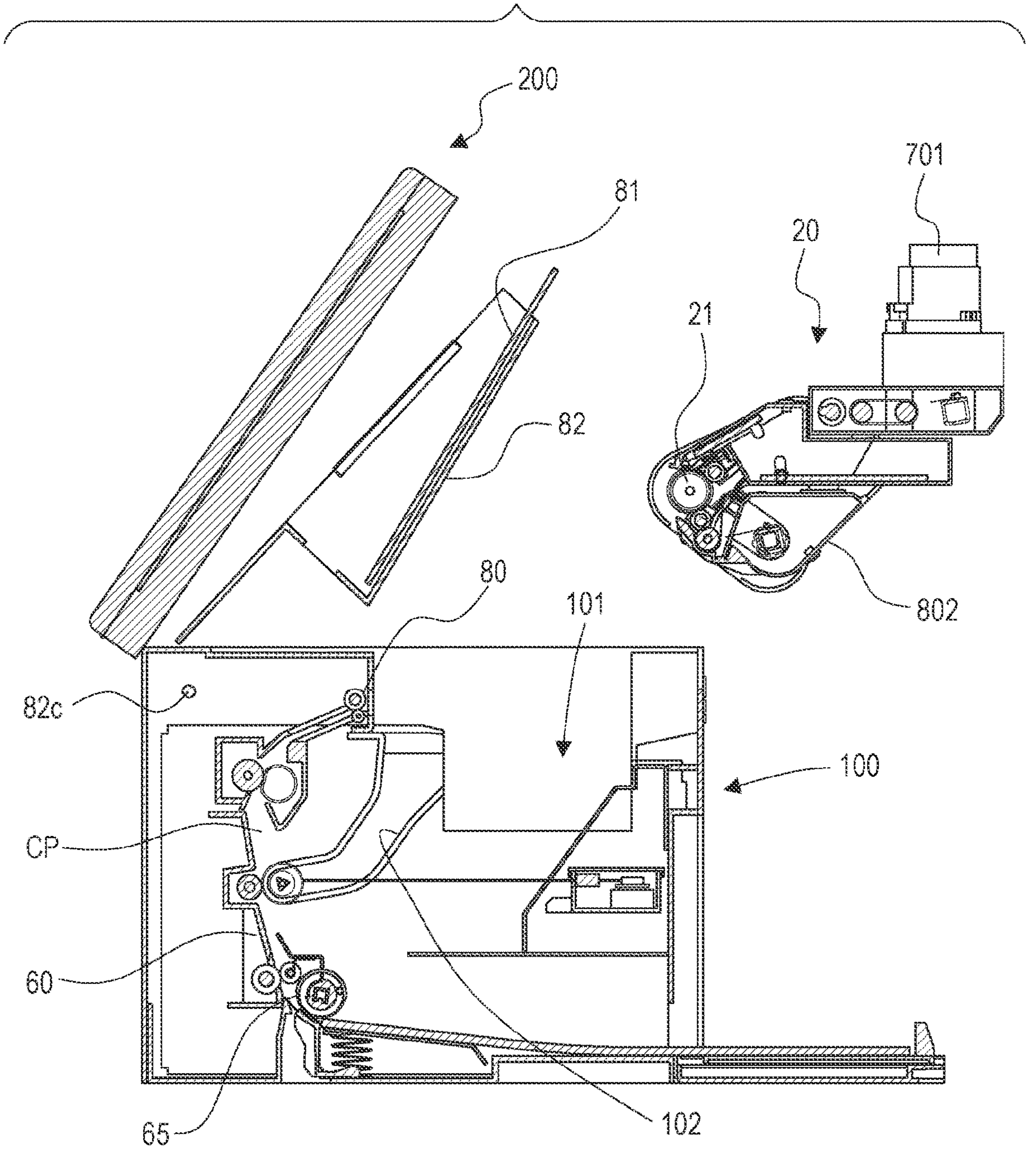
FIG. 3 is a view for illustrating how to attach and detach a process cartridge according to the first embodiment.

As shown in FIG. 2A, FIG. 2B, and FIG. 3, a first opening portion 101 that is open upward is provided at the top part of the printer main body 100. The first opening portion 101 is covered with a top cover 82 in use (FIG. 1B), and the process cartridge 20 is exposed when the top cover 82 is opened upward (FIG. 2B). The top cover 82 is supported so as to be openable with respect to the printer main body 100 about a pivot shaft 82*c* (FIG. 3) extending in a right-and-left direction, and the discharge tray 81 is provided on the top surface. The top cover 82 is opened from a near side toward a far side in a state where the reading apparatus 200 is open with respect to the printer main body 100. The reading apparatus 200 and the top cover 82 each may be configured to be held in an open state and a closed state by a holding mechanism of a hinge mechanism or the like.

Figure 5A:
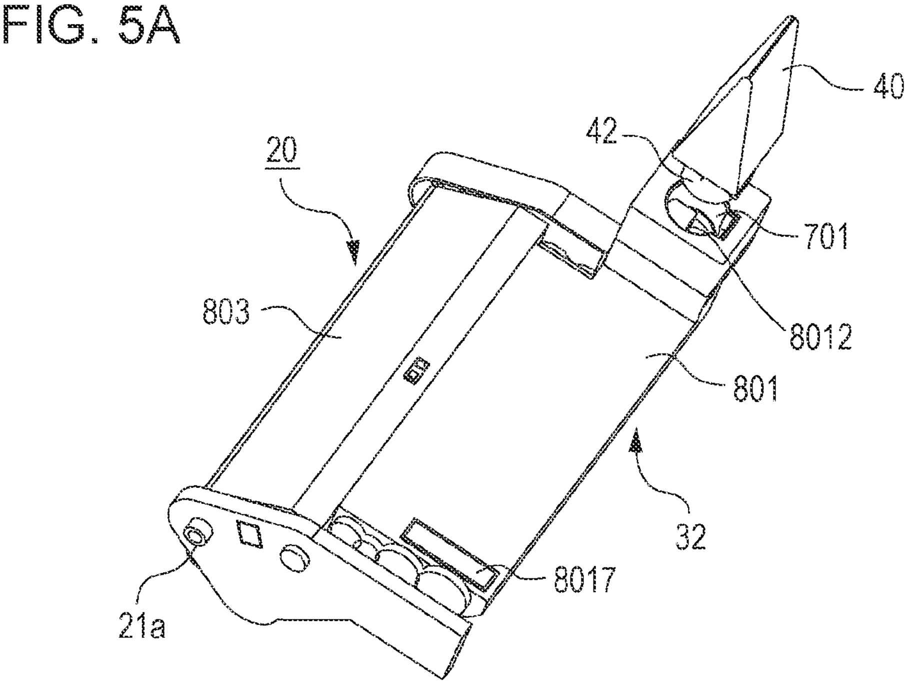
FIG. 5A and FIG. 5B are views for illustrating toner supply using a toner pack according to the first embodiment.

When, for example, a recording medium is jammed (paper jam) in a conveyance path CP through which the recording medium fed by the pick-up roller 65 passes, a user opens the top cover 82 together with the reading apparatus 200. Then, the user accesses the process cartridge 20 through the first opening portion 101 exposed by opening the top cover 82 and pulls out the process cartridge 20 along a cartridge guide 102. A protruded portion 21*a* is provided at an end portion of the process cartridge 20 in an axial direction of the photosensitive drum 21 (FIG. 5A). The cartridge guide 102 guides the process cartridge 20 by causing the protruded portion 21*a* (FIG. 5A) to slide.

When the process cartridge 20 is pulled out to the outside through the first opening portion 101, space allowing hands to enter the conveyance path CP is provided. When the user puts his or her hands into the printer main body 100 through the first opening portion 101 and accesses the recording medium jammed in the conveyance path CP, the user is able to remove the jammed recording medium.

Figure 4A:
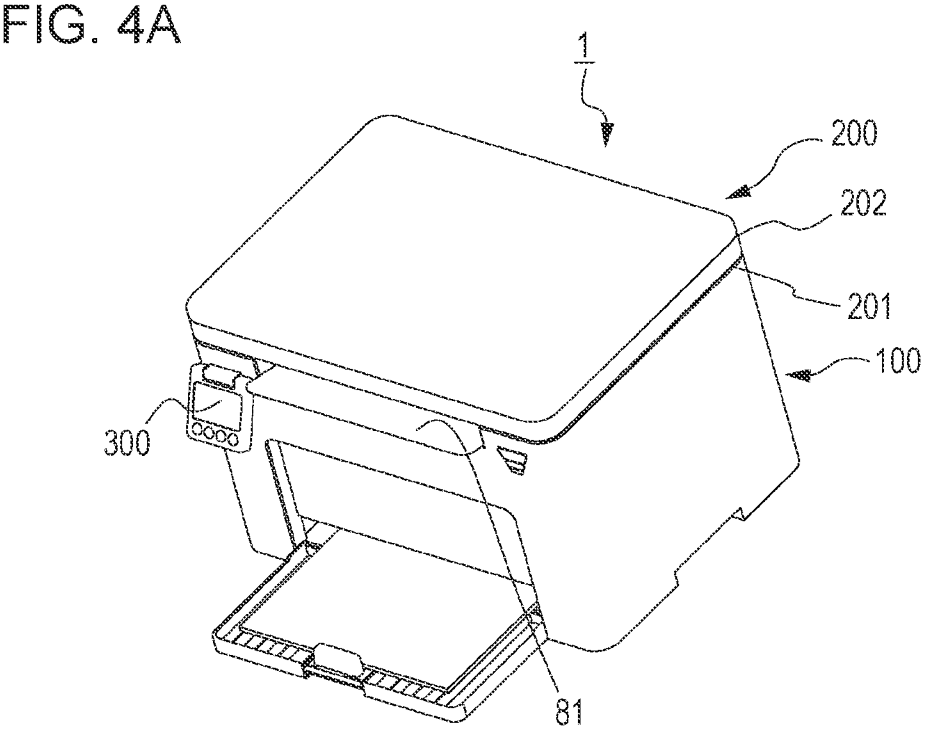
FIG. 4A to FIG. 4C are views for illustrating openable members of the image forming apparatus according to the first embodiment.
Figure 4B:
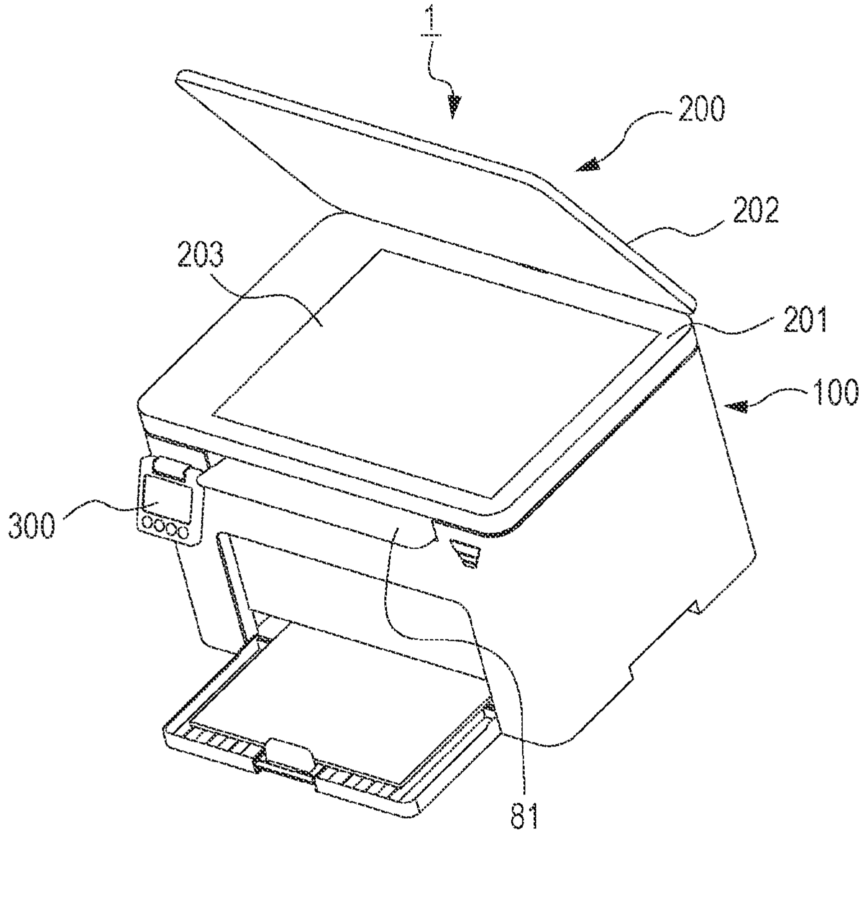
Figure 4C:
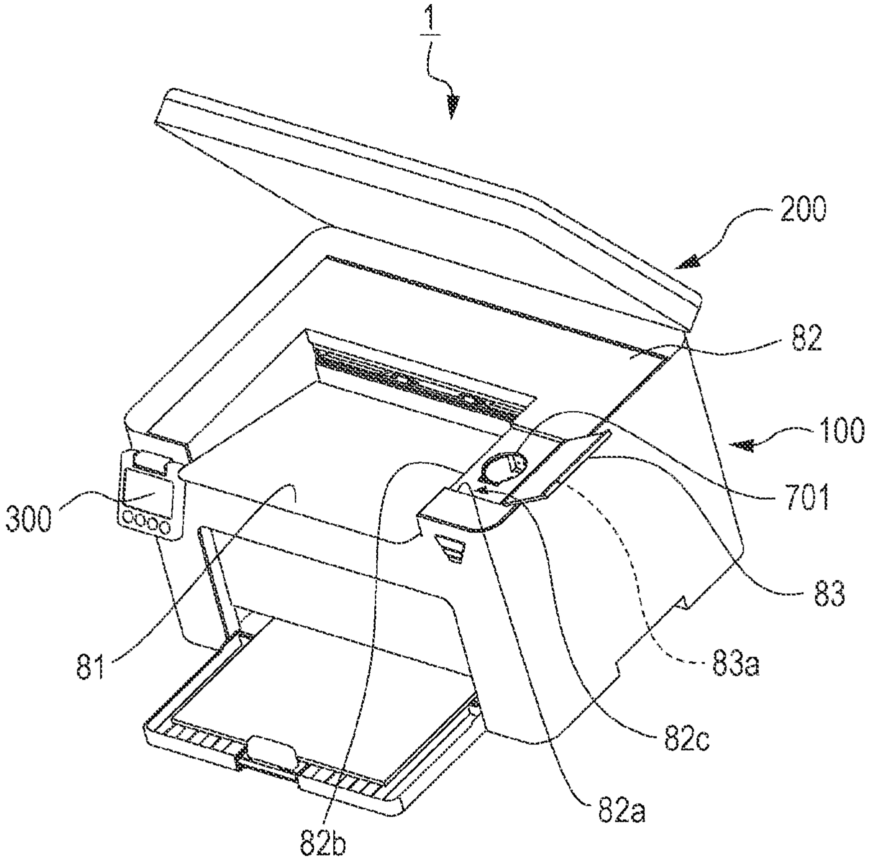

In the present embodiment, as shown in FIG. 1B and FIG. 4C, an opening/closing member 83 is openably provided on the top cover 82. The top surface of the top cover 82 on which the discharge tray 81 is provided has an opening portion 82*a* that is open upward. The opening portion 82*a* is covered when the opening/closing member 83 is closed. The opening/closing member 83 and the opening portion 82*a* are provided at the right side of the top cover 82. The opening/closing member 83 is supported by the top cover 82 so as to be openable about a pivot shaft 83*a* extending in a front-and-rear direction, and is opened to the right by hooking the finger from a groove portion 82*b* provided on the top cover 82. The opening/closing member 83 is formed in a substantially L-shape along the shape of the top cover 82. The opening/closing member 83 is not limited to the above-described opening/closing mechanism. For example, the opening/closing member 83 may be disposed on the top cover 82 so as to cover a supply container mounting portion 701 and may be configured to open and close the opening portion 82*a* by rotating the opening/closing member 83 so as to slide on the top surface of the top cover 82 about a pivot shaft perpendicular to the top cover 82. Sliding on the top surface of the top cover 82 means that movement of the opening/closing member 83 in the axial direction of rotation is restricted.

The opening portion 82*a* is open such that the supply container mounting portion 701 for supplying toner, provided at the top part of the process cartridge 20, is exposed. When the opening/closing member 83 is open, a user is able to access the supply container mounting portion 701 without opening the top cover 82. The user is able to supply toner to the process cartridge 20 by mounting the toner pack 40 on the supply container mounting portion 701.

In the present embodiment, a system (direct supply system) in which a user supplies toner from the toner pack 40 (FIG. 1A and FIG. 1B) filled with toner for supply to the process cartridge 20 while the process cartridge 20 remains mounted on the image forming apparatus 1 is adopted. For this reason, when a toner residual amount in the process cartridge 20 is small, work for removing the process cartridge 20 from the printer main body 100 and replacing the process cartridge 20 with a new process cartridge is not required, so usability improves. The image forming apparatus 1 and the toner pack 40 make up an image forming system.

In the present embodiment, the reading apparatus 200 is provided at the top part of the image forming apparatus 1, and, when the opening/closing member 83 is opened, the reading apparatus 200 is initially opened to expose the top cover 82. However, the reading apparatus 200 may be omitted, and the opening/closing member 83 may be configured to be exposed at the top part of the image forming apparatus 1 from the beginning.

(1-3) Reading Apparatus

As shown in FIG. 4A and FIG. 4B, the reading apparatus 200 includes a reading unit 201 that incorporates a reading portion (not shown) inside, and a pressure plate 202 openably supported by the reading unit 201. A platen glass 203 is provided at the top surface of the reading unit 201. The platen glass 203 transmits light emitted from the reading portion. A document is placed on the platen glass 203.

In the case of reading an image of a document by the reading apparatus 200, the user places the document on the platen glass 203 in a state where the pressure plate 202 is open. Then, the pressure plate 202 is closed to prevent a position deviation of the document on the platen glass 203 and a reading command is output to the image forming apparatus 1 by, for example, operating the operating unit 300. When a reading operation is started, the reading portion in the reading unit 201 reciprocates in a sub-scanning direction, that is, the right-and-left direction in a state of facing the operation portion 300 of the image forming apparatus 1 on the front side. The reading portion reads an image of a document by receiving light reflected from the document with a light receiving portion while emitting light from a light emitting portion toward the document and performing photoelectric conversion.

Hereinafter, the front-and-rear direction, the right-and-left direction, and an up-and-down direction (gravitational direction) in the image forming apparatus 1 are defined on the basis of a state of facing the operation portion 300 on the front side as a standard. Starting with the process cartridge 20, a positional relationship among members detachable from the printer main body 100 will be described with reference to a state of being mounted on the printer main body 100. A longitudinal direction of the process cartridge 20 indicates the axial direction of the photosensitive drum 21.

(1-4) Configuration of Process Cartridge

Figure 5B:
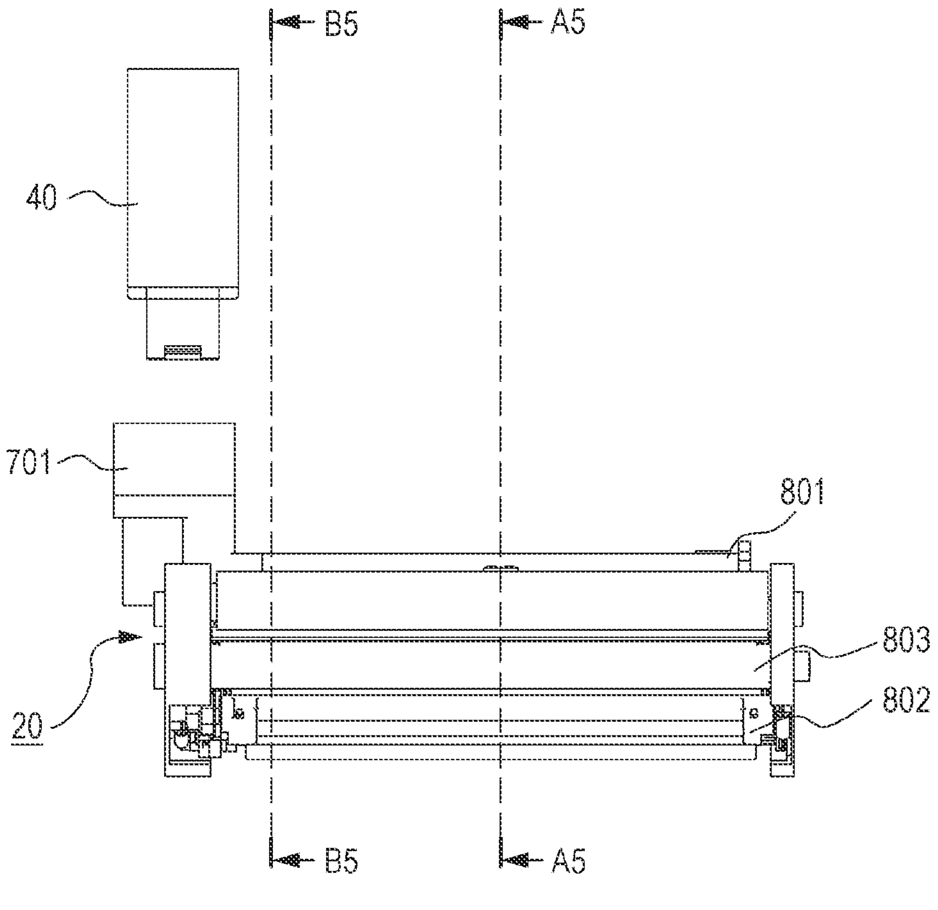
Figure 6A:
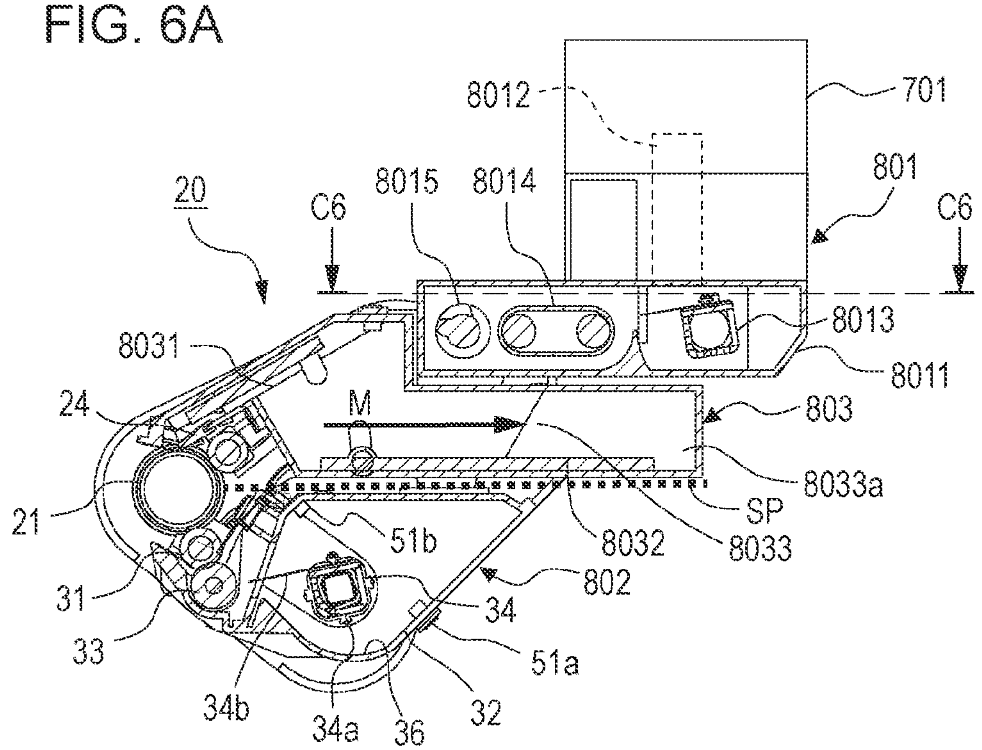
FIG. 6A to FIG. 6C are views for illustrating toner supply using the toner pack according to the first embodiment.
Figure 6B:
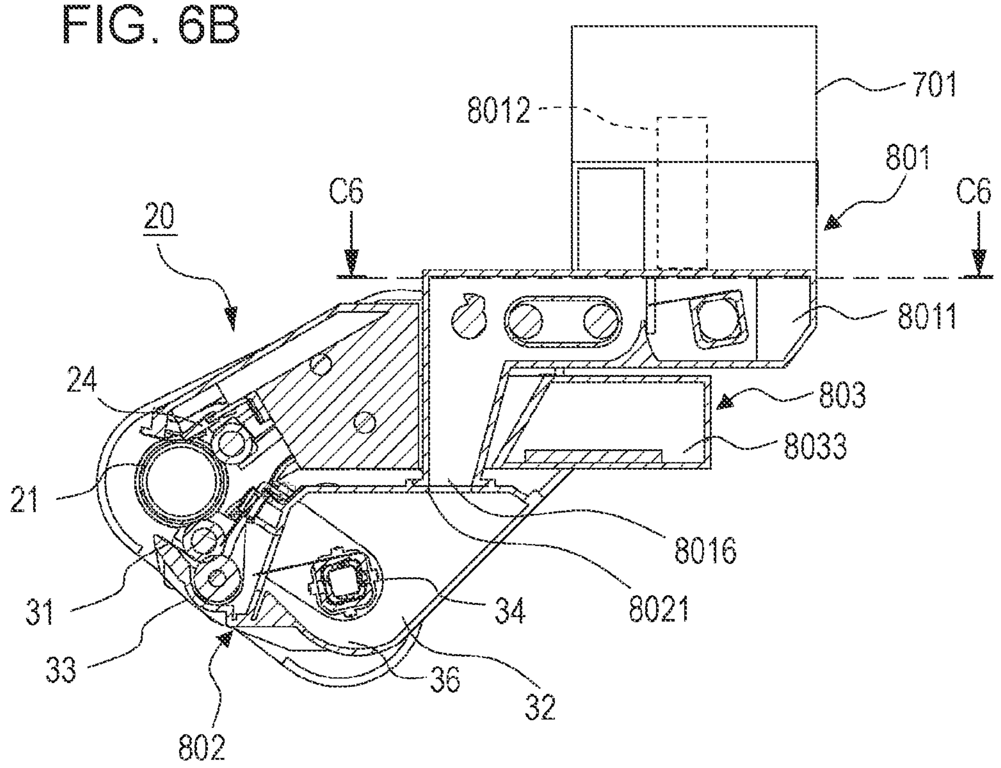
Figure 6C:
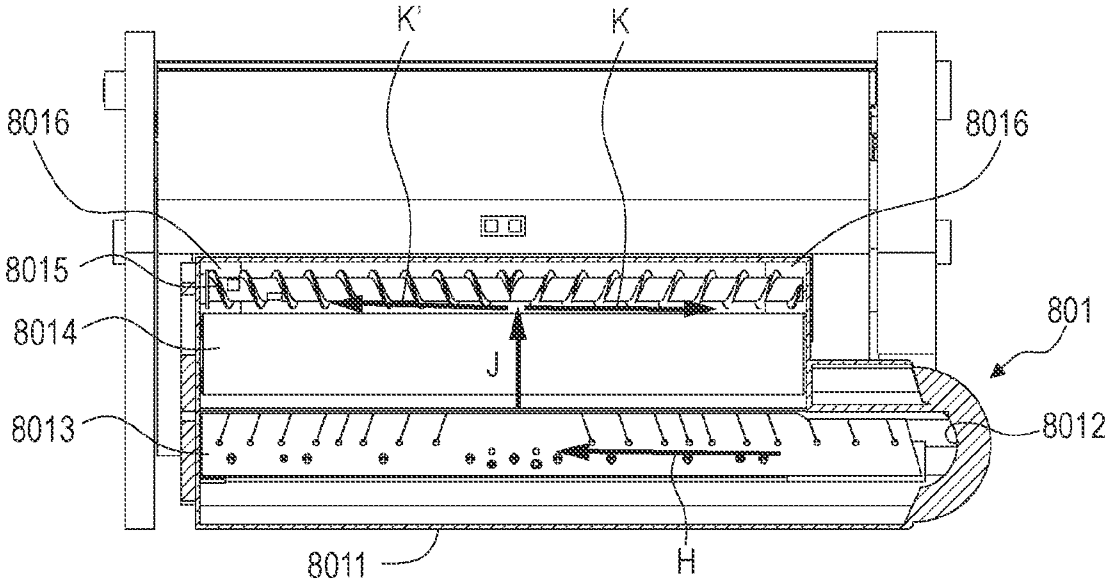

Next, the configuration of the process cartridge 20 will be described. FIG. 5A is a perspective view showing the process cartridge 20 and the toner pack 40. FIG. 5B is a side view showing the process cartridge 20 and the toner pack 40. FIG. 6A is a cross-sectional view taken along the line A5-A5 in FIG. 5B. FIG. 6B is a cross-sectional view taken along the line B5-B5 in FIG. 5B. FIG. 6C is a cross-sectional view taken along the line C6-C6 in FIG. 6A and FIG. 6B. In FIG. 5A to FIG. 6C, the outer shape of the supply container mounting portion 701 is simplified (see, for example, FIG. 9A for the detailed shape).

As shown in FIG. 5A to FIG. 6C, the process cartridge 20 is made up of a toner receiving unit 801, the developing unit 802, and a cleaning unit 803. The toner receiving unit 801, the cleaning unit 803, and the developing unit 802 are arranged in this order from the upper side to the lower side in the gravitational direction. Hereinafter, the units will be sequentially described.

The toner receiving unit 801 is disposed at the top part of the process cartridge 20. A toner containing portion 8011 made up of a frame for containing toner is provided inside the toner receiving unit 801, and the supply container mounting portion 701 to be coupled to the toner pack 40 is provided at an end portion in the longitudinal direction. The frame that makes up the toner containing portion 8011 may be made up of a single member or may be made up of a combination of a plurality of members. The supply container mounting portion 701 has a supply port 8012 used to receive toner ejected from the toner pack 40. The detailed configuration of the supply container mounting portion 701 and mounting of the toner pack 40 on the supply container mounting portion 701 will be described later.

A first conveyance member 8013, a second conveyance member 8014, and a third conveyance member 8015 are further provided inside the toner receiving unit 801. The first conveyance member 8013 conveys toner having fallen to the end portion of the toner containing portion 8011 in the longitudinal direction via the supply port 8012 in the direction of the arrow H (FIG. 6C) toward the center of the toner containing portion 8011. The second conveyance member 8014 conveys toner conveyed by the first conveyance member 8013 to above the developing unit 802, that is, ejection ports 8016, in the direction of the arrow J (FIG. 6C) perpendicular to the longitudinal direction. The third conveyance member 8015 receives toner mainly at the center in the longitudinal direction from the second conveyance member 8014 and conveys the toner to one side and the other side (in the direction of the arrow K and the direction of the arrow K') in the longitudinal direction. The first to third conveyance members 8013 to 8015 operate to move toner, so the first to third conveyance members 8013 to 8015 may be referred to as first to third developer movement members.

Figure 37:
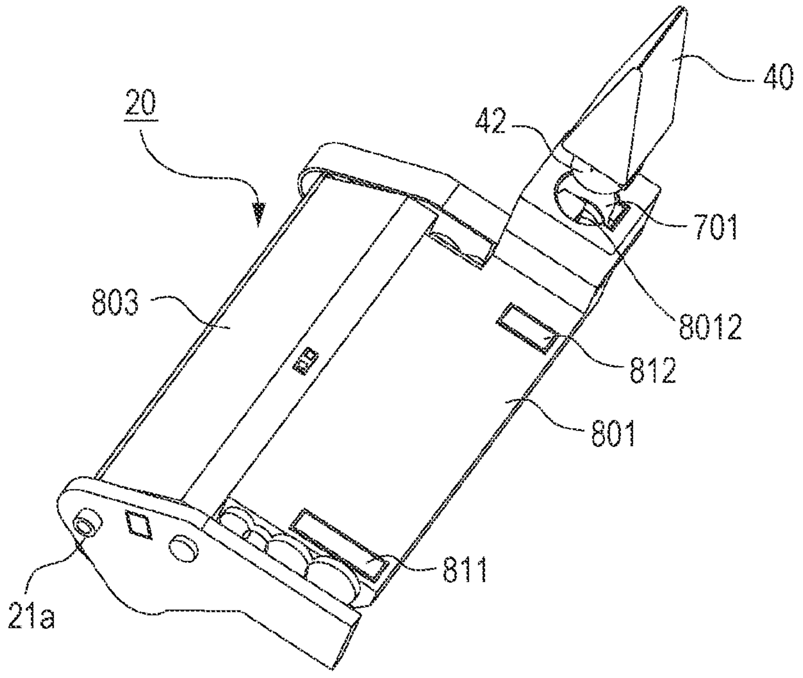
FIG. 37 is a view for illustrating toner supply using a toner pack according to an eighth embodiment.

When toner from the toner pack 40 as a supply container flows into the toner receiving unit 801, air also flows in at the same time. The toner receiving unit 801 has an air filter 8017 (see FIG. 5A) for allowing air to flow in the direction of the arrow H during toner supply so that toner is easily supplied during toner supply. The air filter 8017 prevents a jet of toner through the supply port 8012 as a result of flow of part of air in a direction opposite to the direction of the arrow H due to an increase in the internal pressure of the toner receiving unit 801 during toner supply. The number of ventilation portions (air filters 8017) shown in FIG. 5A may be changed. For example, a first ventilation portion 811 and a second ventilation portion 812 (see FIG. 37) for allowing air to flow in the direction of the arrow H during toner supply may be provided as shown in FIG. 37. The details of the first ventilation portion 811 and the second ventilation portion 812 will be described later.

The ejection ports 8016 (FIG. 6B) for ejecting toner from the toner containing portion 8011 to the developer container 32 of the developing unit 802 are respectively provided at both end portions of the toner receiving unit 801 in the longitudinal direction. Toner having reached the ejection ports 8016 by the third conveyance member 8015 falls to the developer container 32 by gravity. A conveyance member may be further provided in the middle of the path of each of the ejection ports 8016 to hold movement of toner by gravity.

The developing unit 802 located at the bottom part of the process cartridge 20 has an opening 8021 (FIG. 6B) for receiving toner ejected through each ejection port 8016. A seal member (not shown) is provided between each ejection port 8016 and a corresponding one of the openings 8021, and a gap between the ejection port 8016 and the opening 8021 is sealed so that no toner leaks through the gap.

Toner having fallen from the toner pack 40 to the toner receiving unit 801 via the supply port 8012 is conveyed inside the toner receiving unit 801 by the first conveyance member 8013, the second conveyance member 8014, and the third conveyance member 8015. Then, the toner is transferred from the toner receiving unit 801 to the developing unit 802 via the ejection ports 8016 and the openings 8021 at both end portions in the longitudinal direction. In this way, toner supplied via the supply port 8012 located at the end portion of the process cartridge 20 in the longitudinal direction and located away from the developer container 32 in a horizontal direction when viewed in the longitudinal direction is transferred inside the cartridge to reach the developer container 32.

In this way, the toner containing portion 8011 of the toner receiving unit 801 and the developer container 32 of the developing unit 802 communicate with each other to make up a container that defines a space for containing toner in the process cartridge 20. Therefore, in the present embodiment, the supply port 8012 for supplying toner from an outside is provided as part of the container of the process cartridge 20. A supply port to be directly coupled to the supply container may be provided in the printer main body 100, and the process cartridge 20 may be configured to receive toner via the supply port. In this case, part of the process cartridge 20, other than the supply port, is detachable from the image forming apparatus 1 as shown in FIG. 3.

Toner supplied to the developing unit 802 via the openings 8021 is contained in a conveyance chamber 36 formed inside the developer container 32 made up of the frame of the developing unit 802 (see FIG. 6A and FIG. 6B). The frame that makes up the developer container 32 may be made up of a single member or may be made up of a combination of a plurality of members. Here, the agitating member 34 is provided in the conveyance chamber 36. The agitating member 34 includes a shaft member 34*a* provided near the rotational center of the agitating member 34, and a blade portion 34*b* radially extending from the shaft member 34*a*. In cross section, toner within the rotational path of the distal end of the blade portion 34*b* is pushed to move with movement of the blade portion 34*b*. Toner supplied via the openings 8021 is conveyed toward the developing roller 31, the supply roller 33, and the developing blade 35 while being agitated by the agitating member 34.

The cleaning unit 803 includes a fourth conveyance member 8031, a fifth conveyance member 8032, and a waste toner chamber 8033 defined by the frame (FIG. 6A and FIG. 6B). The frame that makes up the waste toner chamber 8033 may be made up of a single member or may be made up of a combination of a plurality of members. The waste toner chamber 8033 is a space for containing collected substance such as residual toner (so-called waste toner) collected from the photosensitive drum 21 by the cleaning blade 24, and is independent of the internal spaces of the toner receiving unit 801 and the developing unit 802. Waste toner collected by the cleaning blade 24 is conveyed in the direction of the arrow M by the fourth conveyance member 8031 and the fifth conveyance member 8032 and is gradually deposited from a far portion 8033*a* to the near side of the waste toner chamber 8033.

Here, a laser passage space SP (FIG. 6A) as an air gap through which laser light L emitted from the scanner unit 11 (FIG. 1A) toward the photosensitive drum 21 is able to pass is formed between the cleaning unit 803 and the developing unit 802. As described above, the ejection ports 8016 and the openings 8021 for transferring toner from the toner receiving unit 801 to the developing unit 802 are respectively provided at the end portions of each unit in the longitudinal direction. Therefore, with a compact configuration of the process cartridge 20 as a whole, it is possible to convey toner supplied from the outside of the image forming apparatus 1 (particularly, via the supply port 8012 that is open at the top surface of the apparatus) to the developer container 32 below the cartridge while ensuring the laser passage space SP.

(1-5) Configuration of Toner Pack

Figure 7A:
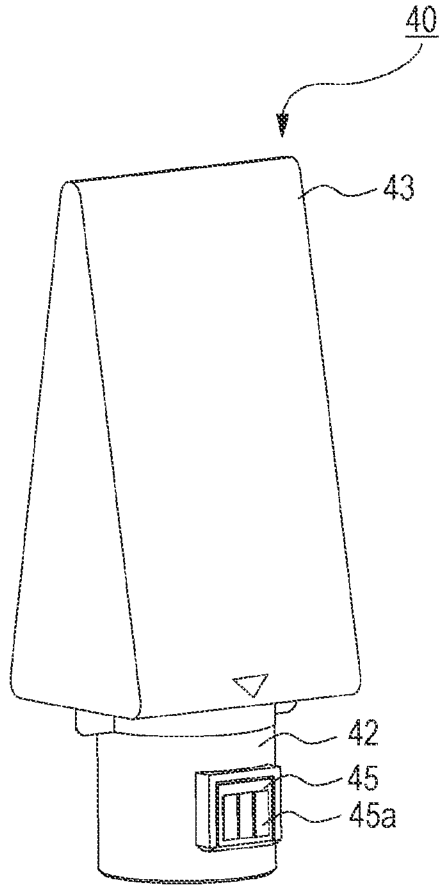
FIG. 7A is a perspective view of the toner pack according to the first embodiment.
Figure 7B:
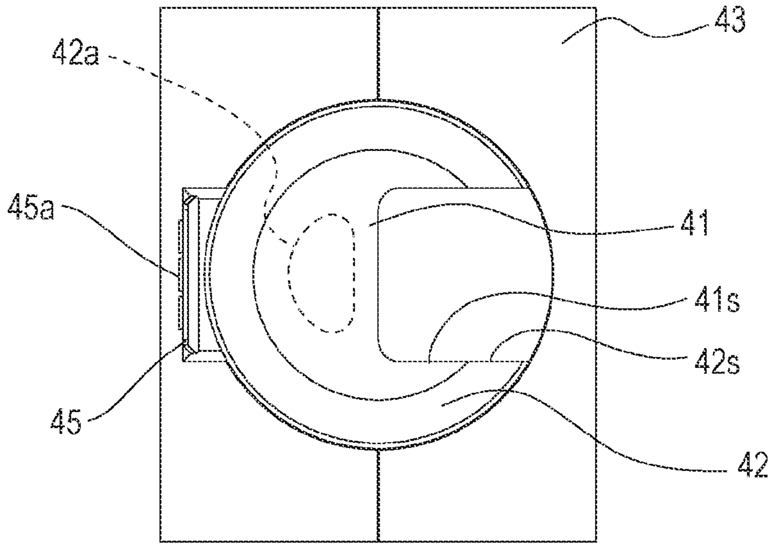
FIG. 7B is a bottom view of the toner pack according to the first embodiment.
Figure 8A:
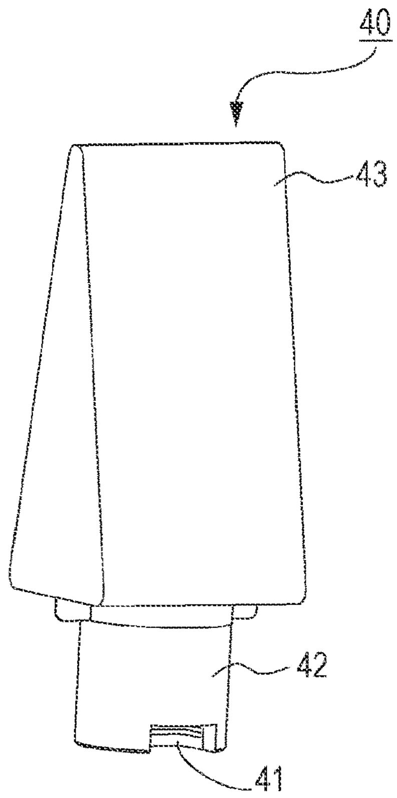
FIG. 8A is a perspective view of the toner pack according to the first embodiment.
Figure 8B:
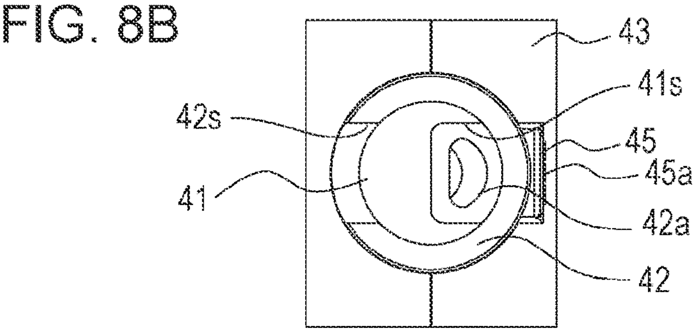
FIG. 8B is a side view of the toner pack according to the first embodiment.
Figure 8C:
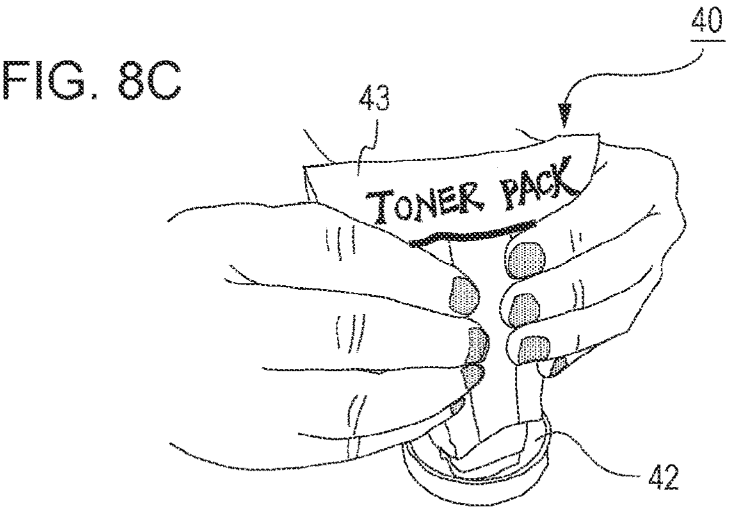
FIG. 8C is a view showing a scene where toner is ejected.
Figure 12:
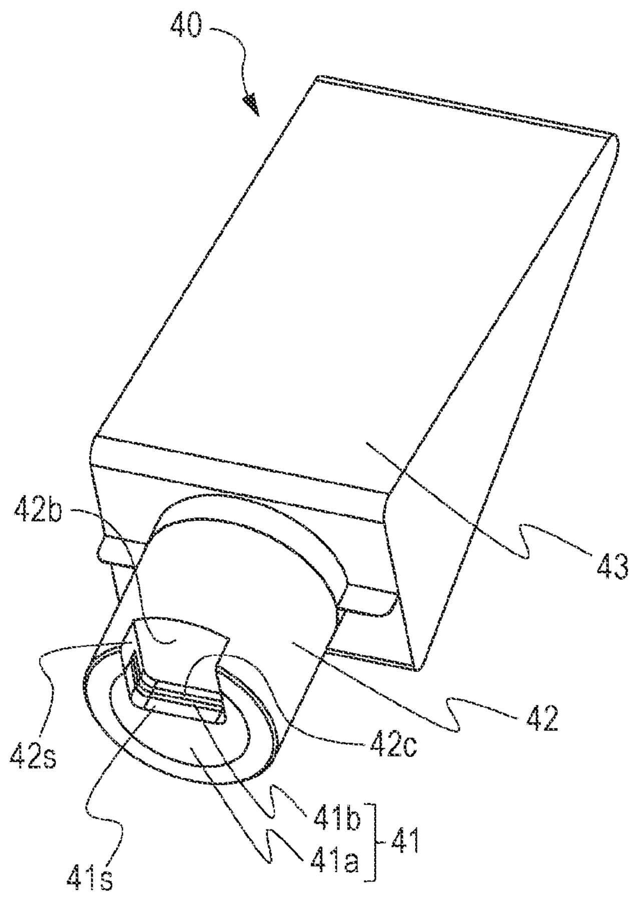
FIG. 12 is a perspective view of the toner pack according to the first embodiment.

The configuration of the toner pack 40 will be described. FIG. 7A is a perspective view showing the toner pack 40 when a shutter member 41 is closed. FIG. 7B is a bottom view of the toner pack 40. FIG. 8A is a perspective view showing the toner pack 40 when the shutter member 41 is open. FIG. 8B is a bottom view of the toner pack 40. FIG. 8C shows a scene where a user squeezes the toner pack 40 by hand during toner supply. FIG. 12 is a perspective view of the toner pack 40 when the shutter member 41 is closed when viewed from the lower side.

As shown in FIG. 7A to FIG. 8C, the toner pack 40 that is an example of the supply container includes a bag member 43 filled with toner, a resin ejection portion 42 connected to the bag member 43, and the shutter member 41 capable of opening and closing the opening portion of the ejection portion 42. A memory unit 45 as a storage unit that stores information on the toner pack 40 is attached to the ejection portion 42. The memory unit 45 has a plurality of metal plates (metal terminals) exposed to the outside of the toner pack 40 as a contact portion 45*a* that contacts with a contact portion 70133 (see FIG. 9A and FIG. 9B) of the supply container mounting portion 701 (described later). Polypropylene (PP) resin, polyethylene terephthalate resin (PET resin), corrugated cardboard, paper, or the like may be adopted as the material of the bag member 43. The thickness may be a range of 0.01 mm to 1.2 mm. From the viewpoint that the bag is tough and easy for a user to loosen, the thickness is more preferably a range of 0.05 mm to 1.0 mm.

As shown in FIG. 7B, FIG. 8B, and FIG. 12, the shutter member 41 has such a shape that part of a disc rotatable relative to the ejection portion 42 is cut away. A side surface that forms the thickness of the shutter member 41 at the cutaway portion functions as an engagement surface 41*s*. On the other hand, the ejection portion 42 also has a shape with a cutout. The ejection portion 42 has an engagement surface 42*s* parallel to the engagement surface 41*s* at the cutaway portion. An ejection port 42*a* is provided at a position spaced apart substantially 180 degrees from the engagement surface 42*s* in the circumferential direction of the ejection port 42*a*. FIG. 12 shows the details of the engagement surface 41*s* and the engagement surface 42*s*.

As shown in FIG. 7B and FIG. 12, when the positions of the cutouts match when viewed from the top surface or bottom surface of the shutter member 41 and the ejection portion 42, the ejection port 42*a* is covered with the shutter member 41 (closed state). As shown in FIG. 8B, when the shutter member 41 rotates 180 degrees relative to the ejection portion 42, the ejection port 42*a* is exposed via the cutaway portion of the shutter member 41, and the internal space of the bag member 43 communicates with the external space of the toner pack 40. As shown in FIG. 12, the shutter member 41 may have such a structure that a seal layer 41*b* made of an elastic material, such as sponge, is bonded to a main body portion 41*a* having stiffness. In this case, in the closed state, the seal layer 41*b* closely contacts with a seal layer 42*c* covering the peripheral portion of the ejection port 42*a*, thus making it possible to prevent toner leakage. The seal layer 42*c* is shown in FIG. 12. The seal layer 42*c*, as well as the seal layer 41*b*, is made of an elastic material, such as sponge.

As will be described later, when toner is supplied from the toner pack 40 to the image forming apparatus 1, the ejection portion 42 is aligned to a predetermined position, and the toner pack 40 is inserted and coupled to the supply container mounting portion 701. When the ejection portion 42 is rotated by 180 degrees, the ejection portion 42 rotates relative to the shutter member 41, and the ejection port 42*a* opens. As a result, toner in the bag member 43 flows down to the toner receiving unit 801 by gravity. At this time, the shutter member 41 does not move relative to the supply container mounting portion 701.

As shown in FIG. 8C, a user is able to facilitate ejection of toner from the toner pack 40 by squeezing the bag member 43 by hand in a state where the toner pack 40 is mounted on the supply container mounting portion 701 and rotated by 180 degrees.

Here, the rotary shutter member 41 is illustrated. Alternatively, the shutter member may be omitted or a slide shutter member may be applied instead of the rotary shutter member 41. The shutter member 41 may be configured to be broken by mounting the toner pack 40 at the supply port 8012 or rotating the toner pack 40 in a mounted state or may have a removable lid structure like a seal.

A protection cap may be attached to the ejection portion 42 of an unused toner pack 40 to prevent leakage of toner during transport or the like. The protection cap is, for example, configured to restrict relative rotation between the shutter member 41 and the ejection portion 42 by engaging with the cutaway portions of the shutter member 41 and the ejection portion 42 in a state of being connected to the ejection portion 42. By removing the protection cap, a user is able to mount the toner pack 40 on the supply container mounting portion 701.

(1-6) Configuration of Supply Container Mounting Portion

Figure 9A:
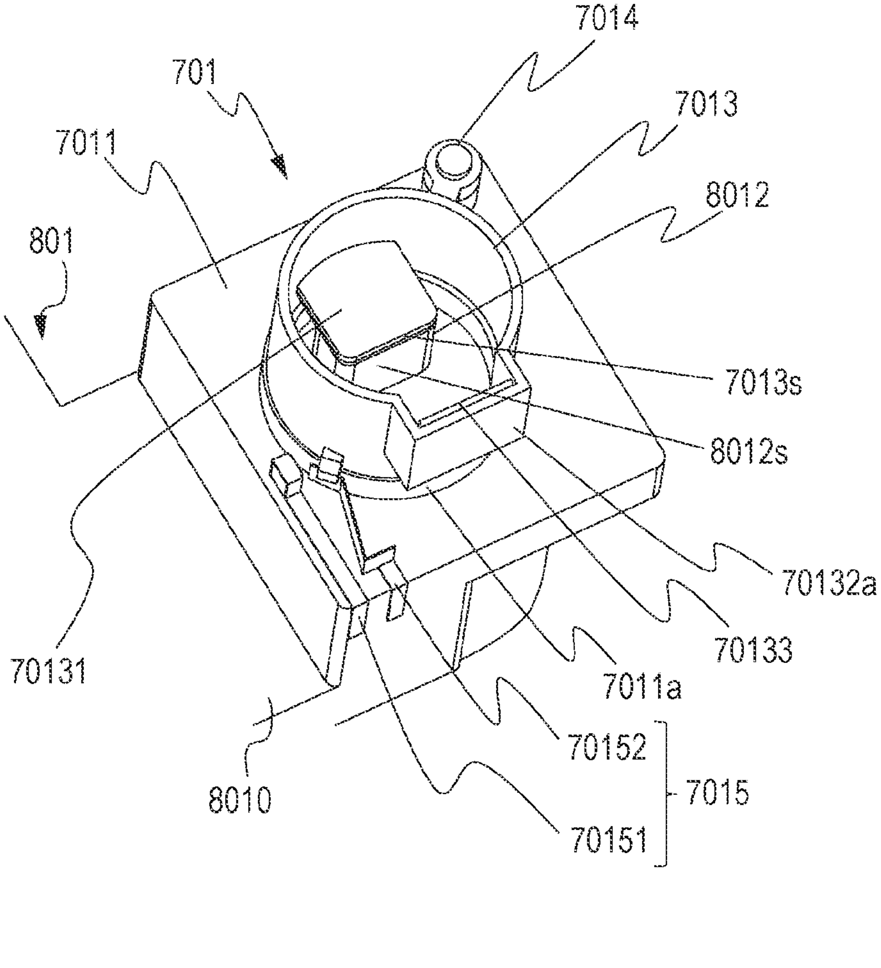
FIG. 9A is a perspective view of a supply container mounting portion according to the first embodiment.
Figure 9B:
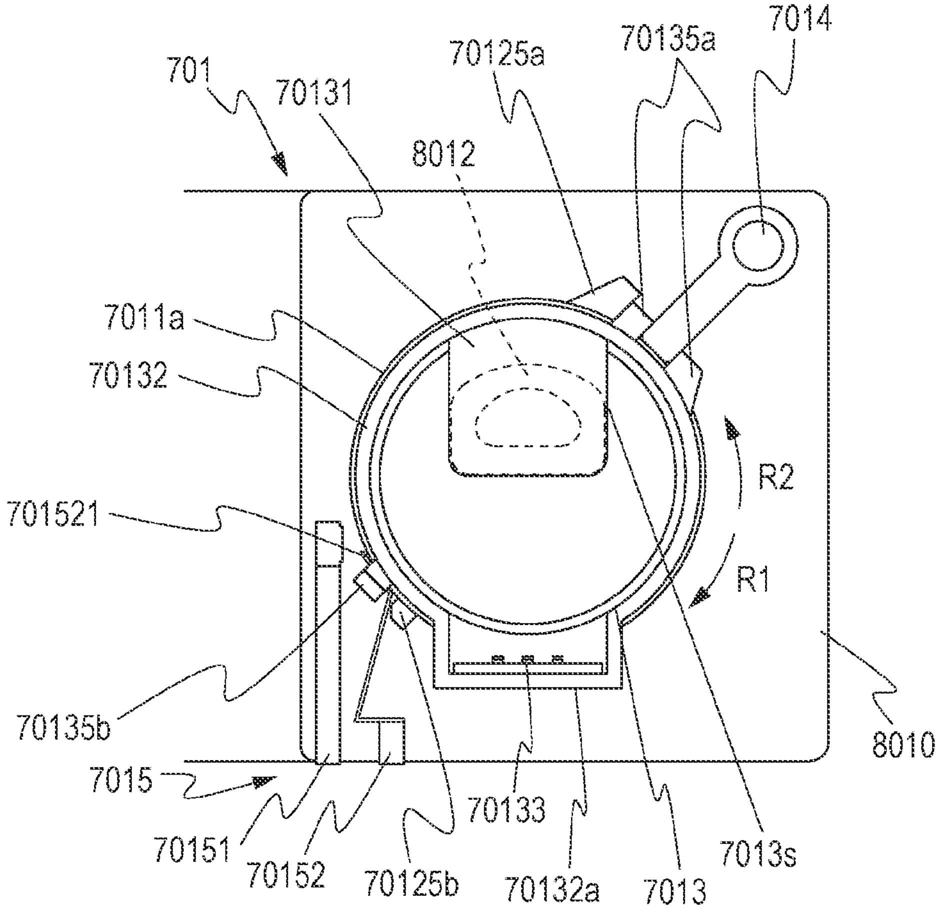
FIG. 9B is a top view of the supply container mounting portion according to the first embodiment.

A shutter opening/closing mechanism of the toner pack 40 and the toner receiving unit 801 and a locking mechanism of the shutter member 41 will be described. FIG. 9A is a perspective view of the supply container mounting portion 701. FIG. 9B is a top view of the supply container mounting portion 701. The supply container mounting portion 701 includes the supply port 8012, a supply port shutter 7013, a locking member 7014, and a rotation detection portion 7015.

The supply port 8012 is an opening portion that communicates with the toner containing portion 8011 (see FIG. 6A to FIG. 6C) of the toner receiving unit 801 and is fixed to a frame 8010 of the toner receiving unit 801. The supply port shutter 7013 includes a lid portion 70131 that covers the supply port 8012, a cylindrical portion 70132 used to receive the ejection portion 42 of the toner pack 40, and the contact portion 70133 that is connected to the contact portion 45*a* (see FIG. 8B) of the memory unit 45 of the toner pack 40. In the drawings, a portion of the cylindrical portion 70132, covering the contact portion 70133, is represented by a cylindrical portion 70132*a*. The supply port shutter 7013 is a member made up of the lid portion 70131, cylindrical portion 70132, and contact portion 70133 combined with one another and attached to the frame 8010 of the toner receiving unit 801 so as to be rotatable. Conductors exposed to the contact portion 70133 are electrically connected to a control unit of the image forming apparatus 1, mounted on the printer main body 100, via wires provided in the process cartridge 20 and contacts provided between the process cartridge 20 and the printer main body 100.

Figure 9C:
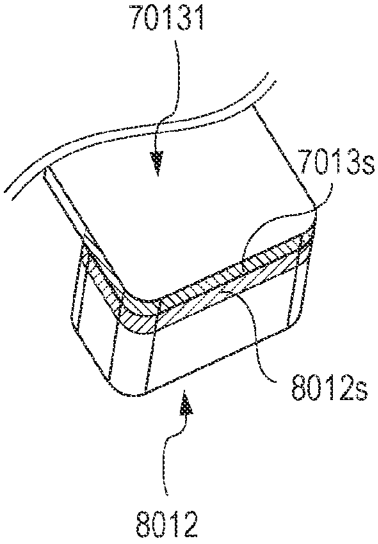
FIG. 9C is an enlarged view of the supply container mounting portion according to the first embodiment.

The rotation detection portion 7015 as a rotation detection sensor is a mechanism that detects rotation of the supply port shutter 7013. The rotation detection portion 7015 of the present embodiment is made up of two conductive leaf springs 70151, 70152. The leaf spring 70152 is urged in a clockwise direction and, when pressed by a protruded portion 70135*a* provided on the outer periphery of the supply port shutter 7013, contacts with the other leaf spring 70151 at a distal end portion 701521. In other words, the rotation detection portion 7015 is an electrical circuit configured to switch between a conductive state and an interrupted state in accordance with a rotational angle (rotational position) of the supply port shutter 7013. As will be described later, the control unit 90 (FIG. 9) of the image forming apparatus 1 recognizes whether the ejection port 42*a* of the toner pack 40 and the supply port 8012 of the supply container mounting portion 701 are in communication in accordance with whether the rotation detection portion 7015 is electrically continuous. In other words, the control unit 90 is capable of determining that user's supply operation on the toner pack 40 has been normally performed at least up to communication between the ejection port 42*a* and the supply port 8012.

As shown in FIG. 9A to FIG. 10C, a plurality of protruded portions 70135*a*, 70135*b* is provided on the outer peripheral portion of the cylindrical portion 70132 of the supply port shutter 7013. The frame 8010 has a shutter supporting portion 7011. The shutter supporting portion 7011 supports the cylindrical portion 70132 of the supply port shutter 7013 such that the cylindrical portion 70132 is rotatable. A plurality of protruded portions 70125*a*, 70125*b* is also provided on a cylindrical part 7011*a* of the shutter supporting portion 7011. The plurality of protruded portions 70125*a*, 70125*b* is located below the protruded portion 70135*a* (the right-side one in FIG. 10A) in the gravitational direction. The protruded portion 70125*b* allows passage of the protruded portion 70135*a* (the right-side one in FIG. 10A) through rotational movement. On the other hand, the protruded portion 70135*a* (the left-side one in FIG. 10A) is located at the same level as the protruded portion 70135*a* (the right-side one in FIG. 10A) and extends down to the level at which the protruded portion 70135*a* (the left-side one in FIG. 10A) overlaps the protruded portion 70125*a* and the protruded portion 70125*b*. Therefore, the protruded portion 70125*b* contacts with the protruded portion 70135*a* (the left-side one in FIG. 10A) at the rotational angle (rotational position) of the supply port shutter 7013 and restricts rotational movement of the protruded portion 70135*a* (the left-side one in FIG. 10A).

Before rotation of the supply port shutter 7013 in the R1 direction, the protruded portion 70125*a* contacts with the protruded portion 70135*a* (the left-side one in FIG. 10A) and restricts rotational movement of the protruded portion 70135*a* in the R1 direction. The protruded portion 70135*a* (the right-side one in FIG. 10A) contacts with the locking member 7014 and restricts rotational movement of the locking member 7014 in the R2 direction. On the other hand, after rotation of the supply port shutter 7013 in the R1 direction, the protruded portion 70135*b* contacts with the locking member 7014 that has been moved to the lock position and restricts rotational movement of the locking member 7014 in the R2 direction. The protruded portion 70135*a* (the right-side one in FIG. 10B) contacts with the protruded portion 70125*b* and restricts further rotational movement of the protruded portion 70135*a* in the R1 direction. It is assumed that the rotational direction of the supply port shutter 7013 is the R1 direction when the toner pack 40 is attached and is the R2 direction when the toner pack 40 is detached.

Figure 11A:
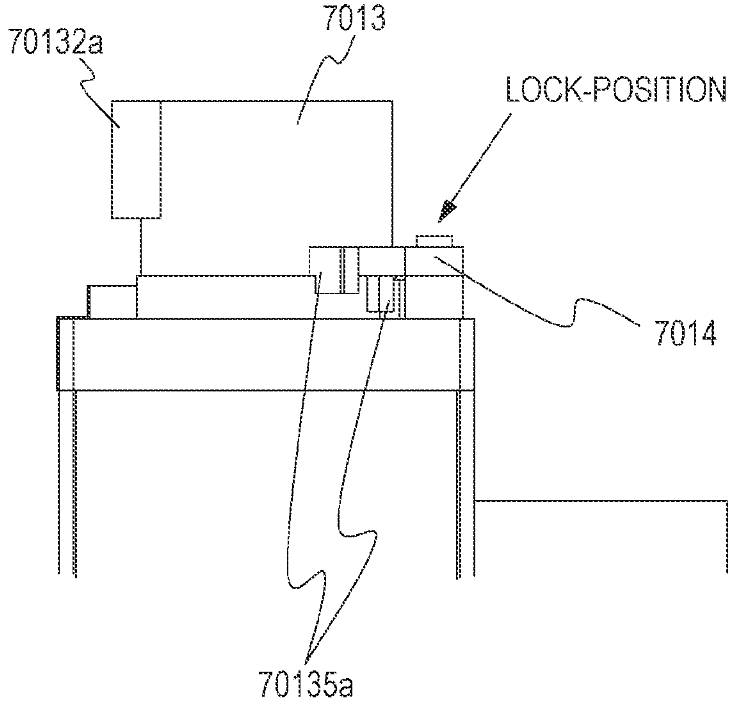
FIG. 11A and FIG. 11B are views showing the positions of a locking member according to the first embodiment.
Figure 11B:
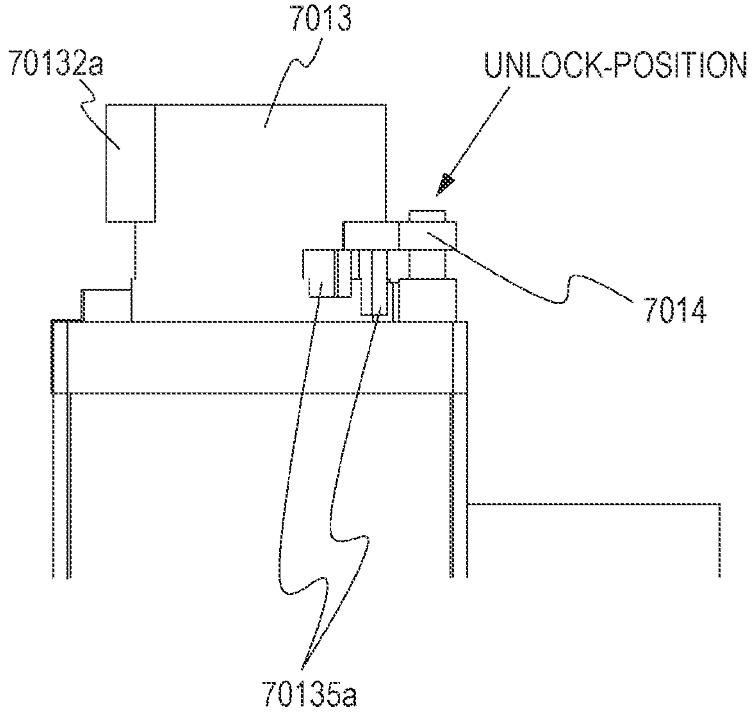

The locking member 7014 is a member that restricts rotation of the supply port shutter 7013. FIG. 11A shows a state where the locking member 7014 is in the lock position. FIG. 11B shows a state where the locking member 7014 is in the unlock position. The locking member 7014 is able to switch between the lock position (restricted position) and the unlock position (allowed position) by moving up and down. As shown in FIG. 9B and FIG. 11A, when the locking member 7014 contacts with the protruded portion 70135*a* of the supply port shutter 7013 in the lock position, rotation of the supply port shutter 7013 is restricted. When the locking member 7014 moves to the unlock position as shown in FIG. 11B, the locking member 7014 retracts from the movement path of the protruded portion 70135*a* when the supply port shutter 7013 rotates, with the result that rotation of the supply port shutter 7013 is allowed.

(1-7) Push Mechanism of Locking Member

Figure 13:
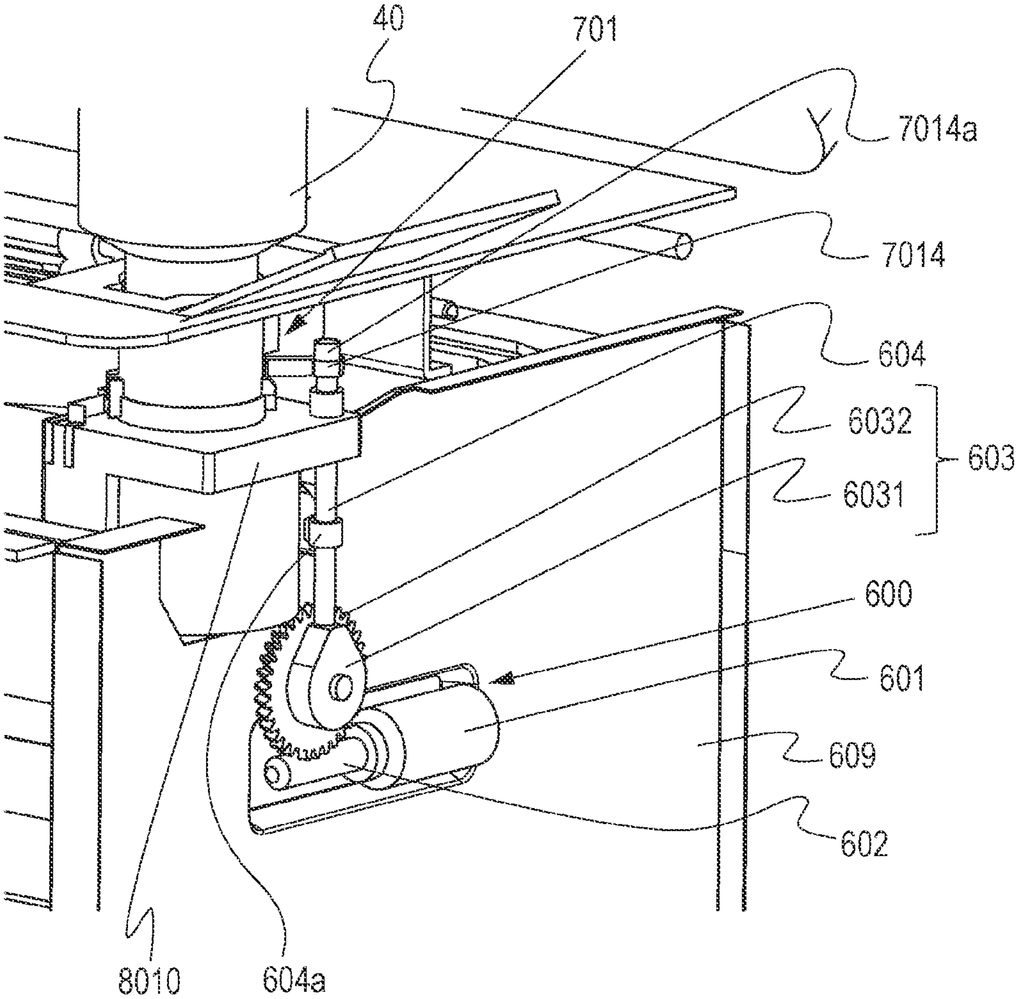
FIG. 13 is a view showing a push mechanism of the locking member according to the first embodiment.

FIG. 13 shows a push mechanism 600 that moves the locking member 7014 between the lock position and the unlock position. The push mechanism 600 is made up of a motor 601, an input gear 602, a cam gear 603, and an advancing/retracting pin 604. The input gear 602 is a worm gear secured to an output shaft of the motor 601. The cam gear 603 includes a gear portion 6032 made up of a helical gear meshing with the input gear 602, and a cam portion 6031 for reciprocating the advancing/retracting pin 604.

The advancing/retracting pin 604 is supported by a holding member so as to be linearly movable in the gravitational direction and its opposite direction (vertical direction). When the motor 601 rotates, the cam gear 603 rotates via the input gear 602, and the advancing/retracting pin 604 is pushed by the cam portion 6031 to reciprocate up and down. With this motion, the locking member 7014 also moves up and down between the lock position and the unlock position. FIG. 13 shows a lock state.

A drive transmission configuration in the push mechanism 600 of the present embodiment is a combination of the helical gear and the worm gear; however, the drive transmission configuration is not limited thereto as long as a configuration is capable of converting rotation of the motor to linear motion. For example, a configuration may use a bevel gear or a configuration in which the cam gear 603 is directly driven by the motor 601 without the input gear 602 may be adopted. Instead of the motor 601, an actuator that outputs linear motion like a solenoid may be used as a driving source.

The members that make up the push mechanism 600 shown in FIG. 13 are supported by the frame 609 of the printer main body 100, and the advancing/retracting pin 604 is supported by a guiding portion 604*a* so as to be able to reciprocate up and down. The guiding portion 604*a* is provided on a casing of the printer main body 100. On the other hand, a pivot shaft 7014*a* of the locking member 7014 is held by a holding portion so as to be able to rotate and slide in the vertical direction. The holding portion is provided on the frame 8010 of the toner receiving unit 801. Therefore, when the process cartridge 20 is replaced, the locking member 7014 is also replaced at the same time, and the push mechanism 600 is left in the printer main body 100. The pivot shaft 7014*a* and the advancing/retracting pin 604 are made up of separate members. When the locking member 7014 is in the lock position, the advancing/retracting pin 604 is separated from the locking member 7014, and the process cartridge 20 is removed from the main body while the advancing/retracting pin 604 is left in the main body. However, the configuration is not limited thereto. For example, the pivot shaft 7014*a* of the locking member 7014 may be supported by the printer main body 100.

(1-8) Flow of Supply Operation Using Toner Pack

Figure 10A:
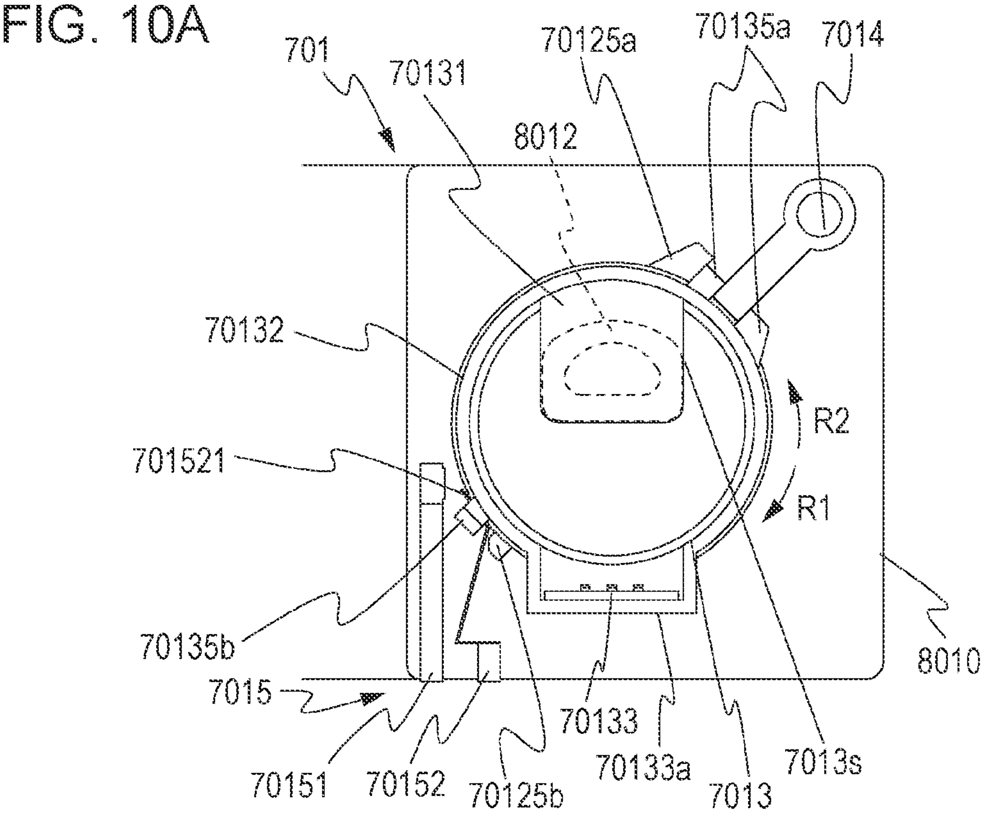
FIG. 10A to FIG. 10C are views for illustrating the operations of the supply container mounting portion according to the first embodiment.
Figure 10B:
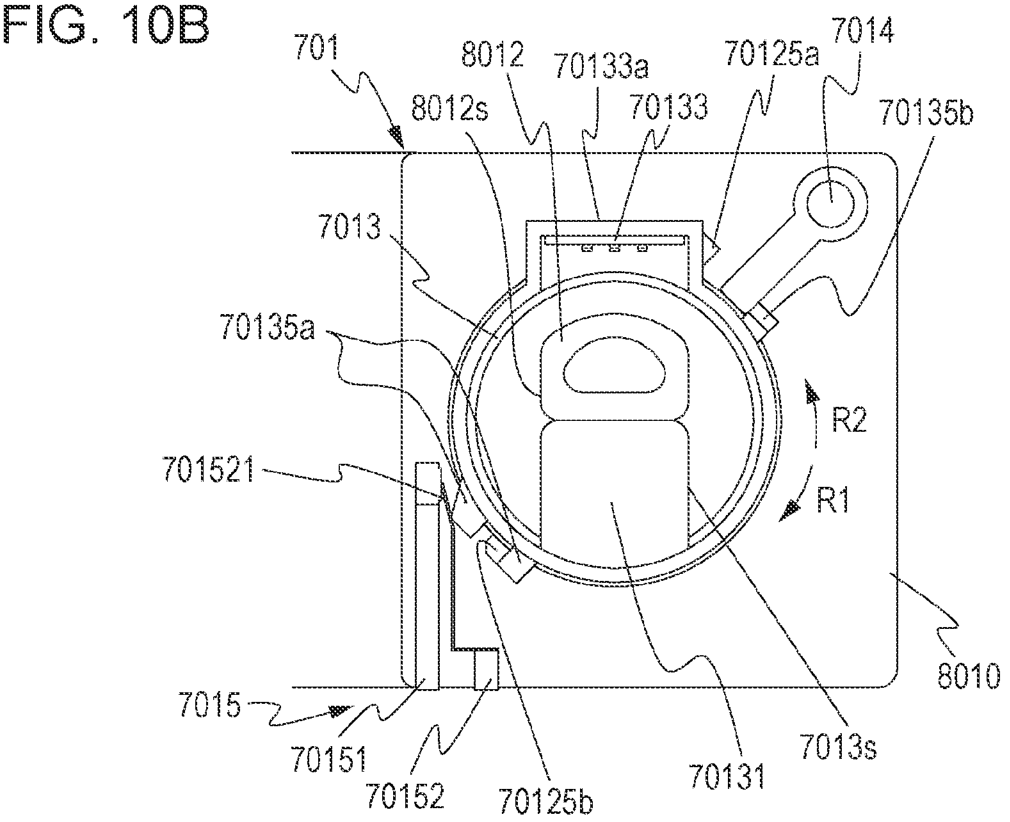
Figure 10C:
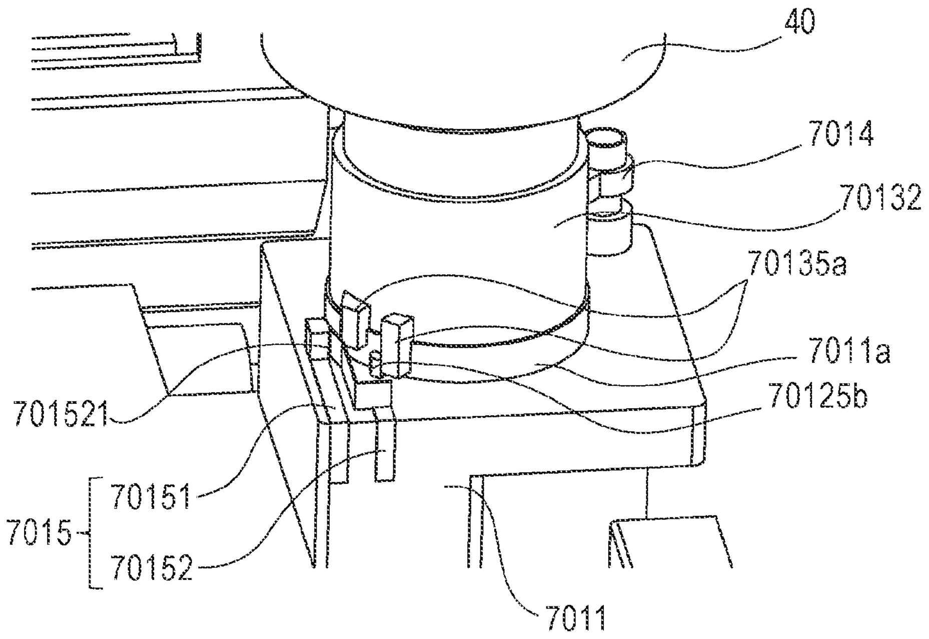

A series of operations when the toner pack 40 is mounted on the supply container mounting portion 701, toner is supplied, and then the toner pack 40 is detached will be described on the assumption of the above-described configuration made up of the toner pack 40, the supply container mounting portion 701, and the push mechanism 600. FIG. 10A is a top view of the supply container mounting portion 701 in a state where the supply port 8012 is closed. FIG. 10B is a top view of the supply container mounting portion 701 in a state where the supply port 8012 is open. FIG. 10C is a perspective view of the supply container mounting portion 701 in a state where the supply port 8012 is open.

As shown in FIG. 10A, the supply port shutter 7013 in a closed state is locked so as not to rotate relative to the supply port 8012 by the contact of the protruded portions 70135*a* with the locking member 7014 in the lock position in the rotational direction. At this time, the lid portion 70131 of the supply port shutter 7013 completely closes the supply port 8012. The leaf springs 70151, 70152 of the rotation detection portion 7015 are spaced apart from each other, so the rotation detection portion 7015 is in an interrupted state.

When the toner pack 40 is inserted in the supply container mounting portion 701, a user inserts the toner pack 40 by aligning the cutaway portions (FIG. 12) of the ejection portion 42 and shutter member 41 of the toner pack 40 with the supply port 8012 and the lid portion 70131 of the supply port shutter 7013. Then, the engagement surface 42*s* of the ejection portion 42 engages with an engagement surface 7013*s* (see FIG. 9C) that is the side surface of the lid portion 70131, and the engagement surface 41*s* of the shutter member 41 engages with an engagement surface 8012*s* (see FIG. 9C) provided on the outer peripheral portion of the supply port 8012. At this time, the ejection portion 42 engaged with the lid portion 70131 of the supply port shutter 7013 is not rotatable until the supply port shutter 7013 is unlocked by the locking member 7014 later, and becomes rotatable together with the supply port shutter 7013 as a result of unlocking. On the other hand, the shutter member 41 of the toner pack 40 engages with the supply port 8012 fixed to the frame 8010 of the toner receiving unit 801 and is placed in a non-rotatable state. As another engagement configuration of the lid portion 70131 and the ejection portion 42, a protrusion that protrudes upward from the top surface of the lid portion 70131 may be provided, and a recess that engages with the protrusion may be provided at a lower surface 42*b* (see FIG. 12) of the ejection portion 42.

Through insertion of the toner pack 40, the contact portion 45*a* (see FIG. 7A and FIG. 7B) of the memory unit 45 contacts with the contact portion 70133 of the supply container mounting portion 701, and information recorded on the memory unit 45 is read by the control unit 90 of the image forming apparatus 1. Information (new one flag) indicating whether toner is contained in the toner pack 40 (whether the toner pack 40 is a used toner pack) is recorded on the memory unit 45. When the control unit 90 reads a new one flag and determines that the currently mounted toner pack 40 contains toner (not used), the control unit 90 controls the push mechanism 600 to push the locking member 7014 upward. Thus, the locking member 7014 moves from the lock position to the unlock position (FIG. 11B).

In a state where the locking member 7014 has moved to the unlock position, the locking member 7014 is spaced apart from the protruded portions 70135*a* of the supply port shutter 7013, so the supply port shutter 7013 is rotatable in the R1 direction in FIG. 10A and FIG. 10B (FIG. 11B). In contrast, the protruded portion 70125*a* provided on the frame 8010 of the toner receiving unit 801 interferes with the protruded portion 70135*a* (FIG. 10A), so rotation of the supply port shutter 7013 in the R2 direction is restricted. In other words, in FIG. 10A, the protruded portions 70125*a*, 70125*b* are located below the protruded portions 70135*a*, 70135*b* in the gravitational direction so that the protruded portions 70135*a*, 70135*b* can move and pass in the rotational direction.

When a user holds the toner pack 40 and rotates the ejection portion 42 or the bag member 43 near the ejection portion 42 by 180 degrees in the R1 direction, the state shown in FIG. 10B and FIG. 10C is obtained. When the supply port shutter 7013 rotates 180 degrees together with the ejection portion 42 of the toner pack 40, the lid portion 70131 moves from the position to cover the supply port 8012, and exposes the supply port 8012. The side surface of the lid portion 70131 is pushed by the engagement surface 42*s* that is part of the rotating ejection portion 42, and the lid portion 70131 rotates to move with the engagement surface 42*s*. When the ejection portion 42 rotates 180 degrees in a state where the shutter member 41 is locked, the ejection port 42*a* of the toner pack 40 is exposed (FIG. 8B) and faces the supply port 8012. Thus, the internal space of the toner pack 40 and the internal space of the toner receiving unit 801 communicate via the ejection port 42*a* and the supply port 8012, and toner filled in the bag member 43 flows down to the toner containing portion 8011.

Toner having fallen to the toner containing portion 8011 is, as described above, conveyed inside the toner receiving unit 801 to reach the developer container 32 and is placed in a state usable in developing process. Even before newly supplied toner reaches the developer container 32, as long as toner in an amount to maintain image quality remains in the developer container 32, the developing unit 802 may be configured to be able to execute developing process. In other words, regardless of whether image forming operation is being executed in the image forming unit 10 (FIG. 1A), toner may be able to be supplied from a supply container outside the image forming apparatus 1 to the developer container 32.

The protruded portion 70125*b* is disposed so as to contact with the protruded portion 70135*a* of the supply port shutter 7013 when the supply port shutter 7013 is rotated by 180 degrees from the state shown in FIG. 10A in the R1 direction (FIG. 10B and FIG. 10C). In other words, the protruded portion 70125*b*, as well as the protruded portion 70125*a*, is also located below the protruded portions 70135*a*, 70135*b* in the gravitational direction. Thus, the supply port shutter 7013 is restricted to rotate in the R1 direction over 180 degrees. Similarly, the protruded portions 70135*a* of the supply port shutter 7013 push the leaf spring 70152 of the rotation detection portion 7015 to bring the distal end portion 701521 into contact with the leaf spring 70151. When the rotation detection portion 7015 is in a conductive state, the control unit 90 recognizes that the supply port shutter 7013 is open, and causes the push mechanism 600 to operate to move the locking member 7014 to the lock position again. Then, the locking member 7014 engages with the protruded portion 70135*b* of the supply port shutter 7013 to restrict rotation of the supply port shutter 7013 in the R2 direction, so the supply port shutter 7013 and the toner pack 40 do not rotate in any direction.

In a state of FIG. 10B and FIG. 10C where the ejection portion 42 of the toner pack 40 and the supply port shutter 7013 are rotated by 180 degrees, the lid portion 70131 of the supply port shutter 7013 covers above the shutter member 41 of the toner pack 40. Therefore, even when the toner pack 40 is attempted to be lifted upward from the supply container mounting portion 701, the shutter member 41 interferes with the lid portion 70131, so movement of the toner pack 40 is restricted. Therefore, unless a user performs operation to detach the toner pack 40 in a predetermined procedure that will be described below, dropping of the toner pack 40 off from the supply container mounting portion 701 is prevented.

After ejection of toner from the toner pack 40 is started, when a condition for determining completion of ejection of toner is satisfied, the control unit 90 causes the push mechanism 600 to operate to move the locking member 7014 to the unlock position. In the present embodiment, completion of ejection of toner is determined in accordance with an elapsed time from the time when the rotation detection portion 7015 becomes a conductive state.

After the locking member 7014 moves to the unlock position, a user is able to detach the toner pack 40 in accordance with a procedure reverse to that when the toner pack 40 is attached. In other words, a user holds the ejection portion 42 of the toner pack 40 or the bag member 43 near the ejection portion 42 and rotates the ejection portion 42 or the bag member 43 near the ejection portion 42 by 180 degrees in the R2 direction opposite to that when the toner pack 40 is attached. Then, the supply port shutter 7013 rotates 180 degrees together with the ejection portion 42, and the supply port 8012 is covered with the lid portion 70131 of the supply port shutter 7013 as shown in FIG. 10A. When the protruded portion 70135*a* (the left-side one in FIG. 10A) of the supply port shutter 7013 contacts with the protruded portion 70125*a*, rotation of the supply port shutter 7013 in the R2 direction over 180 degrees is restricted.

In a state where the ejection portion 42 of the toner pack 40 is rotated by 180 degrees in the R2 direction, the position of the cutaway portion of the ejection portion 42 and the position of the cutaway portion of the shutter member 41 match (FIG. 12). Therefore, even when the toner pack 40 is moved upward, the shutter member 41 does not interfere with the lid portion 70131 of the supply port shutter 7013, and a user is able to detach the toner pack 40 from the supply container mounting portion 701 by holding and lifting the toner pack 40.

In the process of rotation of the supply port shutter 7013 by 180 degrees in the R2 direction, the protruded portion 70135*a* separates from the leaf spring 70152, and the rotation detection portion 7015 returns to an interrupted state. Then, the control unit 90 recognizes that the supply port shutter 7013 is closed, and causes the push mechanism 600 to operate to move the locking member 7014 to the lock position. Thus, the supply container mounting portion 701 returns to an initial state before toner supply operation is performed. For example, the control unit 90 may determine that a predetermined condition for moving the locking member 7014 to the unlock position is satisfied when a predetermined time has elapsed from when the rotation detection portion 7015 becomes a conductive state. A trigger to move the locking member 7014 to the lock position may be a loss of electrical continuity between the contact portion 70133 (see FIG. 9B) and the contact portion 45*a* (see FIG. 7A) as a result of, for example, pulling out the toner pack 40 from the supply container mounting portion 701.

In the present embodiment, a positional relationship in which the ejection port 42*a* of the toner pack 40 and the supply port 8012 communicate by 180-degree rotation is adopted; however, a rotational angle used for the communication may be changed as long as it is possible to attach and detach the toner pack 40 with a similar operation to that of the present embodiment.

(1-9) Panel

Next, a panel 400 will be described. As shown in FIG. 1B and FIG. 14A to FIG. 14C, the panel 400 is provided on, for example, the front surface of the casing of the printer main body 100. The panel 400 is an example of a display device that displays information on the residual amount of toner in the developer container 32 (or the amount of space in the developer container 32). The panel 400 is made up of a liquid crystal panel including a plurality of indicators. In the present embodiment, three indicators 4001, 4002, 4003 are arranged from the upper side to the lower side in the vertical direction. The panel 400 indicates the amount of toner that can be supplied to the developer container 32 with indication of the indicators 4001 to 4003 that vary in a stepwise manner. The control unit 90 updates panel indication at any time in accordance with recognition of completion of supply operation (described later). When the completion of supply operation is not reflected in an actual toner residual amount, a toner residual amount may be detected later, and panel indication may be updated. When, for example, the control unit 90 causes the indicator 4002 to turn on and then detects with optical sensors (51*a*, 51*b*, see FIG. 6A) that a toner residual amount is actually not sufficiently supplied, the control unit 90 turns off the indicator 4002 and updates indication on the panel 400. The bottom indicator 4003 indicates that toner in the developer container 32 is a Low level or an Out level. The Low level means that the developer container 32 needs to be supplied with toner; however, toner in a minimum amount to maintain image quality remains and image forming operation is able to be performed at the present point in time. The Out level means that almost no toner remains in the developer container 32 and image forming operation is not able to be performed.

In the configuration example of the illustrated panel 400, when all the three indicators 4001, 4002, 4003 are turned off, it indicates that toner in the developer container 32 is at the Out level (fourth state).

Figure 14A:
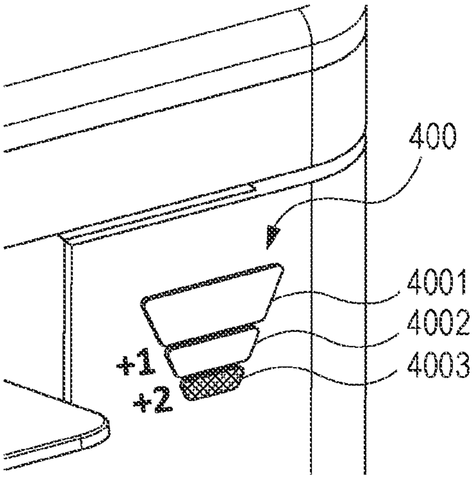
FIG. 14A to FIG. 14C are views showing panels according to the first embodiment.

As shown in FIG. 14A, when only the bottom indicator 4003 is turned on, it indicates that a toner residual amount in the developer container 32 is at the Low level. In this state, because the two indicators are turned off, it is found, for example, that toner in an amount corresponding to two toner packs 40 can be supplied (third state). It is also found from a state where +1 and +2 numeric panels adjacent to the indicators turn on that toner in an amount corresponding to two toner packs 40 can be supplied.

Figure 14B:
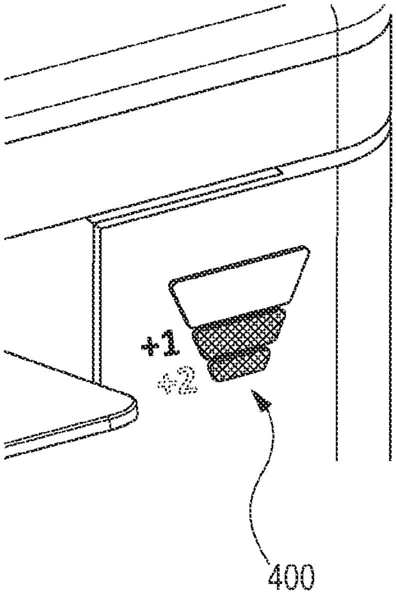

As shown in FIG. 14B, when the bottom and middle indicators 4002, 4003 are turned on and the top indicator 4001 is turned off, a toner residual amount in the developer container 32 is greater than the Low level and less than a Full level (full). In this state, because the one indicator is turned off, it is found, for example, that toner in an amount corresponding to a single toner pack 40 can be supplied (second state). It is also found from a state where +1 numeric panel adjacent to the indicator is turned on and +2 numeric panel is turned off that toner in an amount corresponding to a single toner pack 40 can be supplied.

Figure 14C:
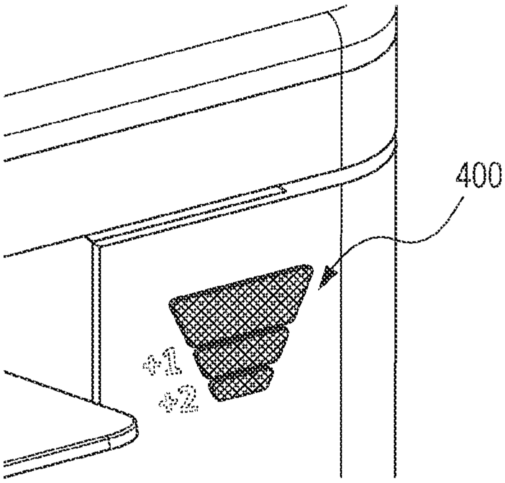

As shown in FIG. 14C, when all the three indicators 4001 to 4003 are turned on, it indicates that a toner residual amount in the developer container 32 is at the Full level. In this state, because there is no indicator turned off, it is found that, for example, toner cannot be supplied from a toner pack 40 (first state). It is also found from a state where +1 and +2 numeric panels adjacent to the indicators are turned off that toner cannot be supplied from a toner pack 40.

The panel 400 shown in FIG. 14A to Fit. 14C is an example of a display device that changes an indication content in accordance with a toner residual amount in the developer container 32, and another configuration may be used. For example, instead of the liquid crystal panel, a panel may be made up of a combination of a light source, such as an LED and an incandescent lamp, and a diffusing lens. Alternatively, only numeric panels may be used while indicators are omitted or only indicators may be used while numeric panels are omitted.

The number of the indicators and its indication method in the panel 400 may be changed as needed. A user may be prompted to supply toner by, for example, blinking the bottom indicator when a toner residual amount in the developer container 32 is at the Low level.

(2) First Modification Example

Next, as another example of the supply container, a mode of a first modification example using a bottle-shaped toner bottle unit instead of a bag-shaped toner pack will be described with reference to FIG. 15A to FIG. 15D. The toner bottle unit, as well as the above-described toner pack 40, is configured to be attachable to and detachable from the above-described supply container mounting portion 701. Therefore, the description of the configuration of an image forming apparatus common to that of the first embodiment is omitted.

(2-1) Configuration of Toner Bottle Unit

Figure 15A:
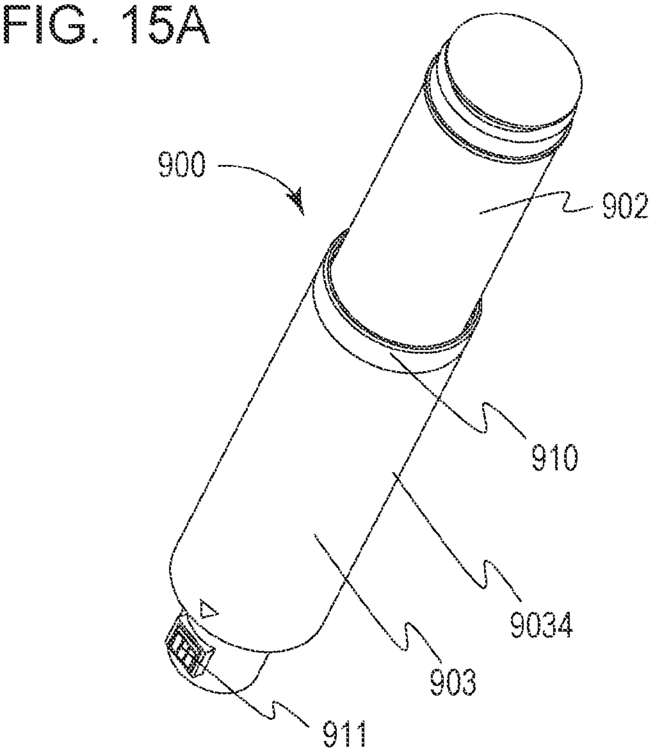
FIG. 15A and FIG. 15B are perspective views of a toner bottle unit according to a first modification example.
Figure 15B:
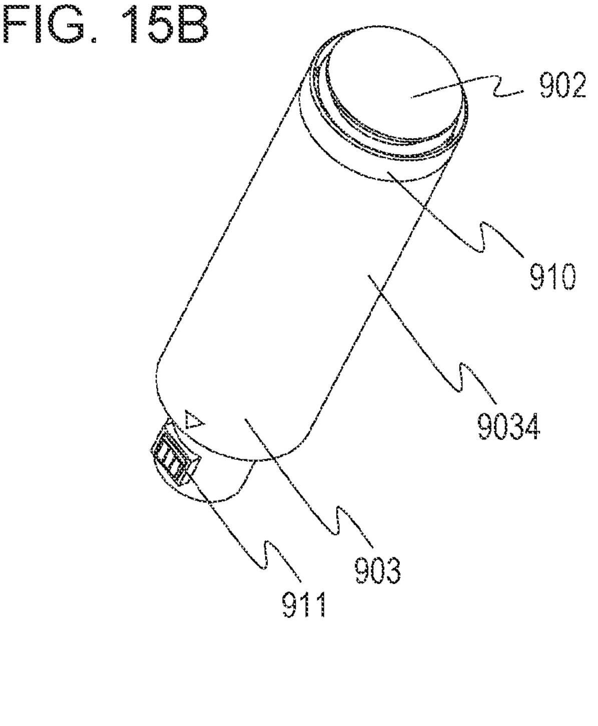
Figure 15C:
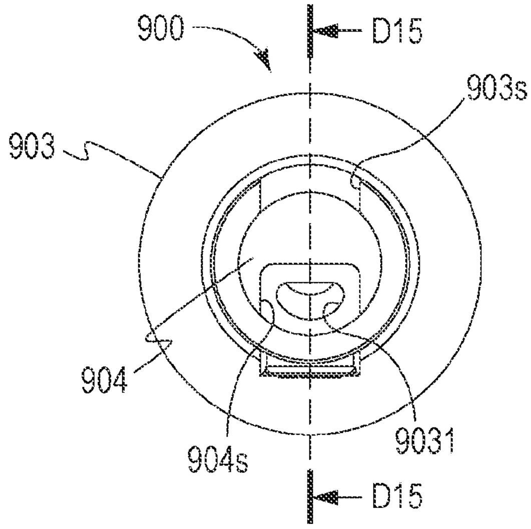
FIG. 15C is a side view of the toner bottle unit according to the first modification example.
Figure 15D:
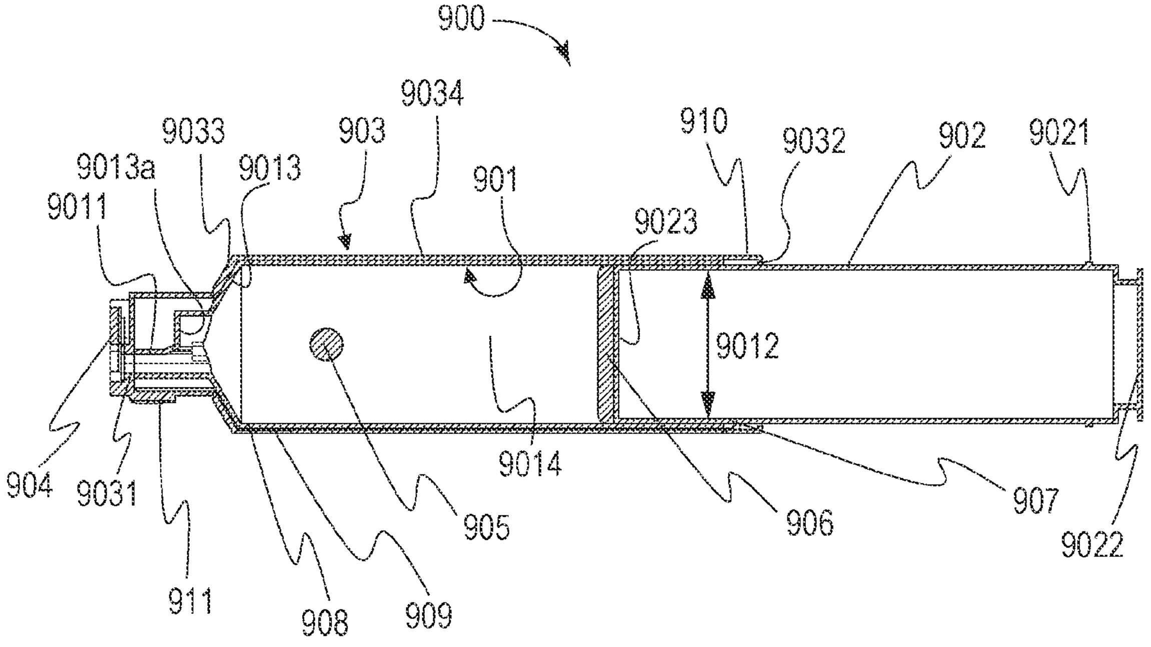
FIG. 15D is a cross-sectional view of the toner bottle unit according to the first modification example.

FIG. 15A is a perspective view showing the appearance of a toner bottle unit 900. FIG. 15B is a perspective view showing the toner bottle unit 900 after ejection of toner. FIG. 15C is a bottom view of the toner bottle unit 900 when viewed from the lower side of a piston. FIG. 15D is a cross-sectional view of the toner bottle unit 900, taken along the line D15-D15 in FIG. 15C.

Figure 16A:
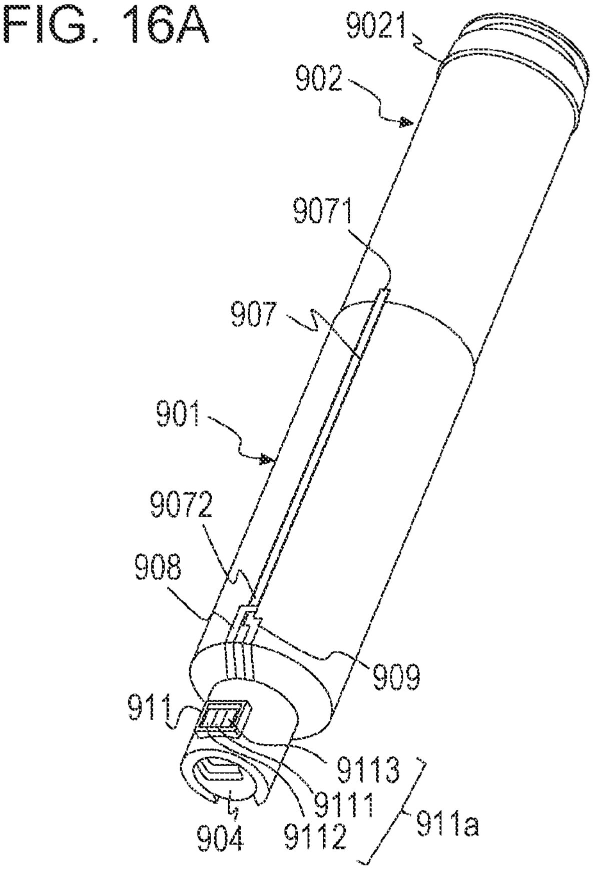
FIG. 16A to FIG. 16D are views for illustrating the internal configuration of the toner bottle unit according to the first modification example.
Figure 16B:
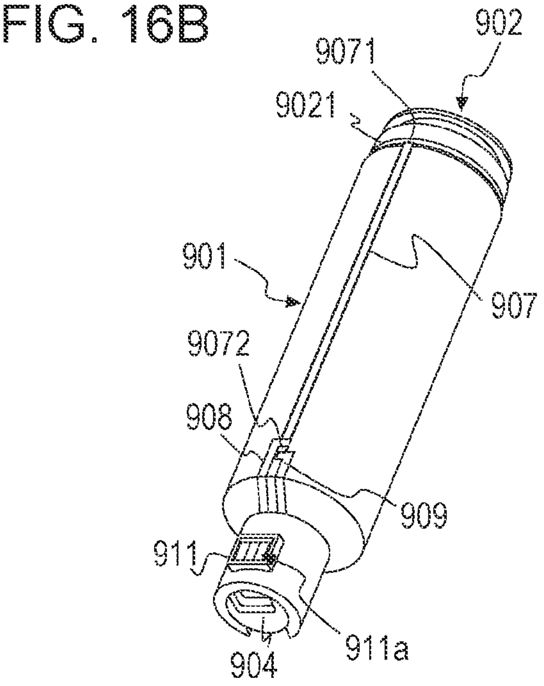
Figure 16C:
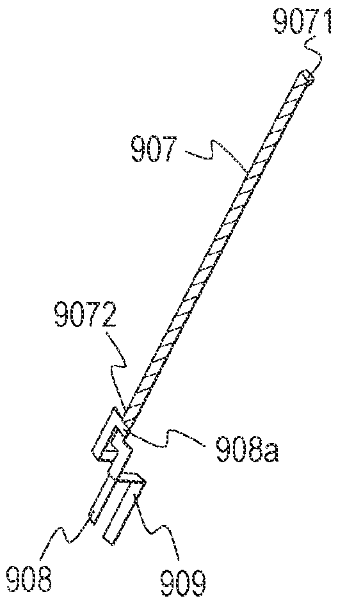
Figure 16D:
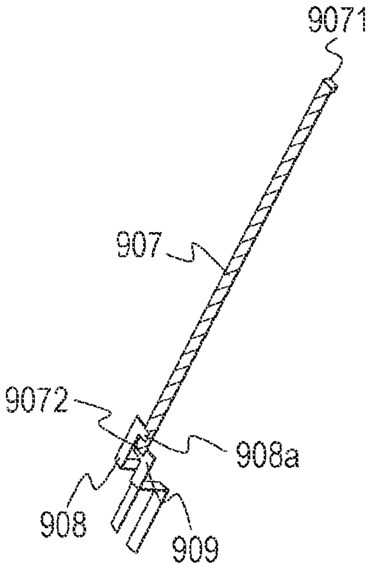
Figure 16E:
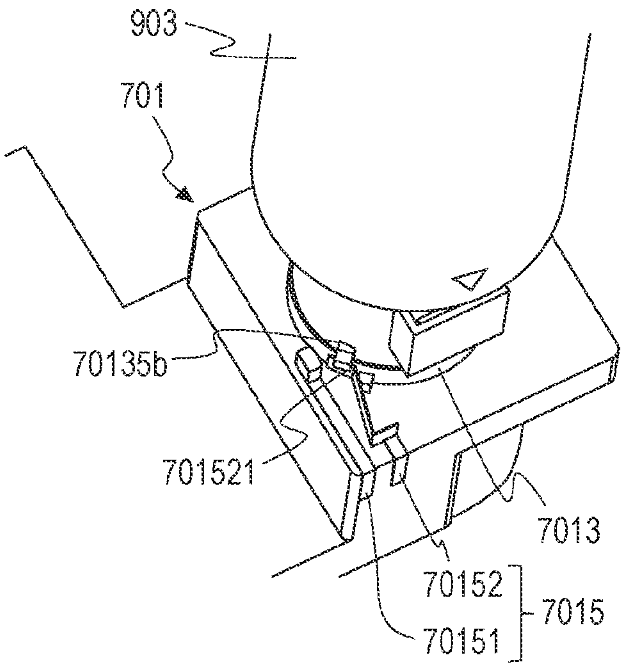
FIG. 16E and FIG. 16F are views for illustrating rotation detection of the toner bottle unit according to the first modification example.
Figure 16F:
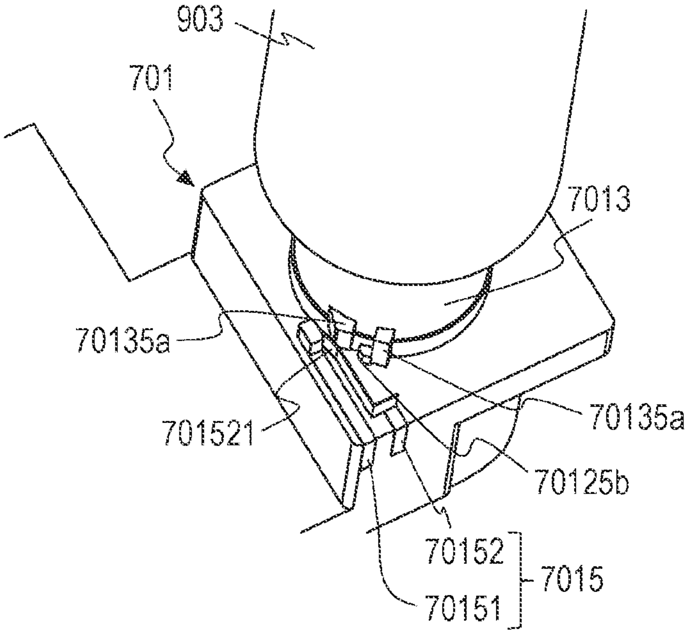

FIG. 16A is a perspective view of the toner bottle unit 900 in which an outer cylinder 903 (see FIG. 15A) is not shown. FIG. 16B is a perspective view of the toner bottle unit 900 in which the outer cylinder 903 is not shown in a state after ejection of toner. FIG. 16C is a view showing a state before operation to push a component related to push detection of the toner bottle unit 900. FIG. 16D is a view showing a state after operation to push the component related to push detection. FIG. 16E is a view showing a state before operation to rotate a component related to rotation detection of the toner bottle unit 900. FIG. 16F is a view showing a state after operation to rotate the component related to rotation detection of the toner bottle unit 900.

As shown in FIG. 15A and FIG. 15D, the toner bottle unit 900 roughly includes the outer cylinder 903, an inner cylinder 901, a piston 902, a shutter member 904, and a memory unit 911. The outer cylinder 903 and the inner cylinder 901 each have a cylindrical shape. The inner cylinder 901 is fitted inside the outer cylinder 903. The piston 902 is fitted further inside the inner cylinder 901 and is slidable relative to the inner cylinder 901. Hereinafter, a direction in which the piston 902 moves (the direction of the axes of the outer cylinder 903 and inner cylinder 901) is defined as an axial direction of the toner bottle unit 900. The piston 902 is an example of a pushing member.

The inner cylinder 901 includes a cylindrical toner containing portion 9014 used to contain toner, a bottom portion 9013 provided at one end side in the axial direction, and an ejection port 9011 provided at the bottom portion 9013. The inner cylinder 901 has such a cylinder shape that one end portion of the toner containing portion 9014 in the axial direction is closed by the bottom portion 9013. The other end side of the toner containing portion 9014 is an opening portion 9012. The piston 902 is inserted in the toner containing portion 9014 via the opening portion 9012. A spherical weight member 905 freely movable in the toner containing portion 9014 is accommodated in the inner cylinder 901.

The outer cylinder 903 includes a cylindrical inner cylinder accommodation portion 9034 that accommodates inside the toner containing portion 9014 of the inner cylinder 901, a bottom portion 9033 provided at one end side in the axial direction, and an ejection port 9031 provided at the bottom portion 9033. The outer cylinder 903, as well as the inner cylinder 901, has such a cylinder shape that one end portion of the inner cylinder accommodation portion 9034 in the axial direction is closed by the bottom portion 9033. The outer cylinder 903 holds the inner cylinder 901 such that the inner cylinder 901 is not movable relative to the outer cylinder 903. The other end side of the inner cylinder accommodation portion 9034 is an opening portion 9032 through which the piston 902 is inserted. FIG. 15D illustrates only one weight member 905 (movable member). As will be described later, the number of movable members may be changed.

The ejection port 9011 of the inner cylinder 901 has a narrow cylindrical shape extending from the bottom portion 9013 to one end side in the axial direction. The ejection port 9031 of the outer cylinder 903 is provided at a position corresponding to the ejection port 9011 of the inner cylinder 901 in the bottom portion 9033. The ejection port 9031 of the outer cylinder 903 is an ejection port for ejecting toner contained in the toner containing portion 9014 to the outside of the toner bottle unit 900. A retract space 9013*a* into which the weight member 905 retracts so as not to close the ejection port 9011 at the time of pushing the piston is provided adjacent to the ejection port 9011 of the inner cylinder 901.

The bottom portion 9013 of the inner cylinder 901 has such a tapered shape that the cross-sectional area reduces toward the ejection port side in the axial direction (particularly, a conical shape that the inside diameter reduces toward the ejection port side in the axial direction). The bottom portion 9033 of the outer cylinder 903, facing the bottom portion 9013 of the inner cylinder 901, also has a similar tapered shape. The ejection port 9011 and the retract space 9013*a* of the inner cylinder 901 are provided at a vertex part of the tapered shape of the bottom portion 9033. The weight member 905 has a spherical shape. The weight member 905 is guided to the bottom portion 9013 and moves to the retract space 9013*a* by gravity.

The piston 902 includes an elastic member 906 attached to an end portion 9023 at one end side (ejection port side) in the axial direction, and a push rib 9021 provided around an end portion 9022 at the other end side (portion where a user pushes at the time of pushing the piston). The elastic member 906 is configured to be in contact with the inner peripheral surface of the toner containing portion 9014 without any gap and has a function to prevent passage of toner at the time of pushing the piston. The push rib 9021 has a protruded shape protruding radially outward from the outer peripheral surface of the piston 902.

The configuration of the shutter member 904 is similar to the shutter member 41 provided in the above-described toner pack 40. In other words, as shown in FIG. 15C, the shutter member 904 has such a shape that part of a disc is cut away and is rotatable relative to the outer cylinder 903. A side surface that forms the thickness of the shutter member 904 at the cutaway portion functions as an engagement surface 904*s*. On the other hand, the outer cylinder 903 also has a shape with a cutout. The outer cylinder 903 has an engagement surface 903*s* parallel to the engagement surface 904*s* at the cutaway portion. The ejection port 9031 is provided at a position spaced apart substantially 180 degrees from the engagement surface 903*s* in the circumferential direction of the outer cylinder 903.

FIG. 15C shows a state where the ejection port 9031 has been already exposed; however, in a state where the toner bottle unit 900 is shipped, the positions of the cutaway engagement surfaces 903*s*, 904*s* of the shutter member 904 and outer cylinder 903 match. In this case, the ejection port 9031 is covered with the shutter member 904, and a sealed state of the toner containing portion 9014 is maintained (closed state). As shown in FIG. 15C, when the shutter member 904 rotates 180 degrees relative to the outer cylinder 903, the ejection port 9031 is exposed via the cutaway portion of the shutter member 904 to release sealing of the toner containing portion 9014, with the result that toner is ejectable (open state). The configurations of the ejection port 9031, engagement surface 903*s*, and shutter member 904 are basically similar to the configurations described in FIG. 7A to FIG. 8C, and FIG. 12.

The memory unit 911 as a storage unit that stores information on the toner bottle unit 900 is attached around the ejection port 9031 in the outer cylinder 903. The memory unit 911 has a plurality of metal plates 9111, 9112, 9113 (FIG. 16A) exposed to the outside of the toner bottle unit 900 as a contact portion 911*a* that contacts with the contact portion 70133 (FIG. 9A) of the supply container mounting portion 701.

(2-2) Push Detection Mechanism for Piston

As shown in FIG. 16A and FIG. 16C, a push detection rod 907, a first contact plate 908, and a second contact plate 909 are disposed between the outer cylinder 903 and the inner cylinder 901 as the push detection mechanism used to detect operation to push the piston 902. The push detection rod 907 is made of an electrically insulating material, such as a resin. The first contact plate 908 and the second contact plate 909 are made of an electrically conductive material, such as a metal. The push detection rod 907 has a contact release portion 9072 at one end side (ejection port side) in the axial direction, and a piston contact portion 9071 at the other end side in the axial direction. The piston contact portion 9071 is able to contact with the push rib 9021 of the piston 902. The push detection rod 907 moves in the axial direction when the piston contact portion 9071 is pushed with the push rib 9021 by operation to push the piston 902.

The push detection rod 907 is fitted in, for example, a groove in the axial direction, formed on the outer peripheral surface of the inner cylinder 901 or the inner peripheral surface of the outer cylinder 903. With this configuration, movement of the push detection rod 907 in a direction perpendicular to the axial direction is restricted, and the push detection rod 907 is held so as to be movable in the axial direction relative to the inner cylinder 901 and the outer cylinder 903. The piston contact portion 9071 has such a shape that the piston contact portion 9071 is bent perpendicularly to the axial direction, that is, in an L-shape. The piston contact portion 9071 is configured such that the push rib 9021 further reliably contacts. In FIG. 16A, the push rib 9021 is provided all around the outer peripheral surface of the piston 902. Alternatively, the push rib 9021 may be formed only at a position in the circumferential direction where the piston contact portion 9071 is placed.

The first contact plate 908 and the second contact plate 909 each are a metal plate that switches between a conductive state and an interrupted state depending on the position of the push detection rod 907 made of an electrically insulating resin. A method of detecting a new toner bottle unit 900 by using the first contact plate 908 and the second contact plate 909 will be described later.

A cylinder cover 910 (FIG. 15A) is provided at the opening portion-side end portion of the outer cylinder 903 to prevent a slip-off of the push detection rod 907. In other words, the cylinder cover 910 that makes up the opening portion 9032 of the outer cylinder 903 is narrowed radially inward (FIG. 15D) as compared to the position of the radially outer end portion of the piston contact portion 9071 (FIG. 16B). Therefore, even when a force is applied to move the push detection rod 907 toward the opening portion side in the axial direction, the piston contact portion 9071 interferes with the cylinder cover 910, and the push detection rod 907 does not slip off from the toner bottle unit 900.

(2-3) Determination as to Whether Toner Bottle Unit is New or Used

Next, a configuration to detect whether a toner bottle unit 900 is unused (new) or used when the toner bottle unit 900 is mounted on the supply container mounting portion 701 will be described. As shown in FIG. 16C and FIG. 16D, the contact release portion 9072 of the push detection rod 907 is located near the first contact plate 908 and the second contact plate 909.

FIG. 16C corresponds to a state before pushing the piston, shown in FIG. 16A, and shows a conductive state where the first contact plate 908 and the second contact plate 909 contact with each other. At this time, one of the first contact plate 908 and the second contact plate 909, made of a metal, may have a leaf spring shape and may be configured to be in pressure contact with the other contact plate. When, for example, electrically conductive grease is applied to contact surfaces of the first contact plate 908 and second contact plate 909 in advance, it is possible to further reliably ensure electrical continuity between the first contact plate 908 and the second contact plate 909.

FIG. 16D corresponds to a state after pushing the piston, shown in FIG. 16B, and shows an interrupted state where the first contact plate 908 and the second contact plate 909 are in an interrupted state. In this state, the contact release portion 9072 of the push detection rod 907 pushed in by the push rib 9021 is placed between the first contact plate 908 and the second contact plate 909 to physically separate the first contact plate 908 and the second contact plate 909 from each other. In the push detection rod 907, at least the contact release portion 9072 is made of an electrically insulating material, and, in the state of FIG. 16D where the contact release portion 9072 is interposed, electrical continuity between the first contact plate 908 and the second contact plate 909 is interrupted.

The first contact plate 908 and the second contact plate 909 are respectively connected to different metal plates among a plurality of metal plates 9111 to 9113 at end portions opposite from the end portions that contact with the contact release portion 9072 of the push detection rod 907. Here, it is assumed that the first contact plate 908 is connected to the metal plate 9111, and the second contact plate 909 is connected to the metal plate 9113. In this case, by detecting whether there is a flow of current at the time of application of a small voltage between the metal plates 9111, 9113, it is possible to determine whether the toner bottle unit 900 is in a state before pushing the piston (unused) or a state after pushing the piston (used). In other words, in a state where the toner bottle unit 900 is mounted on the supply container mounting portion 701, the control unit 90 of the image forming apparatus 1 is capable of determining whether the toner bottle unit 900 is unused or used in accordance with whether there is electrical continuity between the metal plates 9111, 9113. The control unit 90 is able to determine that user's supply operation has completed on condition that the first contact plate 908 and the second contact plate 909 are not electrically continuous. In accordance with this determination, the control unit 90 executes display control over the panel 400, described above. The control unit 90 also writes a new one flag (new: 1, used: 0) in the memory unit 45 in accordance with a change in electrical continuity between the metal plates 9111, 9113. The new one flag indicates whether the toner bottle unit 900 is used.

In the case of the above configuration, the memory unit 911 may be disposed in a circuit connecting the metal plates 9111, 9112. Thus, the control unit 90 of the image forming apparatus 1 is able to monitor operation to push the toner bottle unit 900 via the metal plates 9111, 9113 while accessing the memory unit 911 via the metal plates 9111, 9112 in parallel.

(2-4) Rotation Detection of Toner Bottle Unit

Next, a method of detecting rotation of the toner bottle unit 900 will be described with reference to FIG. 16E and FIG. 16F. The rotation detection method in the present embodiment is similar to the above-described embodiment using the toner pack 40 except that the shutter member 904 used to seal the ejection port of the supply container is provided in the outer cylinder 903 of the toner bottle unit 900.

As shown in FIG. 16E and FIG. 16F, the two conductive leaf springs 70151, 70152 as the rotation detection portion 7015 are disposed in the supply container mounting portion 701 of the process cartridge 20. The protruded portion 70135*b* is provided on the outer peripheral portion of the supply port shutter 7013.

As shown in FIG. 16E, in a state before the toner bottle unit 900 inserted in the supply container mounting portion 701 is rotated, the distal end portion 701521 of the leaf spring 70152 is not in contact with the leaf spring 70151, and the rotation detection portion 7015 is in an interrupted state. In other words, no current flows even when a small voltage is applied between the leaf springs 70151, 70152. As shown in FIG. 16F, when the toner bottle unit 900 is rotated by 180 degrees, the leaf spring 70152 is pushed by the protruded portion 70135*a* and contacts with the other leaf spring 70151 at the distal end portion 701521 into a conductive state. In this state, current flows when a small voltage is applied between the leaf springs 70151, 70152. The control unit 90 of the image forming apparatus 1 recognizes whether the ejection port 9031 of the toner bottle unit 900 and the supply port 8012 of the supply container mounting portion 701 are in communication in accordance with whether the rotation detection portion 7015 is electrically continuous or interrupted.

(2-5) Flow of Supply Operation Using Toner Bottle Unit

A series of operations when the toner bottle unit 900 is mounted on the supply container mounting portion 701, toner is supplied, and then the toner bottle unit 900 is detached will be described. The description of similar portions to those of the above-described embodiment using the toner pack 40 is omitted.

First, a user mounts an unused toner bottle unit 900 on the supply container mounting portion 701. Specifically, the positions of the cutaway engagement surfaces 903*s*, 904*s* (FIG. 15C) of the outer cylinder 903 and shutter member 904 are aligned with the positions of the supply port 8012 and the lid portion 70131 (FIG. 9A) of the supply port shutter 7013, and the toner bottle unit 900 is inserted in the supply container mounting portion 701. Then, the engagement surface 903*s* of the outer cylinder 903 engages with the engagement surface 7013*s* that is the side surface of the lid portion 70131, and the engagement surface 904*s* of the shutter member 904 engages with the engagement surface 8012*s* provided on the outer peripheral portion of the supply port 8012. At this time, the outer cylinder 903 engaged with the lid portion 70131 of the supply port shutter 7013 is not rotatable until the supply port shutter 7013 is unlocked by the locking member 7014 later, and becomes rotatable together with the supply port shutter 7013 as a result of unlocking. On the other hand, the shutter member 904 engages with the supply port 8012 fixed to the frame 8010 of the toner receiving unit 801 and is placed in a non-rotatable state. The leaf springs 70151, 70152 of the rotation detection portion 7015 are spaced apart from each other. The rotation detection portion 7015 is in an interrupted state (FIG. 16E).

When the unused toner bottle unit 900 is inserted in the supply container mounting portion 701, the control unit 90 recognizes that the toner bottle unit 900 is new by using the above-described new one detection configuration. As described above, the control unit 90 may recognize electrical continuity between the metal plates 9111, 9113 or may perform determination by reading the new one flag (new: 1, used: 0) in the memory unit 45. Then, the control unit 90 moves the locking member 7014 to the unlock position by operating the push mechanism 600, with the result that the toner bottle unit 900 is placed in a rotatable state.

After that, when a user holds the toner bottle unit 900 and rotates the toner bottle unit 900 by 180 degrees, the shutter member 904 and the supply port shutter 7013 are opened, and the ejection port 9031 of the toner bottle unit 900 and the supply port 8012 of the supply container mounting portion 701 communicate with each other. The operation of the shutter member 904 and the supply port shutter 7013 to open with rotation of the toner bottle unit 900 is similar to that in the case of the toner pack 40 described with reference to FIG. 10A, FIG. 10B, and FIG. 10C.

As shown in FIG. 16F, when the toner bottle unit 900 is rotated by 180 degrees, the distal end portion 701521 of the leaf spring 70152 pushed by the protruded portion 70135*a* of the supply port shutter 7013 contacts with the other leaf spring 70151. When the rotation detection portion 7015 is placed in a conductive state in this way, the control unit 90 of the image forming apparatus 1 detects that operation to rotate the toner bottle unit 900 has been made. In other words, the control unit 90 recognizes that sealing by the shutter member 904 and the supply port shutter 7013 is released and the ejection port 9031 of the toner bottle unit 900 and the supply port 8012 of the supply container mounting portion 701 are in communication. The control unit 90 moves the locking member 7014 to the lock position by operating the push mechanism 600, with the result that rotation of the toner bottle unit 900 is restricted.

Subsequently, the user starts ejecting toner by pushing the piston 902 of the toner bottle unit 900. Toner fallen to the toner containing portion 8011 is conveyed inside the toner receiving unit 801 to reach the developer container 32. In the present modification example as well, when the piston 902 is pushed to the end, completion of operation to push the piston 902 is detected by the above-described push detection mechanism. In other words, as shown in FIG. 16B, when the push rib 9021 of the piston 902 pushes the piston contact portion 9071 of the push detection rod 907, the push detection rod 907 moves with the piston 902. As shown in FIG. 16D, the contact release portion 9072 of the push detection rod 907 interrupts electrical continuity between the first contact plate 908 and the second contact plate 909. The control unit 90 of the image forming apparatus 1 recognizes completion of pushing the piston 902 in accordance with the fact that no current flows even when a voltage is applied between the metal plate 9111 connected to the first contact plate 908 and the metal plate 9113 connected to the second contact plate 909. In other words, in the case of the present modification example, detecting completion of operation to push the piston 902 with the push detection mechanism is a condition to determine completion of ejection of toner. As another configuration example, the control unit 90 may be configured to rewrite the new one flag in the memory unit 911 when electrical continuity between the first contact plate 908 and the second contact plate 909 is interrupted, and may determine completion of ejection of toner on condition that the new one flag has been rewritten.

The control unit 90 that has detected completion of ejection of toner from the toner bottle unit 900 operates the push mechanism 600 again to move the locking member 7014 to the unlock position and places the toner bottle unit 900 in a rotatable state. The user holds the toner bottle unit 900 and rotates the toner bottle unit 900 by 180 degrees. Then, the ejection port 9031 of the toner bottle unit 900 is covered with the shutter member 904, and the supply port 8012 of the supply container mounting portion 701 is covered with the lid portion 70131 of the supply port shutter 7013. As shown in FIG. 16E, the leaf springs 70151, 70152 separate from each other, and the rotation detection portion 7015 returns to an interrupted state. Then, the control unit 90 recognizes that the supply port shutter 7013 is closed, and causes the push mechanism 600 to operate to move the locking member 7014 to the lock position. Thus, the supply container mounting portion 701 returns to an initial state before toner supply.

(3) Second Modification Example

Next, a mode of a second modification example in which the configuration of the process cartridge is different will be described. The present modification example includes components common to those of the first embodiment in portions other than the configuration related to the process cartridge, so the description of the common portions is omitted.

(3-1) Process Cartridge

Figure 17A:
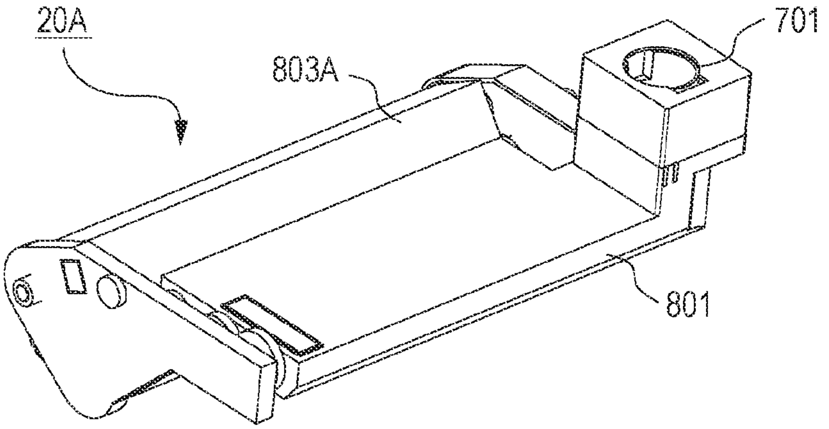
FIG. 17A is a perspective view of a process cartridge according to a second modification example.
Figure 17B:
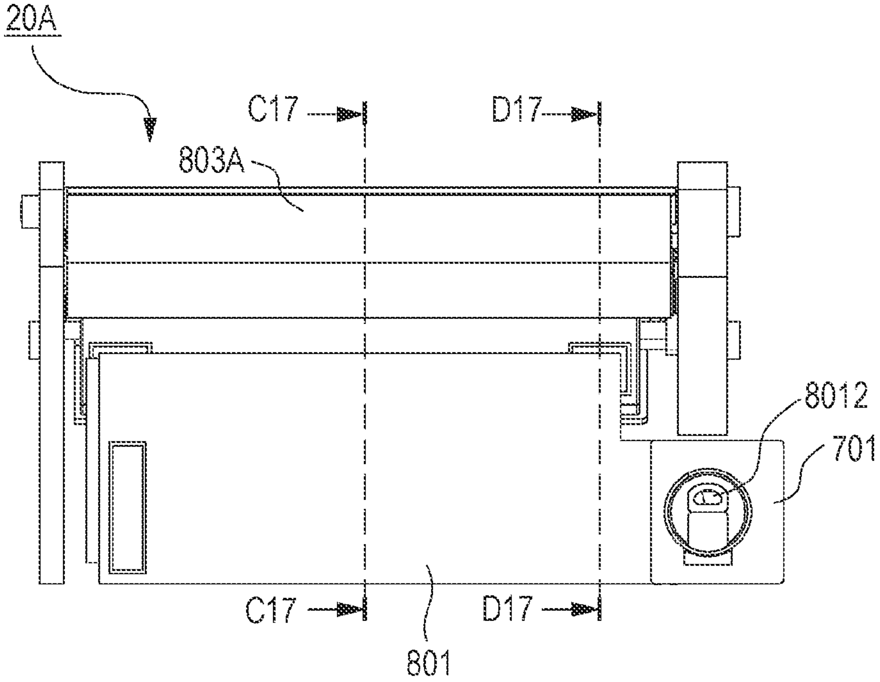
FIG. 17B is a top view of the process cartridge according to the second modification example.
Figure 17C:
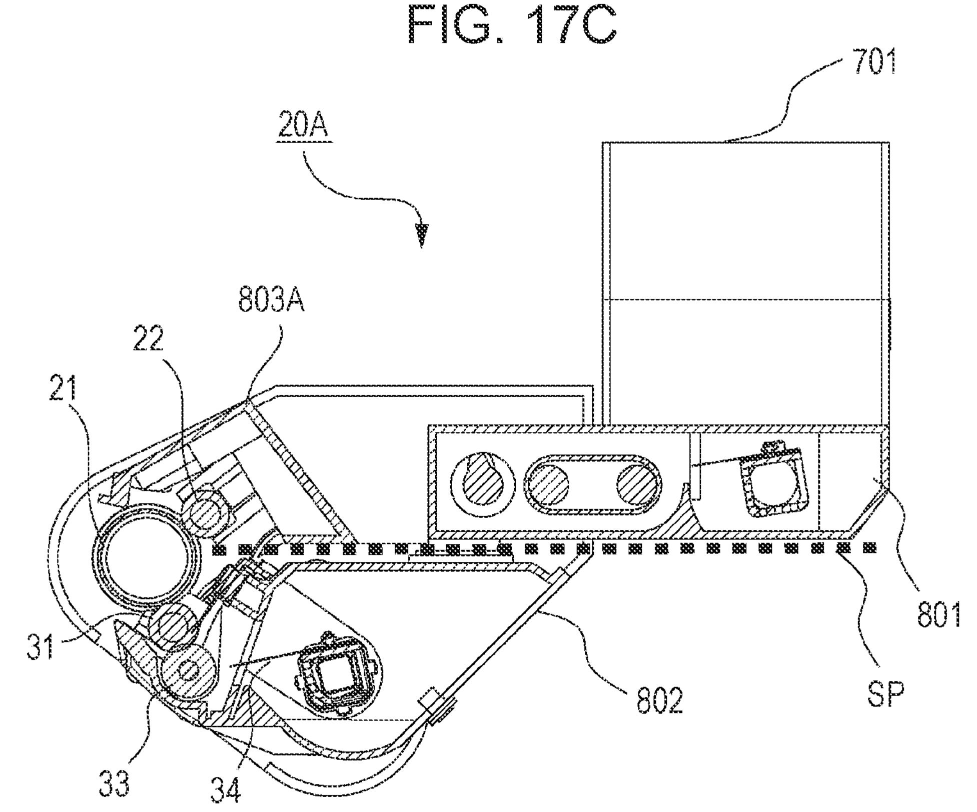
FIG. 17C and FIG. 17D are cross-sectional views of the process cartridge according to the second modification example.
Figure 17D:
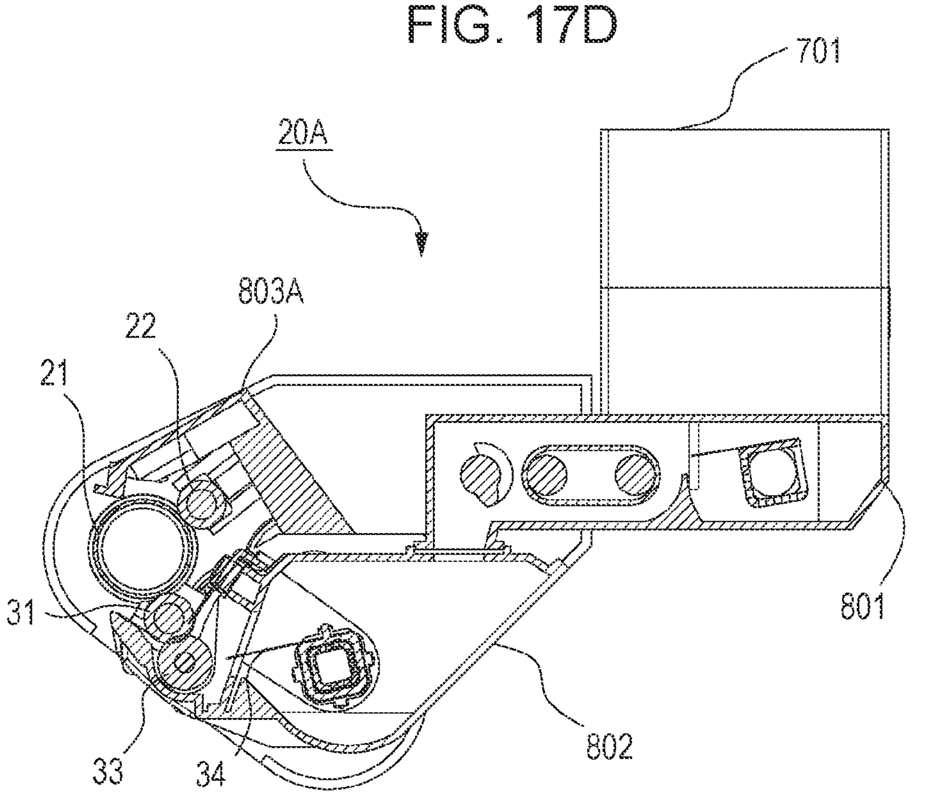

FIG. 17A is a perspective view of a process cartridge 20A according to the present modification example. FIG. 17B is a top view of the process cartridge 20A according to the present modification example. FIG. 17C is a cross-sectional view of the process cartridge 20A according to the present modification example. FIG. 17D is a cross-sectional view of the process cartridge 20A according to the present modification example. FIG. 17C shows a cross-sectional view taken along the line C17-C17 in FIG. 17B. FIG. 17D is a cross-sectional view taken along the line D17-D17 in FIG. 17B.

As shown in FIG. 17A to FIG. 17D, the process cartridge 20A of the present modification example is made up of the toner receiving unit 801, the developing unit 802, and a drum unit 803A. In comparison with the first embodiment, the drum unit 803A does not include the cleaning blade 24 for cleaning the surface of the photosensitive drum 21 or the waste toner chamber 8033 (see FIG. 6A) for containing waste toner. This is because the present modification example adopts a cleanerless configuration in which residual toner not transferred to a recording medium and remaining on the surface of the photosensitive drum 21 is collected and reused by the developing unit 802. Here, it is also assumed that, for example, a non-magnetic or magnetic single-component developer is used.

In the illustrated example, the developing unit 802 is located below the process cartridge 20A, and the toner receiving unit 801 and the drum unit 803A are located above the developing unit 802 in the gravitational direction. As shown in FIG. 17B, the positions of the toner receiving unit 801 and drum unit 803A do not overlap each other when viewed in the gravitational direction; however, the toner receiving unit 801 and the drum unit 803A may be at least partially disposed one above the other. The toner receiving unit 801 is disposed in the space where the cleaning blade 24 and the waste toner chamber 8033 are provided in the first embodiment. The configuration of the supply container mounting portion 701 provided in the toner receiving unit 801 is common to that of the first embodiment, and FIG. 17A to FIG. 17D show a simplified shape.

A laser passage space SP as an air gap through which laser light L emitted from the scanner unit 11 (FIG. 1A) toward the photosensitive drum 21 is able to pass is formed between the developing unit 802 and both the drum unit 803A and the toner receiving unit 801. A pre-exposure apparatus may be disposed in the drum unit 803A downstream of the transfer portion in the rotational direction of the photosensitive drum 21 between the transfer portion and the charge roller 22. The pre-exposure apparatus erases an electrostatic latent image by irradiating light to the surface of the photosensitive drum 21.

(3-2) Behavior of Toner in Cleanerless Configuration

The behavior of toner in the cleanerless configuration will be described. Residual toner remaining on the photosensitive drum 21 in the transfer portion is removed in the following process. Residual toner mixedly includes toner charged with positive polarity and toner charged with negative polarity but not carrying sufficient amount of charge. When charge on the photosensitive drum 21 after transfer is eliminated by the pre-exposure apparatus and then uniform discharge is generated by the charge roller 22, residual toner is charged with negative polarity again. Residual toner charged with negative polarity again in a charging portion reaches the developing unit again with rotation of the photosensitive drum 21. Then, a surface region of the photosensitive drum 21, having passed through the charging portion, is exposed to light by the scanner unit 11 while residual toner adheres to the surface, with the result that an electrostatic latent image is written.

Here, the behavior of residual toner that has reached the developing unit will be described separately for an exposed area and a non-exposed area of the photosensitive drum 21. Residual toner adhering to the non-exposed area of the photosensitive drum 21 transfers to the developing roller 31 by a potential difference between a developing voltage and a potential of the non-exposed area (dark area potential) of the photosensitive drum 21 in the developing unit, and is collected into the developer container 32. This is because, on the assumption that the normal charge polarity of toner is negative polarity, a developing voltage to be applied to the developing roller 31 is positive relative to the potential of the non-exposed area. Toner collected into the developer container 32 is agitated together with toner in the developer container 32 by the agitating member 34 to be dispersed and is used again in the developing process when carried on the developing roller 31.

On the other hand, residual toner adhering to the exposed area of the photosensitive drum 21 does not transfer from the photosensitive drum 21 to the developing roller 31 in the developing unit and remains on the drum surface. This is because, on the assumption that the normal charge polarity of toner is negative polarity, a developing voltage to be applied to the developing roller 31 is a potential further more negative than the potential of the exposed area (light area potential). Residual toner remaining on the drum surface is carried on the photosensitive drum 21 together with other toner that transfers from the developing roller 31 to the exposed area, moves to the transfer portion, and is then transferred to a recording medium in the transfer portion.

With the cleanerless configuration, no installation space for a collecting container for collecting residual toner or the like is used, so further reduction in the size of the image forming apparatus 1 is possible, and, in addition, reduction in printing cost is achieved by reusing residual toner.

(4) Third Modification Example

Next, a third modification example in which the configuration of the process cartridge is different from any one of the above-described modes will be described. The present modification example includes components common to those of the first embodiment in portions other than the configuration related to the process cartridge, so the description of the common portions is omitted.

(4-1) Third Mode of Process Cartridge

Figure 18A:
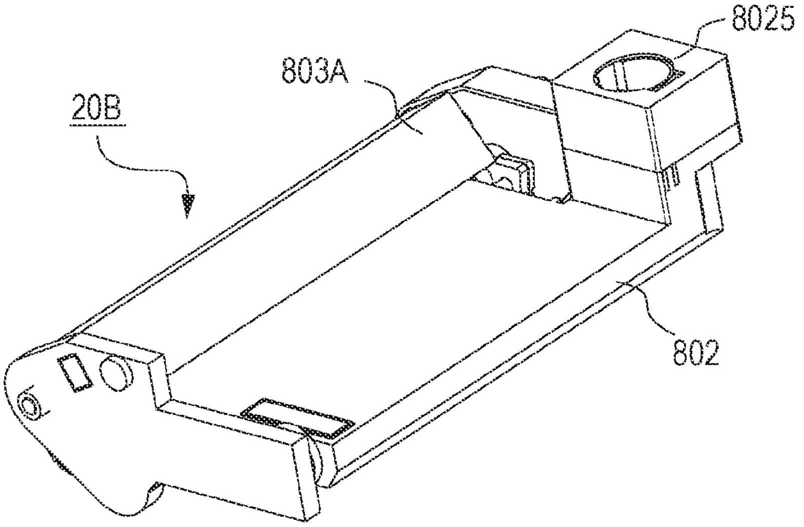
FIG. 18A is a perspective view of a process cartridge according to a third modification example.
Figure 18B:
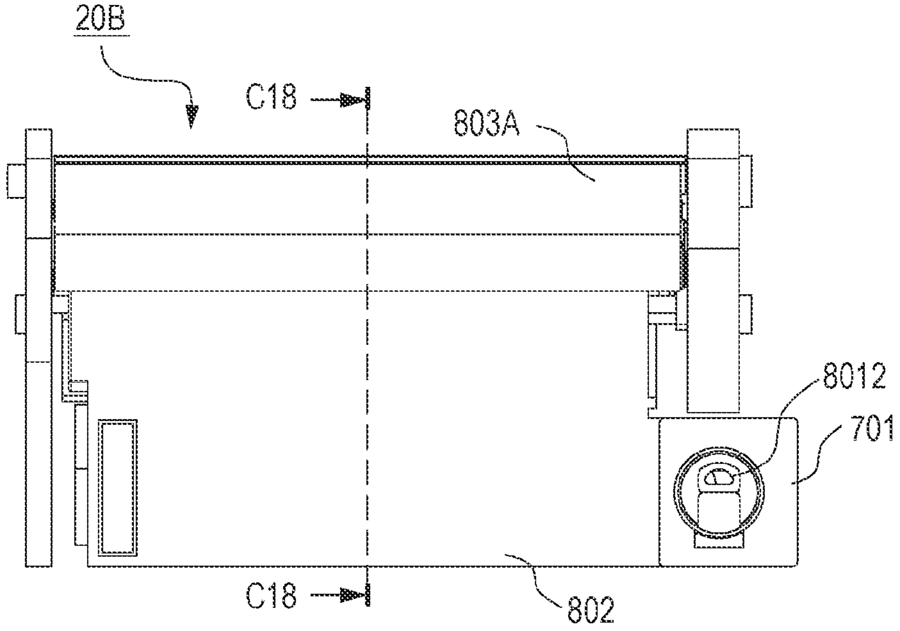
FIG. 18B is a top view of the process cartridge according to the third modification example.
Figure 18C:
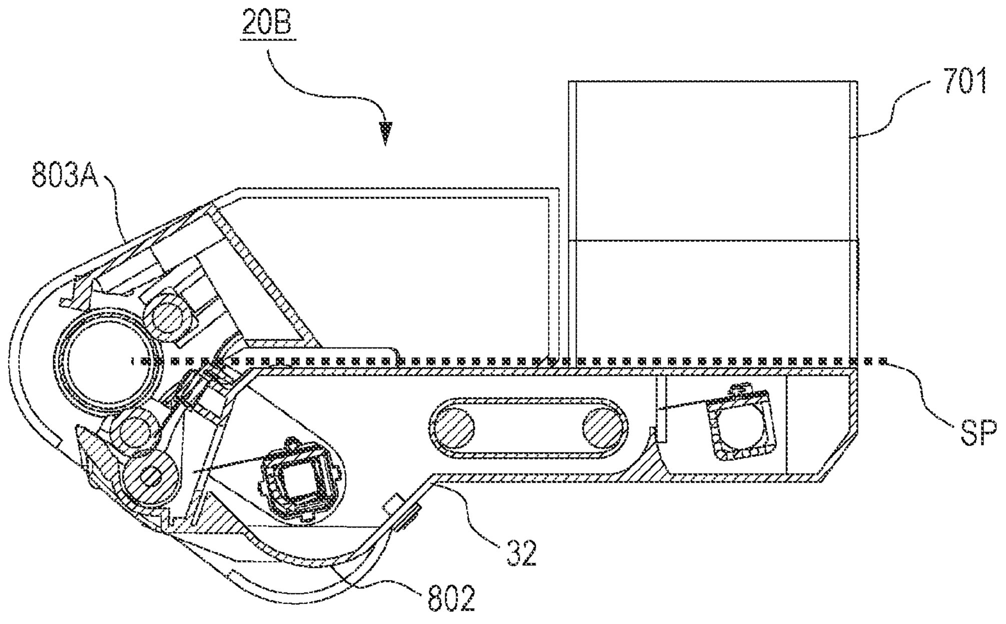
FIG. 18C is a cross-sectional view of the process cartridge according to the third modification example.

FIG. 18A is a perspective view of a process cartridge 20B according to the present modification example. FIG. 18B is a top view of the process cartridge 20B according to the present modification example. FIG. 18C is a cross-sectional view of the process cartridge 20B according to the present modification example. FIG. 18C shows a cross-sectional view taken along the line C18-C18 in FIG. 18B.

As shown in FIG. 18A to FIG. 18C, the process cartridge 20B of the present modification example is made up of the developing unit 802 and the drum unit 803A. In comparison with the third embodiment, the supply container mounting portion 701, the first conveyance member 8013, and the second conveyance member 8014 are disposed in the developing unit 802 in substitute for omission of the toner receiving unit 801. In other words, in the present modification example, toner is supplied by mounting the supply container, such as the toner pack 40 and the toner bottle unit 900, from the outside of the image forming apparatus 1 to the supply port 8012 provided in the developer container 32. The configuration of the supply container mounting portion 701 is common to that of the first embodiment, and a simplified shape is shown in the drawings.

A laser passage space SP as an air gap through which laser light L emitted from the scanner unit 11 (FIG. 1A) toward the photosensitive drum 21 is able to pass is formed between the developing unit 802 and the drum unit 803A. A pre-exposure apparatus may be disposed in the drum unit 803A downstream of the transfer portion in the rotational direction of the photosensitive drum 21 between the transfer portion and the charge roller 22. The pre-exposure apparatus erases an electrostatic latent image by irradiating light to the surface of the photosensitive drum 21. The present modification example adopts a cleanerless configuration. Since the behavior of toner in the cleanerless configuration is similar to that of the second modification example, the description is omitted.

(5) Control System of Image Forming Apparatus

Figure 19:
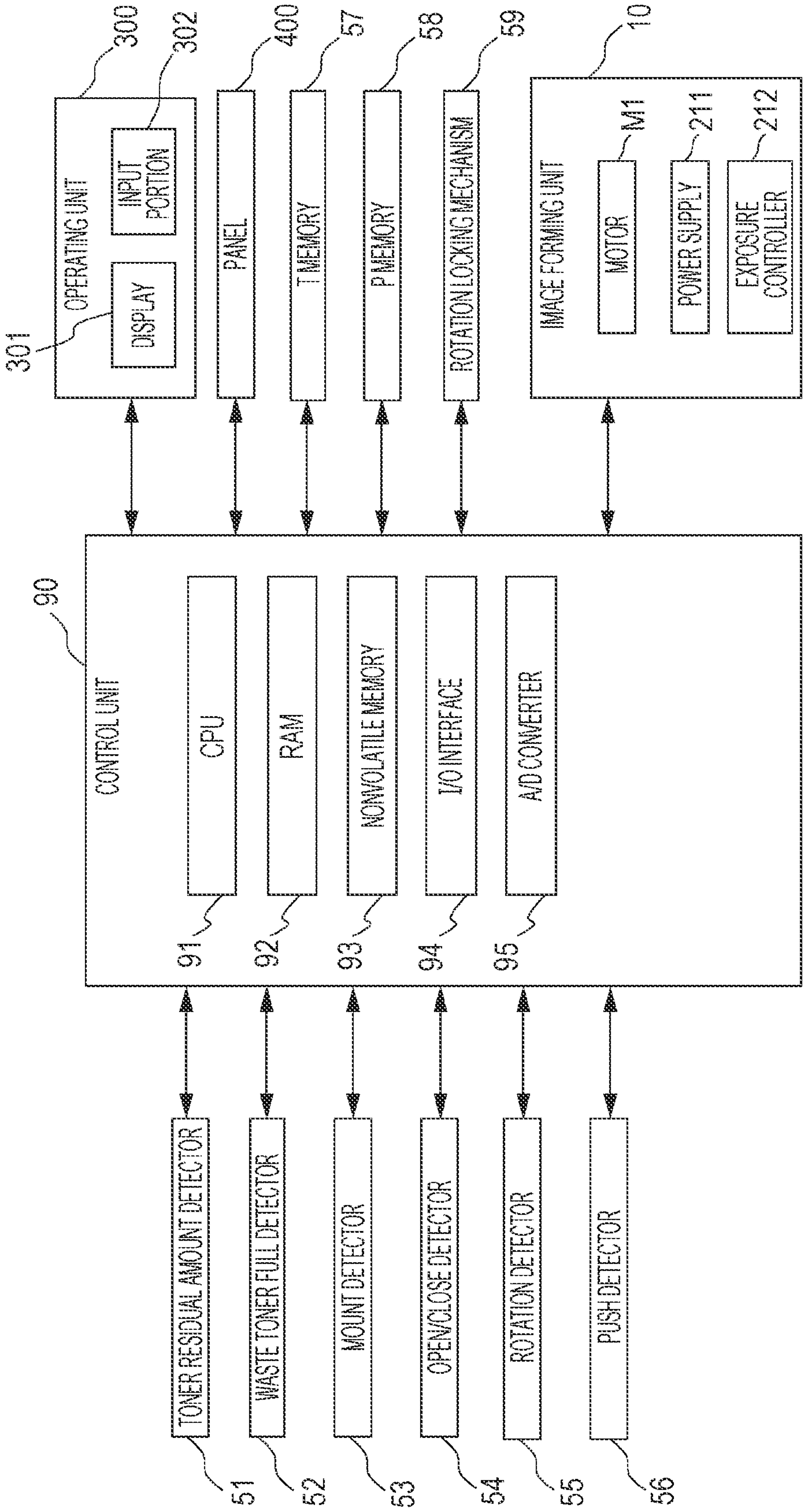
FIG. 19 is a block diagram showing a control system of the image forming apparatus according to the first embodiment.

FIG. 19 is a block diagram showing a control system of the image forming apparatus 1 according to the first embodiment. The control unit 90 as a controller of the image forming apparatus 1 includes a CPU 91 as a calculation unit, RAM 92 used as a working area for the CPU 91, and non-volatile memory 93 that stores various programs. The control unit 90 also includes an I/O interface 94 as an input/output port to be connected to external devices, and an A/D converter 95 that converts an analog signal to a digital signal. The CPU 91 controls various portions of the image forming apparatus 1 by reading and running control programs stored in the non-volatile memory 93. Therefore, the non-volatile memory 93 is an example of a non-transitory storage medium storing a control program for operating an image forming apparatus with a specified method.

T memory 57 and P memory 58 are connected to the control unit 90. The T memory 57 is a non-volatile memory mounted on the supply container, such as the toner pack 40 and the toner bottle unit 900. The P memory 58 is a non-volatile memory mounted on the process cartridge 20. Examples of the T memory 57 as a storage unit provided in the supply container include the memory unit 45 mounted on the above-described toner pack 40 and the memory unit 911 mounted on the above-described toner bottle unit 900. The T memory 57 also stores toner information indicating that toner contained in the supply container, such as the toner pack 40 and the toner bottle unit 900, can be supplied to the developer container 32. Toner information is information indicating, for example, whether the toner pack 40 is in an unused state, an initial amount of toner, an expiration date, and the like. The P memory 58 stores a residual amount of toner contained in the developer container 32, a total amount of toner ever supplied from the supply container, information on a photosensitive member lifetime, information on replacement timing of the process cartridge 20, and the like.

In addition, a rotation locking mechanism 59 and the image forming unit 10 are connected to the control unit 90. Examples of the rotation locking mechanism 59 include the locking member 7014 (FIG. 9A, FIG. 9B, FIG. 11A, and FIG. 11B) provided in the supply container mounting portion 701, and the push mechanism 600 (FIG. 13) for moving the locking member 7014. The image forming unit 10 includes a motor M1 as a driving source for driving the photosensitive drum 21, the developing roller 31, the supply roller 33, the agitating member 34, and the like. The driving source for these rotary members is not necessarily one and the same. For example, a set of the photosensitive drum 21, the developing roller 31, and the supply roller 33, and the agitating member 34 may be configured to be respectively driven by different motors. The image forming unit 10 also includes a power supply 211 for applying voltage to the members such as the developing roller 31, and an exposure controller 212 that controls the scanner unit 11.

A toner residual amount detector 51, a waste toner full detector 52, a mount detector 53, an open/close detector 54, a rotation detector 55, and a push detector 56 are connected to the input side of the control unit 90.

The toner residual amount detector 51 detects the residual amount of toner contained in the developer container 32. An example of the toner residual amount detector 51 is the optical sensor (51*a*, 51*b*) shown in FIG. 6A. The optical sensor includes a light emitting portion 51*a* that irradiates detection light toward the inside of the developer container 32, and a light receiving portion 51*b* that detects the detection light. In this case, the percentage (duty) of a period during which the optical path of detection light is blocked by toner to a rotation period at which the agitating member 34 rotates correlates with a toner residual amount in the developer container 32. When a correspondence relationship between a duty value and a toner residual amount is prepared in advance by using this correlation, a toner residual amount is obtained from a current duty value. Such an optical sensor is an example of the toner residual amount detector 51. Alternatively, a pressure-sensitive sensor or an electrostatic capacitance sensor may be used. The waste toner full detector 52 detects a situation in which the amount of waste toner accumulated in the waste toner chamber 8033 (FIG. 6A) of the cleaning unit 803 has reached a predetermined upper limit. For example, a pressure-sensitive sensor disposed in the waste toner chamber 8033 may be used as the waste toner full detector 52. On the assumption that a predetermined percentage of image information is collected as waste toner, the control unit 90 may estimate a waste toner amount from image information.

The mount detector 53 detects a situation in which the supply container, such as the toner pack 40, is mounted on the supply container mounting portion 701. The mount detector 53 is provided in, for example, the supply container mounting portion 701 and is made up of a pressure-sensitive switch that outputs a detection signal when pressed by the bottom surface of the toner pack 40. The mount detector 53 may be a detection circuit that detects a situation in which the T memory 57 is electrically connected to the control unit 90 via the contact portion 70133 (FIG. 9A and FIG. 9B) of the supply container mounting portion 701.

The rotation detector 55 detects rotation of the supply container mounted on the supply container mounting portion 701. An example of the rotation detector 55 is the rotation detection portion 7015 made up of the leaf springs 70151, 70152 (FIG. 9A, FIG. 9B, FIG. 16E, and FIG. 16F). The rotation detection portion 7015 is an example of the rotation detector 55. For example, a photoelectric sensor that is shielded from light by a protruded portion provided on the supply port shutter 7013 may be used as a rotation detection sensor. As another example of the rotation detection sensor, the leaf springs 70151, 70152 of the rotation detection portion 7015 may be configured to be electrically continuous by a protruded portion provided at the ejection portion 42 of the toner pack 40.

The push detector 56 is an element that is added when the toner bottle unit 900 of the first modification example is used, and detects completion of pushing the piston 902 of the toner bottle unit 900. An example of the push detector 56 is a detection circuit provided in the image forming apparatus 1, and detects a change in the state of the push detection mechanism (FIG. 16A to FIG. 16F) made up of the push detection rod 907, the first contact plate 908, and the second contact plate 909, provided in the toner bottle unit 900. The detection circuit detects whether the piston 902 is not yet pushed or has been pushed by monitoring a current value at the time when a voltage is applied between the metal plates 9111, 9113 respectively connected to the first contact plate 908 and the second contact plate 909.

The operating unit 300 that is a user interface of the image forming apparatus 1 and the panel 400 as a notification device (information device) that notifies a user of information on a toner residual amount in the developer container 32 are connected to the control unit 90. Information on a toner residual amount is not limited to indicating a toner residual amount itself. Other than that, information on a toner residual amount also includes information indicating how much toner has been supplied by using the toner pack 40 or the toner bottle unit 900. Information on a toner residual amount also includes information indicating an available capacity of the developer container 32, which means how many toner packs 40 or toner bottle units 900 can be used to supply toner.

The operating unit 300 includes a display 301 that is capable of displaying various setting screens. The display 301 is made up of, for example, a liquid crystal panel. The operating unit 300 includes an input portion 302 for accepting input operation from a user. The input portion 302 is made up of, for example, a physical button or a touch panel functional portion of a liquid crystal panel. The control unit 90 is further connected to external devices, such as a desktop computer and a smartphone, via the I/O interface 94.

(6) Configuration for Restricting Rotation of Supply Port Shutter

As described above, the supply port shutter 7013 rotatably attached to the supply port 8012 and the locking member 7014 used to restrict rotation of the supply port shutter 7013 are provided around the supply port 8012.

The locking member 7014 is movable between the lock position (restricted position) as a first position and the unlock position (allowed position) as a second position. When the locking member 7014 is at the lock position, rotation of the supply port shutter 7013 is restricted. When the locking member 7014 is at the unlock position, rotation of the supply port shutter 7013 is allowed. Supply of toner to the process cartridge 20 is allowed via the supply port 8012.

Unlock operation of the locking member 7014 is performed by the control unit 90 operating the push mechanism 600 to push the pivot shaft 7014*a* of the locking member 7014 with the advancing/retracting pin 604 of the push mechanism 600 (see FIG. 13).

The amount of toner that can be contained in the process cartridge 20 is limited. Therefore, when toner is supplied from the supply container (the toner pack 40 or the toner bottle unit 900) in a state where, for example, the toner amount in the developer container 32 is a Full level (first state), toner may clog in the supply port 8012. For this reason, supplying toner from the supply container over the amount of toner that can be contained in the process cartridge 20 is restricted. Hereinafter, a configuration for restricting rotation of the supply port shutter 7013 by using the toner pack 40 will be described. The content of the following description is similar even when the toner bottle unit 900 is used instead of the toner pack 40.

In the image forming apparatus 1 according to the present embodiment, when the toner pack 40 is mounted, whether to unlock the locking member 7014 is determined in accordance with whether the process cartridge 20 allows supply of toner. More specifically, when a toner amount detected by the optical sensor (51*a*, 51*b*) as an example of the toner residual amount detector (residual amount detection portion)

51 is less than a predetermined amount, the control unit 90 performs unlock operation of the locking member 7014. On the other hand, when a toner amount detected by the optical sensor (51*a*, 51*b*) is greater than or equal to the predetermined amount, the control unit 90 does not perform unlock operation of the locking member 7014. As a result, when a toner amount detected by the optical sensor (51*a*, 51*b*) is greater than or equal to the predetermined amount, the supply port shutter 7013 remains locked by the locking member 7014.

Information on the amount of toner contained in the process cartridge 20 may be stored in the P memory 58, and the control unit 90 may be configured to, when the toner pack 40 is mounted, read the information. In this case as well, the control unit 90 is able to determine whether to unlock the locking member 7014 in accordance with the information stored in the P memory 58. Information on the amount of toner contained in the process cartridge 20 includes a detection result of the amount of toner detected by the toner residual amount detector 51, a predicted value of toner consumed in printing or the like, and other information.

In any case, the control unit 90 performs unlock operation of the locking member 7014 only when the control unit 90 determines that the amount of toner contained in the process cartridge 20 is less than an amount by which supply from the toner pack 40 is allowed (first amount).

As described above, the process cartridge 20 includes the supply container mounting portion 701. Therefore, the toner pack 40 is able to be mounted on the supply container mounting portion 701 in a state where the process cartridge 20 is detached from the printer main body 100.

In a state where the process cartridge 20 is mounted on the printer main body 100, the control unit 90 determines whether to unlock the locking member 7014 in accordance with the amount of toner contained in the process cartridge 20. Therefore, in a state where the process cartridge 20 does not allow supply of toner from the toner pack 40, the locking member 7014 is not unlocked. However, in a state where the process cartridge 20 is detached from the printer main body 100, the control unit 90 is not able to determine whether to unlock the locking member 7014.

On the other hand, when a user is able to touch the locking member 7014 in a state where the process cartridge 20 is detached from the printer main body 100, the locking member 7014 can be unlocked by the user.

In other words, even in a state where supply of toner from the toner pack 40 should be restricted, toner can be supplied from the toner pack 40 to the process cartridge 20. As a result, the supply port 8012 of the process cartridge 20 may be clogged with toner.

For this reason, unlocking the locking member 7014 in a state where the process cartridge 20 is detached from the printer main body 100 of the image forming apparatus 1 (hereinafter, referred to as detached state) is prevented. Hereinafter, the configuration of the process cartridge (cartridge) 20 for preventing the locking member 7014 from being unlocked in the detached state will be described.

(7) Fourth Modification Example

A fourth modification example in which a configuration for locking the supply port shutter 7013 is different will be described with reference to FIG. 20A to FIG. 21B. With the configuration of the present modification example, when supply of toner from the supply container (the toner pack 40 or the toner bottle unit 900) should be restricted, supply of toner to the process cartridge 20 is prevented. In addition, with the configuration of the present modification example, in a state where the process cartridge 20 is detached from the printer main body 100, supply of toner from the supply container (the toner pack 40 or the toner bottle unit 900) is restricted.

Figure 20A:
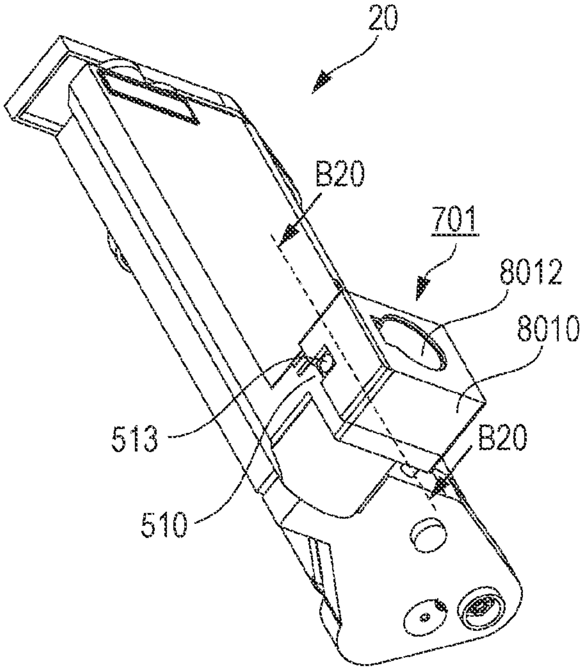
FIG. 20A to FIG. 20D are views illustrating a locking apparatus according to a fourth modification example.
Figure 20B:
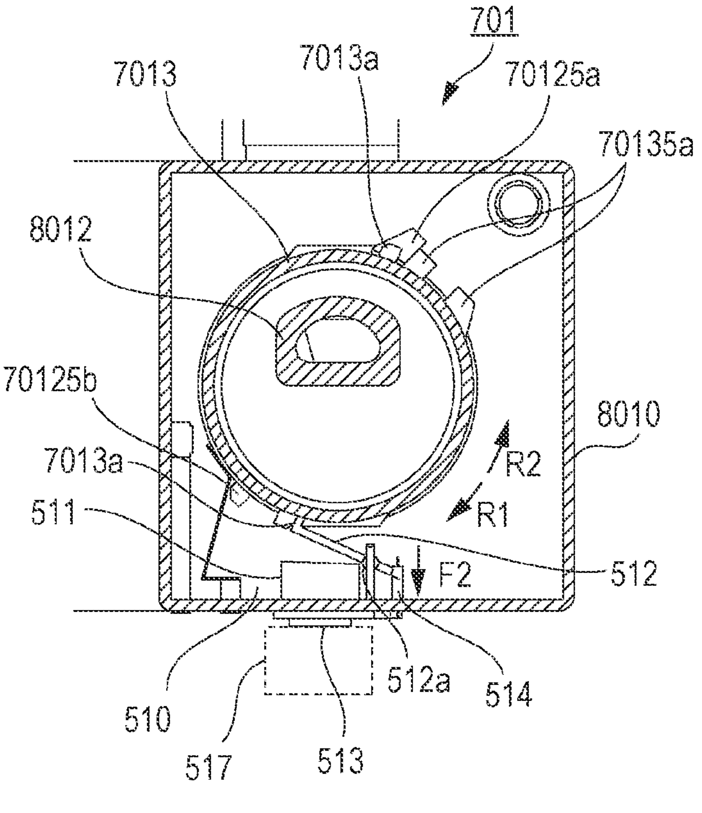
Figure 20C:
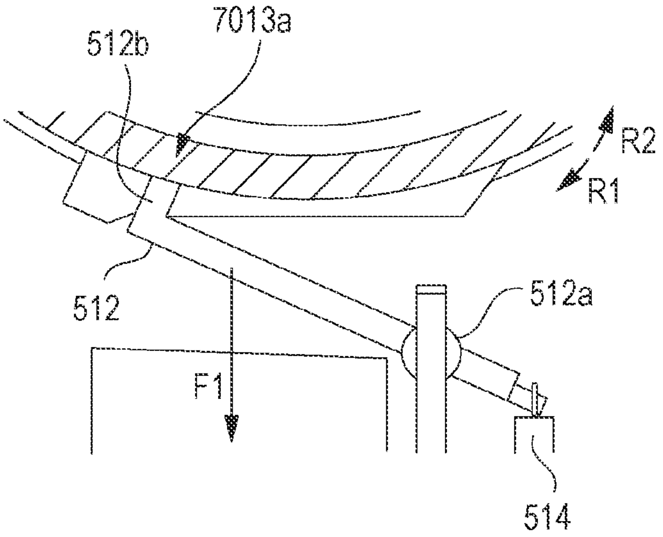
Figure 20D:
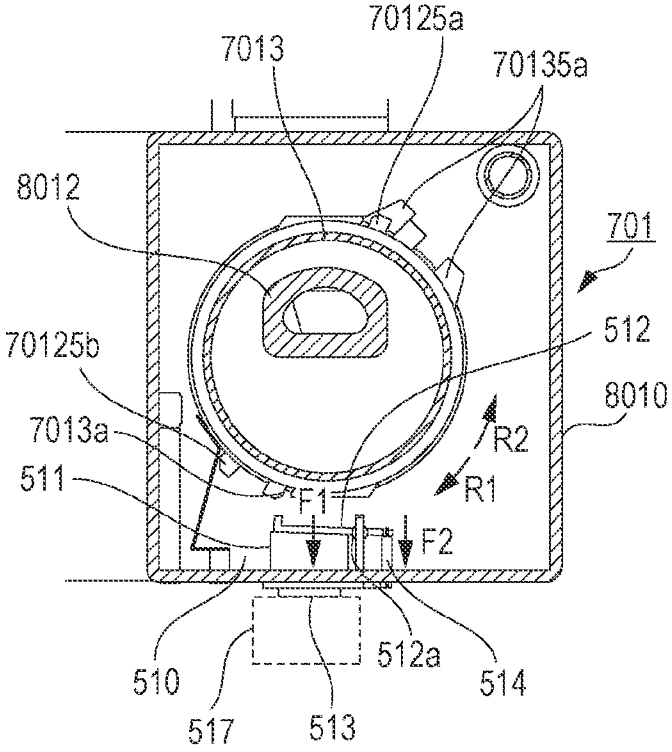

FIG. 20A to FIG. 20D are views illustrating a locking apparatus 510 according to the present modification example. FIG. 20A is a perspective view of the process cartridge 20. FIG. 20B is a cross-sectional view of the supply container mounting portion 701. FIG. 20C is an enlarged view showing the locking apparatus 510. FIG. 20D is a cross-sectional view of the supply container mounting portion 701. FIG. 20B is a cross-sectional view of the supply container mounting portion 701, taken along the line B20-B20 in FIG. 20A. FIG. 20D is a cross-sectional view of the supply container mounting portion 701, taken along the line B20-B20 in FIG. 20A. FIG. 20B and FIG. 20C are views showing a state where the locking apparatus 510 locks the supply port shutter 7013. FIG. 20D shows a state where the locking apparatus 510 is unlocked. In FIG. 20B, FIG. 20C, and FIG. 20D, the supply port shutter 7013 is closed.

Figure 21A:
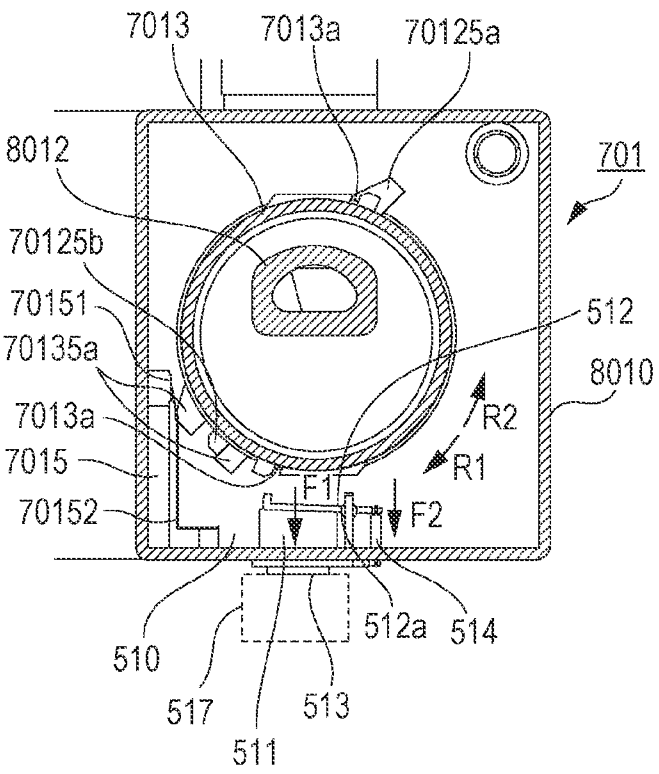
FIG. 21A and FIG. 21B are views illustrating the locking apparatus according to the fourth modification example.
Figure 21B:
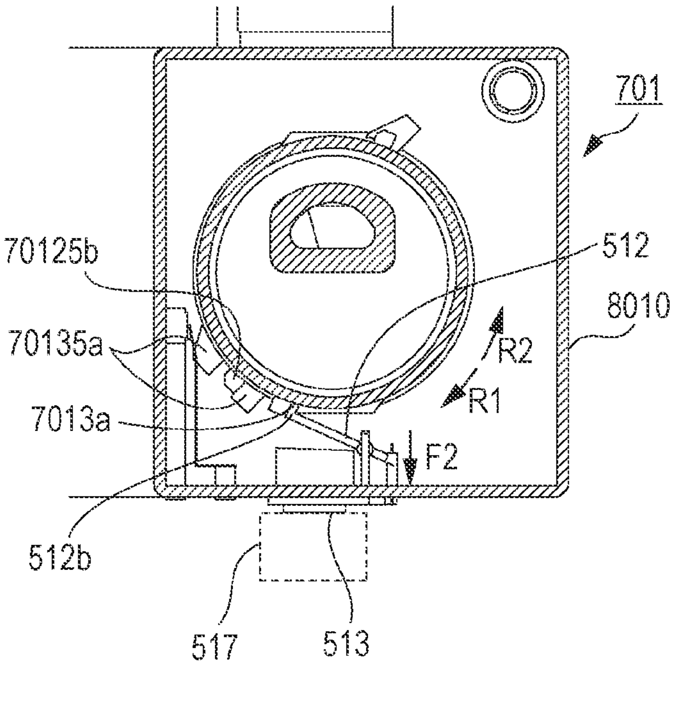

FIG. 21A and FIG. 21B are views illustrating the locking apparatus 510 according to the present modification example. FIG. 21A and FIG. 21B are cross-sectional views of the supply container mounting portion 701. FIG. 21A is a cross-sectional view when the locking apparatus 510 is unlocked and the supply port shutter 7013 is open. FIG. 21B is a cross-sectional view when the locking apparatus 510 is locked and the supply port shutter 7013 is open. FIG. 21A is a cross-sectional view of the supply container mounting portion 701, taken along the line B20-B20 in FIG. 20A. FIG. 21B is a cross-sectional view of the supply container mounting portion 701, taken along the line B20-B20 in FIG. 20A.

As shown in FIG. 20A, the process cartridge 20 includes the locking apparatus 510 that uses a solenoid. The locking apparatus 510 includes a locking plate 512 as a locking member, a coil portion 511 as a movement portion for moving the locking plate 512, and an electrode (terminal) 513 as a receiving portion. The locking apparatus 510 further includes a spring 514 as an urging member that urges the locking plate 512. The electrode 513 and the coil portion 511 are electrically connected.

The locking plate 512 is covered with the frame 8010 and cannot be accessed from the outside of the process cartridge 20. Here, the frame 8010 may be regarded as part of the process cartridge 20 or part of the frame of the developing unit 802. Therefore, in a state where the process cartridge 20 is detached from the printer main body 100, a user is not able to access the locking plate 512. On the other hand, the electrode 513 is exposed from the frame 8010 and is configured to be in contact with a supply portion 517 (described later).

As shown in FIG. 20B and FIG. 20C, the locking plate 512 is supported by a fulcrum 512*a* and is urged by the spring 514 that is a tension spring. Thus, the locking plate 512 is located at a position in which the locking plate 512 restricts rotation of the supply port shutter 7013 (the restricted position, the lock position). In other words, the spring 514 urges the locking plate 512 from the position where rotation of the supply port shutter 7013 is allowed (unlock position) toward the restricted position.

As described above, the process cartridge 20 includes the supply container mounting portion (mounting portion) 701 on which the supply container (the toner pack 40 or the toner bottle unit 900) is mounted, and the supply port 8012 for receiving toner supplied from the supply container. The process cartridge 20 further includes the movable supply port shutter (shutter member) 7013 that covers the supply port 8012.

The supply port shutter 7013 is configured to be movable between a position where the supply port shutter 7013 covers the supply port 8012 (first position, and the closed position) and a position where the supply port shutter 7013 retracts from the supply port 8012 (the second position, and the open position). When the supply port shutter 7013 is located at the position where the supply port shutter 7013 retracts from the supply port 8012 (second position), the supply port 8012 is exposed, and supply of toner from the supply container to the process cartridge 20 via the supply port 8012 is allowed. A state where the supply port shutter 7013 is located at the first position is the closed state of the supply port shutter 7013. A state where the supply port shutter 7013 is located at the second position is the open state of the supply port shutter 7013.

The locking plate 512 has a hook portion 512*b*. The supply port shutter 7013 has engaged portions 7013*a*. The engaged portions 7013*a* are provided at two portions. As will be described later, one of the engaged portions 7013*a* is configured to engage with the hook portion 512*b* when the supply port shutter 7013 is closed. The other one of the engaged portions 7013*a* is configured to engage with the hook portion 512*b* when the supply port shutter 7013 is open.

As shown in FIG. 20C, when the supply port shutter 7013 is closed and the locking plate 512 is at the lock position, the hook portion 512*b* engages with the engaged portion 7013*a*. At this time, the supply port shutter 7013 is in a state where both rotation in the direction of the arrow R1 and rotation in the direction of the arrow R2 are restricted (FIG. 20B). In other words, in this state, movement of the supply port shutter 7013 from the first position toward the second position is restricted.

On the other hand, the printer main body 100 of the image forming apparatus 1 includes the supply portion 517. When the process cartridge 20 is mounted on the printer main body 100, the supply portion 517 is configured to be in contact with the electrode 513. The electrode 513 is configured to receive electric power from the supply portion 517 of the printer main body 100. As will be described later, the locking plate 512 moves from the lock position to the unlock position by using electric power supplied from the supply portion 517 of the printer main body 100 to the electrode 513.

Current from the printer main body 100 flows to the electrode 513 via the supply portion 517. The electrode 513 is electrically connected to the coil portion 511. Therefore, current having flowed through the electrode 513 is transmitted to the coil portion 511. When current flows through the coil portion 511, a magnetic field is generated in the coil portion 511. Then, a force attracting the locking plate 512 (magnetic force F1) is generated, and the locking plate 512 is attracted toward the coil portion 511 against the urging force (F2) of the spring 514. Then, the locking plate 512 moves from the lock position to the unlock position (FIG. 20D). In this way, the locking plate 512 is configured to be movable between the unlock position and the lock position. When no electric power is supplied to the electrode 513, the locking plate 512 is located at the lock position by the spring 514.

When the locking plate 512 is at the unlock position, engagement between the hook portion 512*b* and the engaged portion 7013*a* is released. At this time, the supply port shutter 7013 is allowed to rotate (move) in the direction of the arrow R1 from the first position toward the second position. As shown in FIG. 10A, the protruded portion 70135*a* provided on the supply port shutter 7013 is in contact with the protruded portion 70125*a* provided on the frame 8010. Therefore, rotation of the supply port shutter 7013 in the direction of the arrow R2 is restricted.

(7-1) Operation to Unlock Locking Apparatus 510

As described above, the printer main body 100 includes the control unit 90 and the power supply (power supply) 211. The control unit 90 is configured to control the power supply 211.

In the present modification example as well, the control unit 90 determines whether to perform operation to unlock the locking apparatus 510 in accordance with the amount of toner contained in the process cartridge 20. In other words, when the toner pack 40 is mounted on the supply container mounting portion 701, the control unit 90 performs operation to unlock the locking apparatus 510 only when the amount of toner contained in the process cartridge 20 is small to such an extent that supply from the toner pack 40 is allowed.

More specifically, the control unit 90 controls the power supply 211 such that electric power is supplied to the electrode 513 when the amount of toner contained in the process cartridge 20 is less than an amount by which supply from the toner pack 40 is allowed (first amount). As in the case of the above-described example, the control unit 90 determines whether to perform operation to unlock the locking apparatus 510 in accordance with a detection result of the toner residual amount detector 51 and information on the amount of toner contained in the process cartridge 20, stored in the P memory 58. Electric power may be supplied to the electrode 513 when, for example, a toner amount in the process cartridge 20, detected by the toner residual amount detector 51, is less than the first amount. Alternatively, electric power may be supplied to the electrode 513 when it is determined that the toner amount in the process cartridge 20 is less than the first amount in accordance with the information stored in the P memory 58.

Alternatively, the control unit 90 may control the power supply 211 such that electric power is supplied to the electrode 513 when the toner pack 40 is able to supply toner (the toner amount contained in the toner pack 40 is greater than the second amount). For example, information on the toner amount contained in the toner pack 40 may be stored in the T memory (storage member) 57 mounted on the toner pack 40, and the control unit 90 may control the power supply 211 in accordance with the information. In other words, when it is determined from the information stored in the T memory 57 that the toner pack 40 is able to supply toner (the toner amount contained in the toner pack 40 is greater than the second amount), electric power may be supplied to the electrode 513.

When it is detected that the toner pack 40 is mounted on the supply container mounting portion 701, the control unit 90 determines whether to perform operation to unlock the locking apparatus 510. When it is determined to perform operation to unlock the locking apparatus 510, the control unit 90 performs operation to unlock the locking apparatus 510.

As described above, the supply port shutter 7013 moves from the closed position to the open position by displacing (rotating) the toner pack 40 attached to the supply container mounting portion 710.

As described with reference to FIG. 10A to FIG. 10C, when a user rotates the toner pack 40 in the direction of the arrow R1 in a state where the locking apparatus 510 is unlocked, movement of the shutter member 41 is locked, and the supply port shutter 7013 and the toner pack 40, other than the shutter member 41, rotate together. When the toner pack 40 is further rotated, the protruded portion 70125*b* and the protruded portion 70135*a* contact with each other as shown in FIG. 21A, and rotation in the direction of the arrow R1 is restricted (FIG. 21A). At this time, the protruded portion 70135*a* of the supply port shutter 7013 pushes the leaf spring 70152 of the rotation detection portion 7015, and the leaf spring 70152 contacts with the leaf spring 70151. The control unit 90 recognizes that the supply port shutter 7013 is open.

When the open state of the supply port shutter 7013 is recognized, supply of electric power from the supply portion 517 to the electrode 513 is stopped. Then, the locking plate 512 moves to the lock position by the urging force (F2) of the spring 514. After that, as shown in FIG. 21B, the hook portion 512*b* of the locking plate 512 engages with the engaged portion 7013*a*. Then, both rotation of the supply port shutter 7013 in the direction of the arrow R1 and rotation of the supply port shutter 7013 in the direction of the arrow R2 are restricted.

As described above, after ejection of toner from the toner pack 40 begins, when a predetermined condition is satisfied, the control unit 90 determines that ejection of toner is complete. In the present modification example, the control unit 90 determines that ejection of toner is complete in accordance with an elapsed time from when conduction of the rotation detection portion 7015 turns on. When the toner bottle unit 900 is used instead of the toner pack 40, the control unit 90 may determine that ejection is complete by detecting completion of pushing the piston 902.

When the control unit 90 determines that ejection of toner is complete, the control unit 90 controls the power supply 211 such that current flows from the supply portion 517 to the electrode 513. Then, the locking plate 512 moves from the lock position to the unlock position, and engagement between the hook portion 512*b* and the engaged portion 7013*a* is released (see FIG. 21A). After that, the toner pack 40 and the supply port shutter 7013 are allowed to rotate in the direction of the arrow R2.

When the user rotates the toner pack 40 and the supply port shutter 7013 in the direction of the arrow R2, the protruded portion 70125*a* and the protruded portion 70135*a* contact with each other. As a result, rotation of the toner pack 40 and the supply port shutter 7013 is stopped (FIG. 20D). At this time, the supply port shutter 7013 is closed. Then, the user removes the toner pack 40 from the process cartridge 20.

In the present modification example, in the process in which the supply port shutter 7013 rotates in the direction of the arrow R2, the control unit 90 stops supply of electric power to the electrode 513 when the rotation detection portion 7015 is interrupted. By pulling out the toner pack 40 from the supply container mounting portion 701, the control unit 90 may stop supply of electric power to the electrode 513 when electrical continuity between the contact portion 70133 (see FIG. 9B) and the contact portion 45*a* (see FIG. 7A) is lost.

When supply of electric power to the electrode 513 is interrupted, the locking plate 512 moves to the lock position by the spring 514. When the supply port shutter 713 is closed, the hook portion 512*b* engages with the engaged portion 7013*a*.

As described above, when no electric power (current) is supplied to the electrode 513, the locking plate 512 is located at the lock position. Therefore, in a state where the process cartridge 20 is detached from the printer main body 100, the locking plate 512 is located at the lock position. Therefore, even when the toner pack 40 is mounted on the process cartridge 20, a user is not able to rotate the toner pack 40. Hence, when the process cartridge 20 is in a state where supply of toner from the toner pack 40 should be restricted, supply of toner from the toner pack 40 is prevented. Therefore, it is possible to prevent the supply port 8012 of the process cartridge 20 from being clogged with toner.

Here, the locking apparatus 510 may be disposed in the printer main body 100. Part of the locking apparatus 510 may be disposed in the printer main body 100. For example, the electrode 513 and the coil portion 511 as a magnetic force generator may be disposed in the printer main body 100, and the control unit 90 may be configured to control supply of electric power to the magnetic force generator. Then, the locking plate 512 is configured so as to be covered with the frame 8010 and not exposed to the outside of the frame 8010. With this configuration as well, magnetic force acts from the outside of the frame 8010 on the locking plate 512 accommodated inside the frame 8010, so it is possible to move the locking plate 512. With this configuration as well, the locking plate 512 may be configured to be urged by the spring 514 from the unlock position to the lock position. Electric power may be directly supplied from the supply portion 517 to the coil portion 511.

When the locking plate 512 can be located at the lock position while no electric power is supplied to the coil portion 511, the spring 514 may be omitted. For example, the locking plate 512 may be located at the lock position by the own weight of the locking plate 512.

Second Embodiment

A second embodiment of the present disclosure will be described with reference to FIG. 22A to FIG. 24D. In the fourth modification example of the first embodiment, the configuration in which locking of the supply port shutter 7013 is electrically performed is described. In the present embodiment, a configuration that prevents unlocking of the locking member with a method different from that of the fourth modification example of the first embodiment will be described.

Figure 22A:
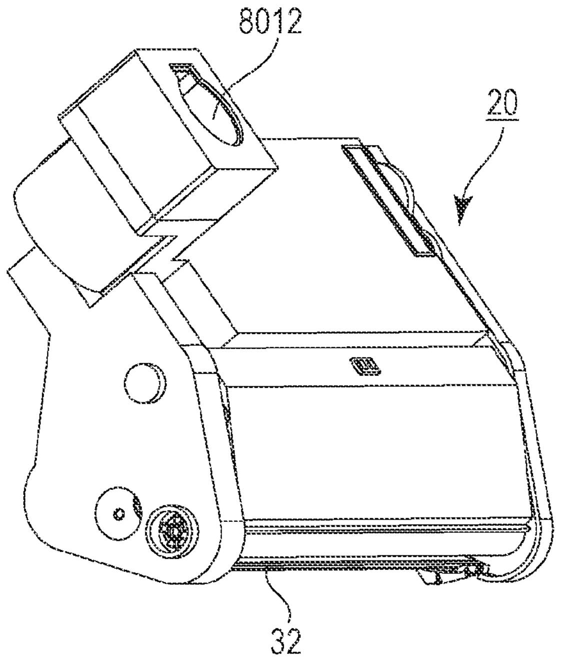
FIG. 22A to FIG. 22D are views illustrating the configuration of a process cartridge according to a comparative example of a second embodiment.
Figure 22B:
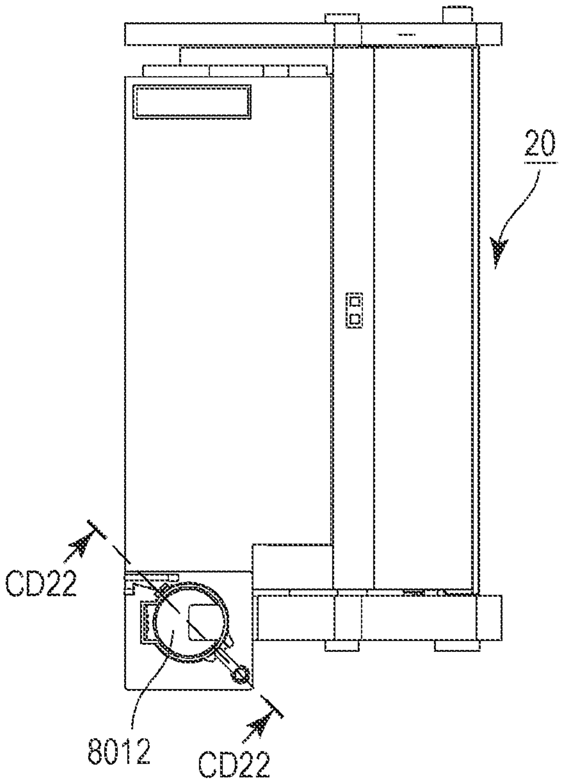
Figure 22C:
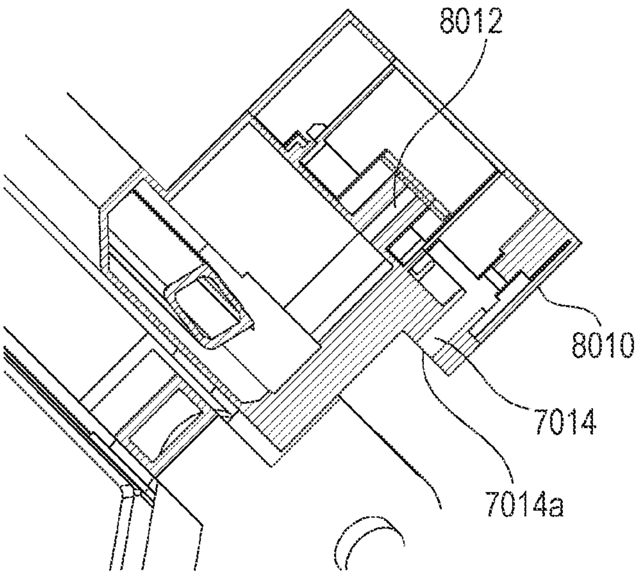
Figure 22D:
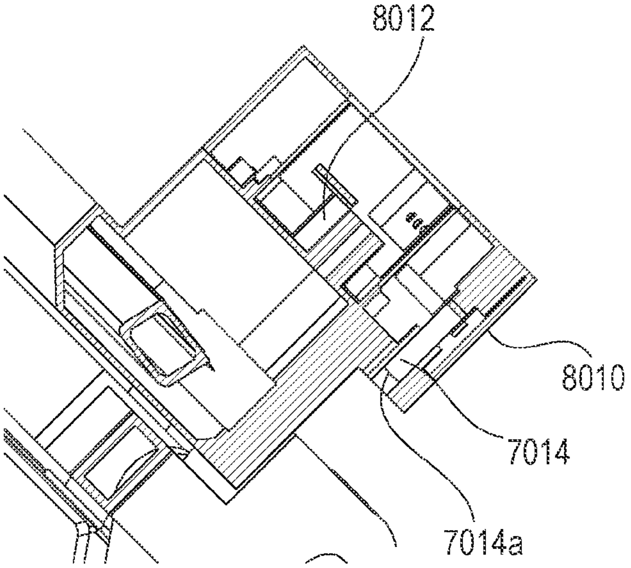

FIG. 22A to FIG. 22D are views illustrating the configuration of the process cartridge 20 in a comparative example of the present embodiment. FIG. 22A is a perspective view of the process cartridge 20 according to the comparative example. FIG. 22B is a top view of the process cartridge 20 according to the comparative example. FIG. 22C and FIG. 22D are cross-sectional views of the process cartridge 20 according to the comparative example. FIG. 22C is a cross-sectional view of the process cartridge 20, taken along the line CD22-CD22 in FIG. 22B. FIG. 22D is a cross-sectional view of the process cartridge 20, taken along the line CD22-CD22 in FIG. 22B. In FIG. 22C, the locking member 7014 is at the lock position. In FIG. 22D, the locking member 7014 is at the unlock position.

Figure 23A:
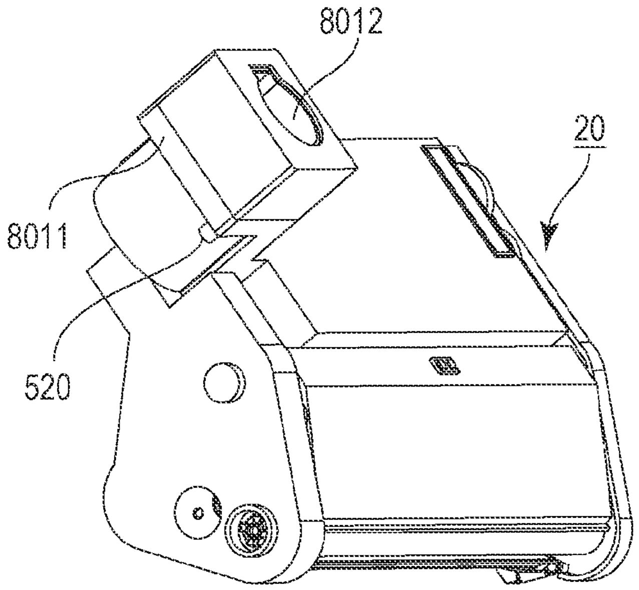
FIG. 23A to FIG. 23C are views illustrating the configuration of a process cartridge according to the second embodiment.
Figure 23B:
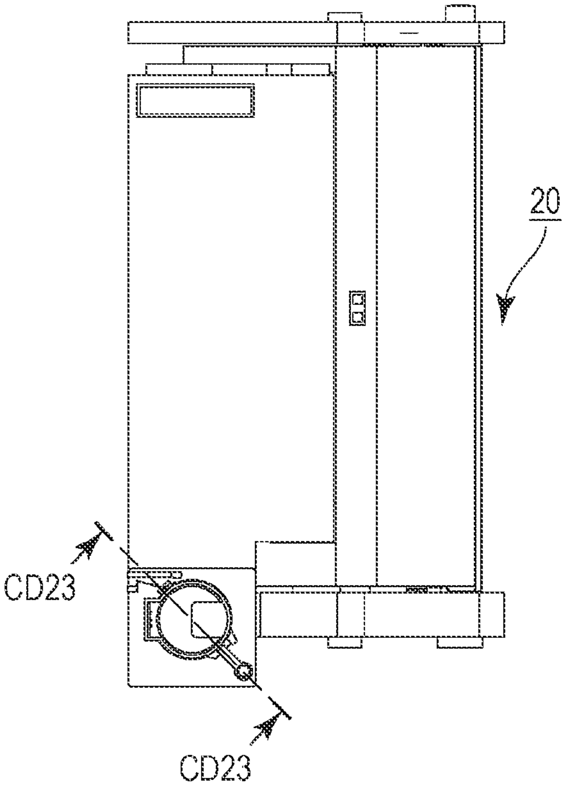
Figure 23C:
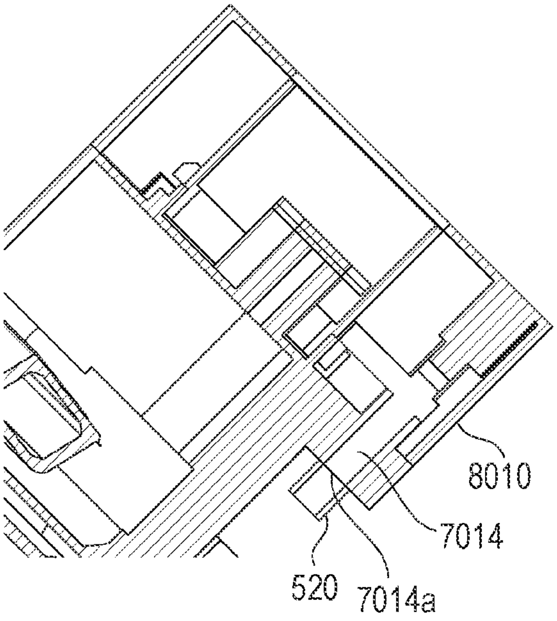

FIG. 23A to FIG. 23C are views illustrating the configuration of the process cartridge 20 in the present embodiment. FIG. 23A is a perspective view of the process cartridge 20 according to the present embodiment. FIG. 23B is a top view of the process cartridge 20 according to the present embodiment. FIG. 23C is a cross-sectional view of the process cartridge 20 according to the present embodiment. FIG. 23C is a cross-sectional view of the process cartridge 20, taken along the line CD23-CD23 in FIG. 23B. In FIG. 23C, the locking member 7014 is at the lock position.

Figure 24A:
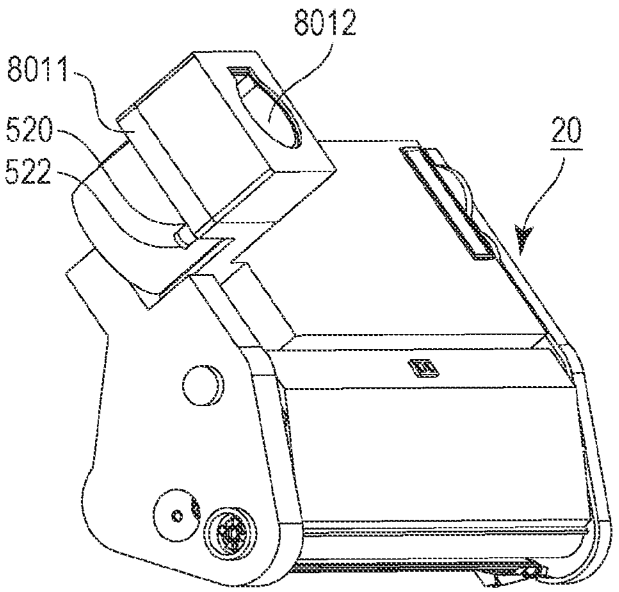
FIG. 24A to FIG. 24D are views illustrating the configuration of a process cartridge according to a modification example of the second embodiment.
Figure 24B:
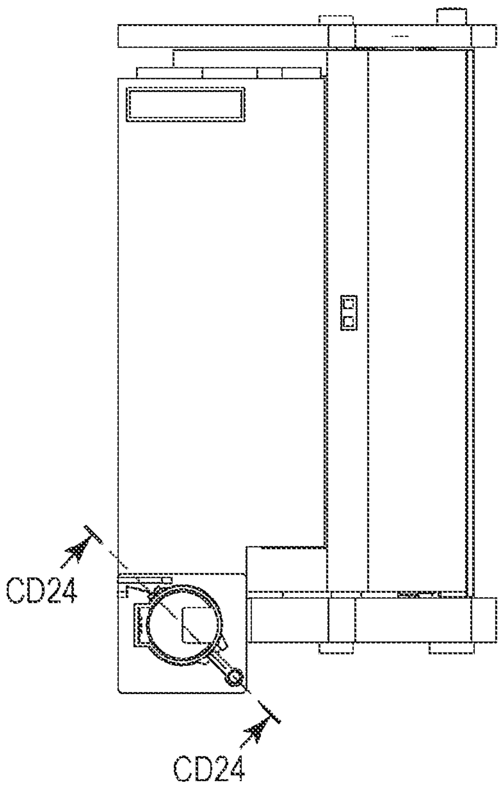
Figure 24C:
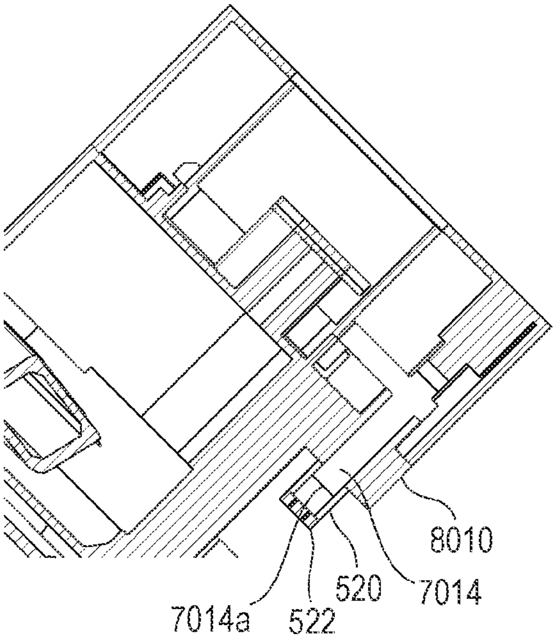
Figure 24D:
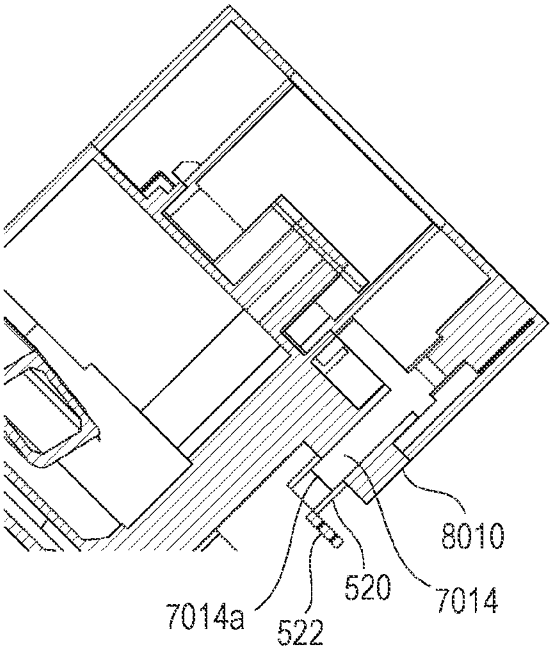

FIG. 24A to FIG. 24D are views illustrating the configuration of the process cartridge 20 in a modification example of the present embodiment. FIG. 24A is a perspective view of the process cartridge 20 according to the modification example of the present embodiment. FIG. 24B is a top view of the process cartridge 20 according to the modification example of the present embodiment. FIG. 24C and FIG. 24D are cross-sectional views of the process cartridge 20 according to the modification example of the present embodiment. FIG. 24C is a cross-sectional view of the process cartridge 20, taken along the line CD24-CD24 in FIG. 24B. FIG. 24D is a cross-sectional view of the process cartridge 20, taken along the line CD24-CD24 in FIG. 24B. In FIG. 24C and FIG. 24D, the locking member 7014 is at the lock position.

As shown in FIG. 22C, when the locking member 7014 according to the comparative example is at the unlock position, the pivot shaft 7014*a* is exposed from the frame 8010. Therefore, when the process cartridge 20 is detached from the printer main body 100, a user is able to touch the locking member 7014.

On the other hand, as shown in FIG. 23C, in the present embodiment, the frame 8010 has a wall 520 disposed around the locking member 7014. When the locking member 7014 is at the lock position, the distal end of the wall 520 is at a position protruded relative to the pivot shaft 7014*a* of the locking member 7014. More specifically, in a direction from the base of the wall 520 toward the distal end, the pivot shaft 7014*a* of the locking member 7014 at the lock position is located upstream of the distal end of the wall 520. In the present embodiment, the wall 520 contacts with the pivot shaft 7014*a* of the locking member 7014. Then, the wall 520 functions as a guide for the pivot shaft 7014*a*.

In consideration of a touch by a user, the opening formed by the wall 520 when the opening has a circular shape preferably has a diameter less than or equal to 8 mm and more preferably has a diameter less than or equal to 6 mm. When the opening has a rectangular shape, the opening preferably has a short side length of less than or equal to 8 mm and more preferably has a short side length of less than or equal to 6 mm. The distance between the pivot shaft 7014*a* and the opening at the time when the locking member 7014 switches from the lock state to the unlock state is preferably greater than or equal to 5 mm. When the locking member 7014 is at the lock position, the distance between the pivot shaft 7014*a* and the opening is preferably greater than or equal to 5 mm.

As described above, by providing the wall 520, it is possible to reduce a touch of a user with the locking member 7014.

As shown in FIG. 24C and FIG. 24D, the process cartridge 20 may include a cover member 522 that covers the opening formed by the wall 520. The cover member 522 is configured to be movable between a cover position where the cover member 522 covers the opening (see FIG. 24C) and a retracted position where the cover member 522 retracts from the opening (see FIG. 24D).

In the present embodiment, the cover member 522 is made of a resin. The cover member 522 is urged from the retracted position to the cover position by an urging member (not shown). When the process cartridge 20 is mounted on the printer main body 100, the cover member 522 contacts with part of the printer main body 100 and moves from the cover position (FIG. 24C) to the retracted position (FIG. 24D).

As described above, by covering the opening of the wall 520 with the cover member 522, it is possible to reduce a touch of a user with the pivot shaft 7014*a*.

When the process cartridge 20 includes the cover member 522, the above-described wall 520 may be omitted. When the wall 520 is omitted, the frame 8010 may be regarded as having an opening in which the pivot shaft 7014*a* is inserted (see FIG. 22C and FIG. 22D). The cover member 522 covers the opening formed in the frame 8010.

With this configuration as well, by covering the opening of the frame 8010 with the cover member 522, it is possible to reduce a touch of a user with the pivot shaft 7014*a*.

Third Embodiment

A third embodiment of the present disclosure will be described. When the configurations of the toner bottle unit 900, image forming apparatus 1, and process cartridge 20 are the same as those of the first embodiment, like reference signs are assigned, and the description thereof is omitted.

(8-1) Push Configuration of Toner Bottle Unit

A push configuration of the toner bottle unit 900 according to the present embodiment will be described with reference to FIG. 25 to FIG. 29C.

Figure 25:
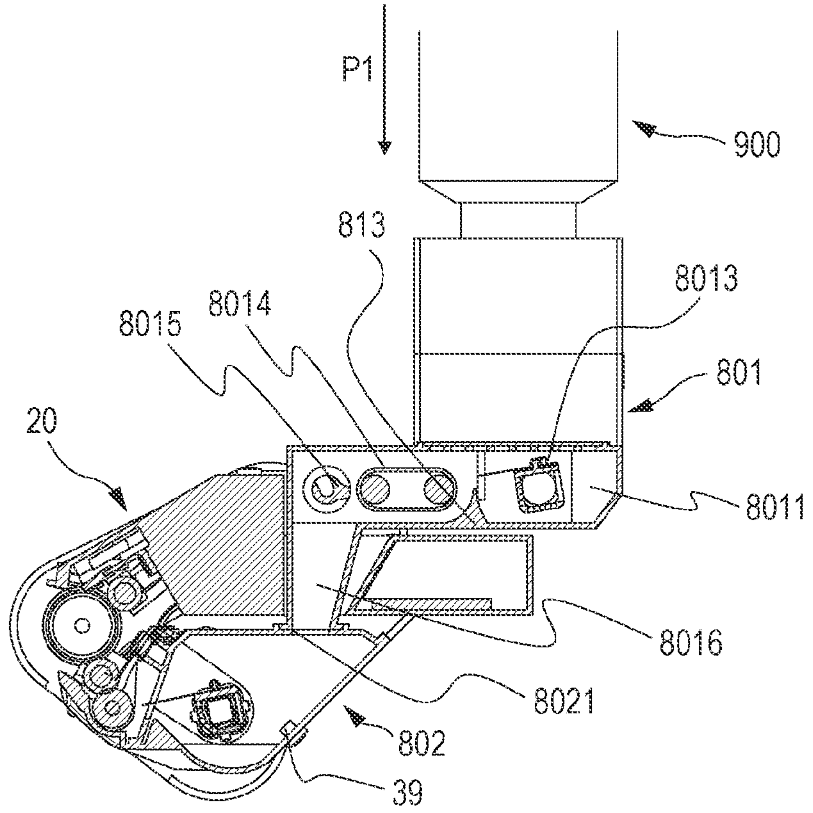
FIG. 25 is a view of a toner bottle unit and a process cartridge according to a third embodiment.
Figure 26:
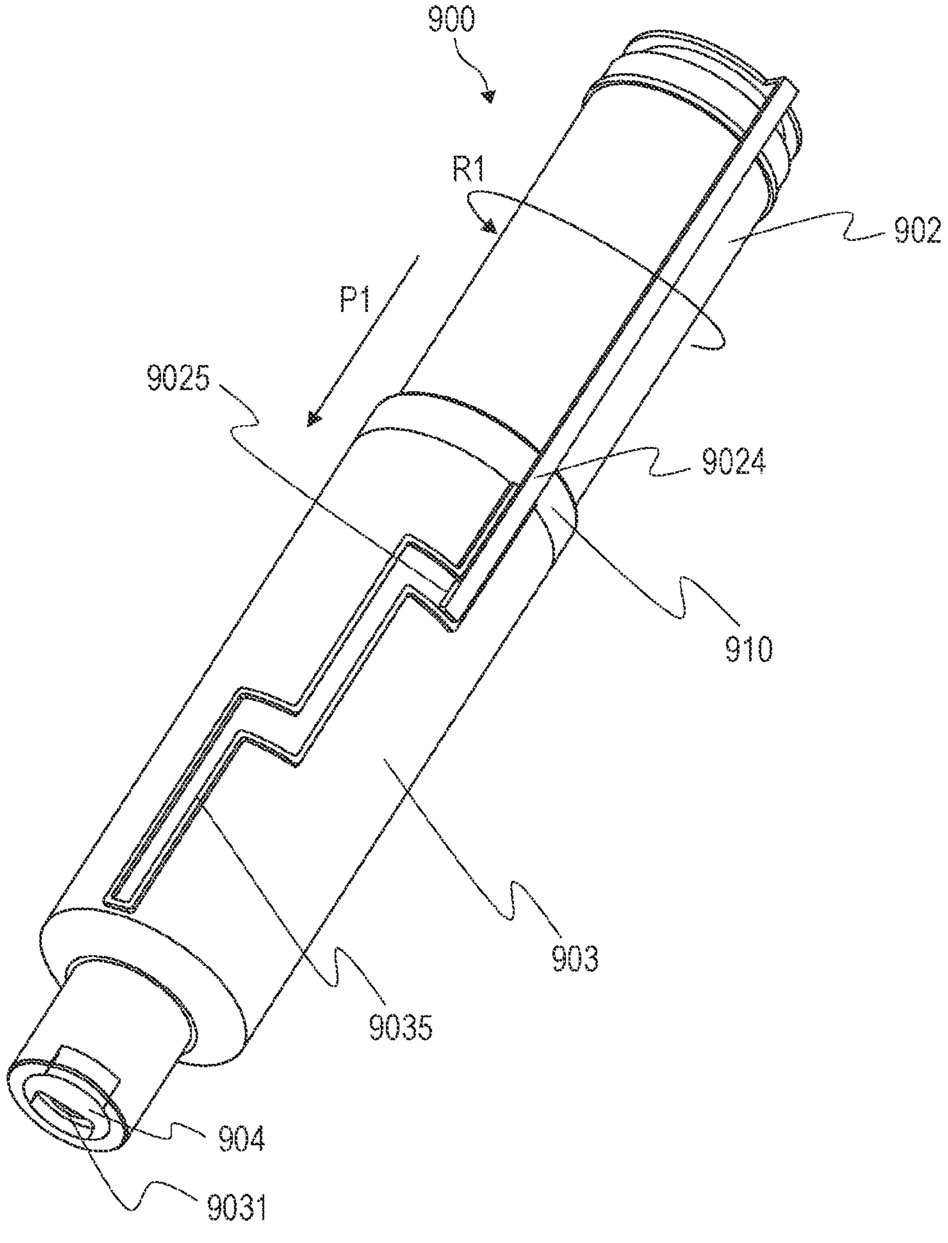
FIG. 26 is a view of the toner bottle unit according to the third embodiment.

FIG. 25 is a view of the toner bottle unit 900 and the process cartridge 20 according to the present embodiment. More specifically, FIG. 25 is a cross-sectional view of the process cartridge 20 in a state where the toner bottle unit 900 is mounted on the toner receiving unit 801. FIG. 26 is an external perspective view of the toner bottle unit 900 according to the present embodiment.

Figure 27A:
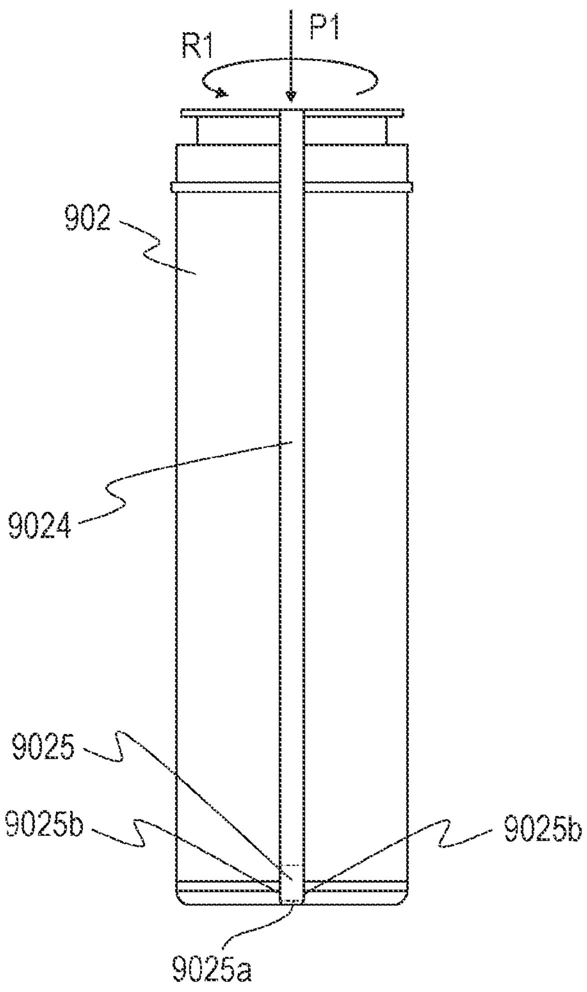
FIG. 27A and FIG. 27B are views of a piston according to the third embodiment.
Figure 27B:
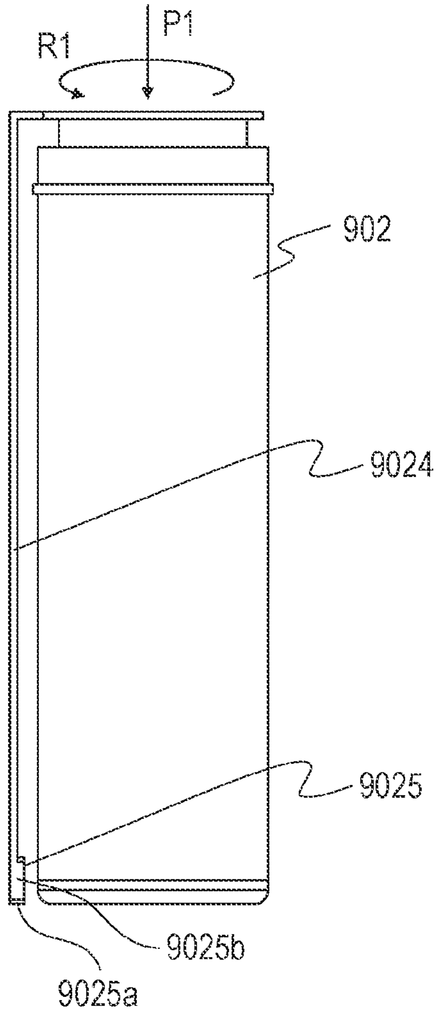
Figure 28:
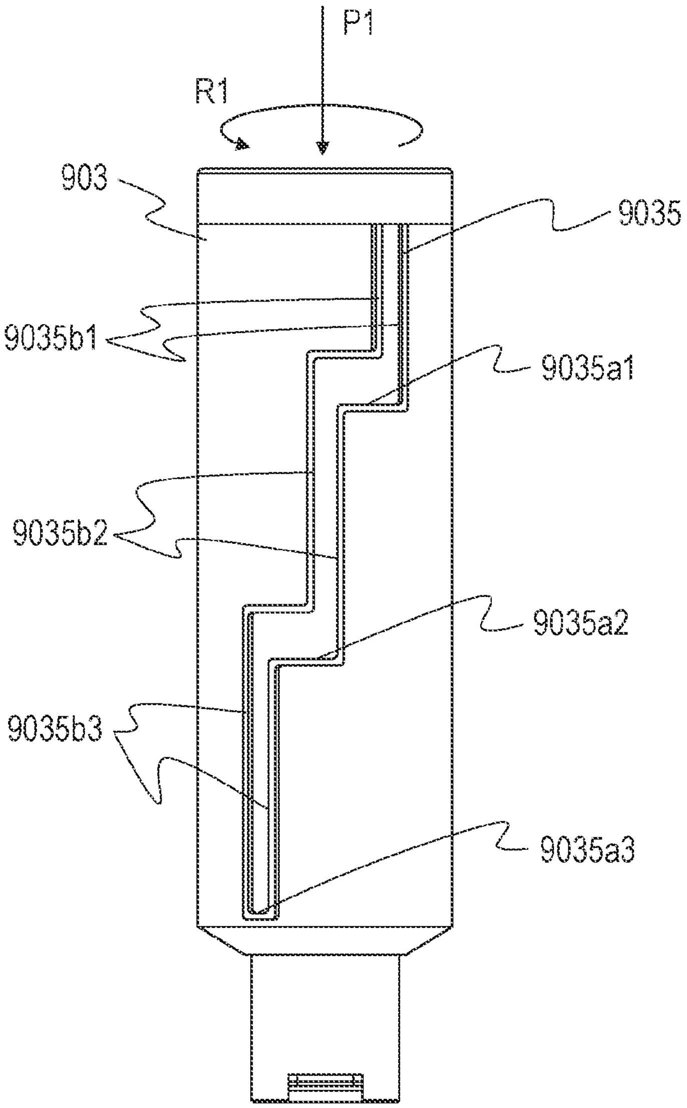
FIG. 28 is a view of an outer cylinder according to the third embodiment.

FIG. 27A is a front view of the piston 902. FIG. 27B is a side view of the piston 902. FIG. 28 is a front view of the outer cylinder 903.

Figure 29A:
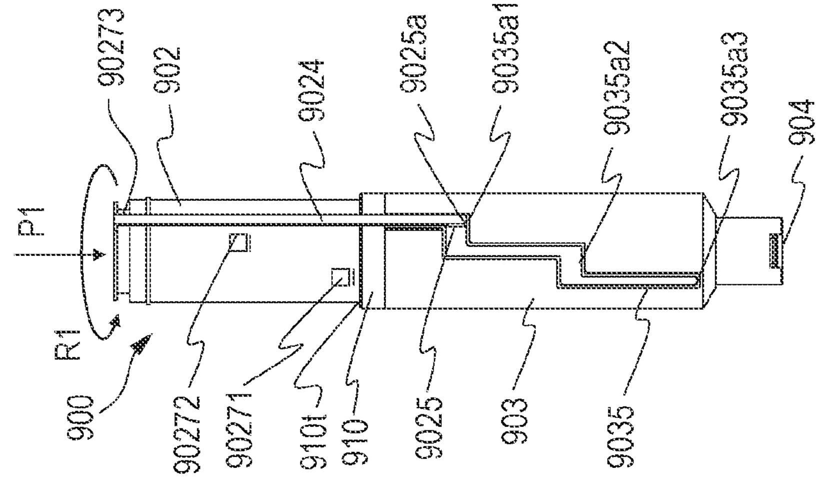
FIG. 29A to FIG. 29C are views illustrating the pushing operation of the toner bottle unit according to the third embodiment.
Figure 29B:
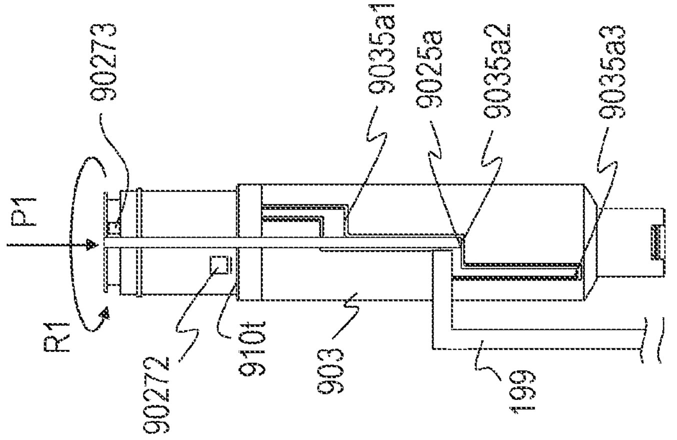
Figure 29C:
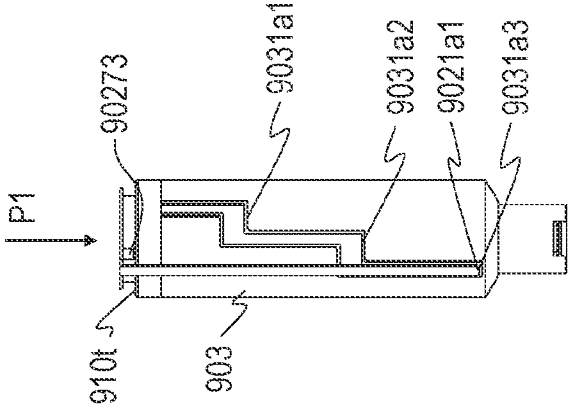

FIG. 29A, FIG. 29B, and FIG. 29C are front views of the toner bottle unit 900 illustrating the pushing operation of the toner bottle unit 900. FIG. 29A shows an initial state where toner is not ejected. FIG. 29B shows a state where a half of toner has been ejected. FIG. 29C shows a state where the entire toner has been ejected.

As described above, the toner bottle unit 900 as a supply unit (supply container) attachable to the process cartridge (cartridge) 20 includes the outer cylinder 903, the inner cylinder 901, the piston (pushing member) 902, the shutter member 904, and the memory unit 911. The outer cylinder 903 has the ejection port 9031. The inner cylinder 901 has the ejection port 9011. The inner cylinder 901 and the outer cylinder 903 each may be regarded as a container configured to contain toner or a frame having the toner containing portion 9014. The ejection port 9011 and the ejection port 9031 each may be regarded as an ejection port used to eject toner from the container (the inner cylinder 901 and the outer cylinder 903) of the toner bottle unit 900. The piston 902 is fitted to the inner cylinder 901 (see FIG. 15D).

When the piston 902 is pushed in toward the inner cylinder 901, toner contained in the toner containing portion 9014 is ejected through the ejection port 9011 and the ejection port 9031. A movement direction of the piston 902 at this time is referred to as push direction (first direction). The piston 902, the inner cylinder 901, and the outer cylinder 903 extend in the first direction. In other words, the longitudinal directions of the piston 902, inner cylinder 901, and outer cylinder 903 are the first direction.

As shown in FIG. 25, when the piston 902 of the toner bottle unit 900 is pushed in in the P1 direction, toner is ejected together with air into the toner containing portion 8011 through the ejection port 9011 (see FIG. 15C) and the ejection port 9031.

Here, when toner greater than a receivable amount (containable amount) of the process cartridge 20 is ejected from the toner bottle unit 900, the process cartridge 20 is not able to receive toner. As a result, toner may leak through a coupling portion between the toner bottle unit 900 and the toner receiving unit 801.

Therefore, toner greater in amount than the receivable amount of the process cartridge 20 may be prevented from being ejected from the toner bottle unit 900.

Particularly, a large-capacity toner bottle unit 900 containing toner in an amount exceeding the containable amount of the toner receiving unit 801 may be configured not to eject the entire toner at a time. In other words, when a user pushes in the piston 902, the toner bottle unit 900 may have a configuration to restrict the piston (a movement restriction mechanism, and a path restriction portion) so that the piston 902 can be pushed in a stepwise manner.

The toner bottle unit 900 in the present embodiment is capable of preventing ejection of toner in an amount greater than the receivable amount of the process cartridge 20 from the toner bottle unit 900.

As shown in FIG. 26, the outer cylinder 903 has a channel portion 9035 facing outward of the outer cylinder 903. The piston 902 has an arm (supporting portion) 9024 that extends in the push direction P1. The arm 9024 further has a distal end portion (a first portion, and a first stopped portion) 9025 that protrudes inward of the outer cylinder 903 from the arm 9024. The piston 902 is fitted to the inner cylinder 901, and the piston 902 is attached so as to be rotatable in the R1 direction relative to the outer cylinder 903. The channel portion 9035 engages with the distal end portion 9025.

Next, the channel portion 9035 of the outer cylinder 903 and the arm 9024 and distal end portion 9025 of the piston 902 will be described with reference to FIG. 27A, FIG. 27B, and FIG. 28.

As shown in FIG. 27A and FIG. 27B, the piston 902 includes the arm 9024 and the distal end portion 9025. The distal end portion 9025 has a distal end restricted surface **9025*a* as a first restricted surface (first stopped surface) and a rotation restricted surface 9025*b*** as a second restricted surface (second stopped surface).

As shown in FIG. 28, a first direction restriction portion (first direction stop portion) is provided in the channel portion 9035 of the outer cylinder 903. The first direction restriction portion restricts movement of the piston 902 in the P1 direction by contacting with the distal end restricted surface **9025*a*. The first direction restriction portion includes a first stop surface 9035*a*1, a second stop surface 9035*a*2, and a third stop surface 9035*a*3. In the P1 direction, the second stop surface 9035*a* is located between the first stop surface 9035*a*1 and the third stop surface 9035*a*3**.

In addition, a second direction restriction portion (second direction stop portion) is provided in the channel portion 9035 of the outer cylinder 903. The second direction restriction portion restricts movement of the piston 902 in the R1 direction (a second direction that intersects with the first direction) by contacting with the rotation restricted surface **9025*b* of the distal end portion 9025 of the piston 902. The second direction restriction portion includes first rotation stop surfaces 9035*b*1, second rotation stop surfaces 9035*b*2, and third rotation stop surfaces 9035*b*3. In the present embodiment, the R1 direction is the second direction perpendicular to the first direction. In the R1 direction, the second rotation stop surfaces 9035*b*2 are located between the first rotation stop surfaces 9035*b*1 and the third rotation stop surfaces 9035*b*3**.

Next, a specific pushing operation of the piston 902 will be described with reference to FIG. 29A, FIG. 29B, and FIG. 29C.

FIG. 29A is a front view of an initial state where toner in the toner bottle unit 900 is not ejected. At this time, the distal end restricted surface **9025*a* of the distal end portion 9025 is in contact with the first stop surface 9035*a*1 of the channel portion 9035, and is not able to push the piston 902 in the P1 direction. The rotation restricted surface 9025*b* of the distal end portion 9025 is in contact with the first rotation stop surface 9035*b*1 of the channel portion 9035, and the piston 902 is not able to rotate in the direction opposite to the R1** direction.

When a user rotates (moves) the piston 902 in the R1 direction, the rotation restricted surface **9025*b* and the second rotation stop surface 9035*b*2 contact with each other. At this time, the contact between the distal end restricted surface 9025*a* and the first stop surface 9035*a*1 is released, and the piston 902 is able to be pushed in the P1** direction.

From this state, when the piston 902 is further pushed in the P1 direction, toner begins to be ejected through the ejection port 9011. At this time, the rotation restricted surface **9025*b* of the distal end portion 9025 is guided by the second rotation stop surfaces 9035*b*2. Then, the distal end restricted surface 9025*a* contacts with the second stop surface 9035*a*2. Thus, movement of the piston 902 in the P1 direction stops, and ejection of toner also stops (see FIG. 29B). In other words, since the distal end portion 9025 contacts with the second stop surface 9035*a*2, resistance at the time of pushing the piston 902 increases. Thus, it is possible to prevent ejection of the entire toner inside the toner bottle unit 900**.

At this time, the rotation restricted surface **9025*b* is in contact with the second rotation stop surface 9035*b*2, and the piston 902 is not able to rotate in the direction opposite to the R1** direction.

Here, in the present embodiment, the control unit 90 detects the toner amount in the developing unit 802 with the toner residual amount detector 51 of the image forming apparatus 1. In addition, the printer main body 100 has a rotation locking member (locking member) 199 for locking rotation of the piston 902 (see FIG. 29B).

When there is no margin in the developing unit 802 for receiving toner any more, the control unit 90 causes the piston 902 not to be able to rotate in the R1 direction by restricting the arm 9024 or the distal end portion 9025 with the rotation locking member 199. The piston 902 is caused not to be pushed any more, and then the locking member 7014 (see FIG. 9A and FIG. 9B) of the process cartridge 20 is unlocked to enable the toner bottle unit 900 to be detached from the toner receiving unit 801.

On the other hand, the control unit 90 unlocks the rotation locking member 199 when the toner amount contained in the developing unit 802 of the process cartridge 20 is less than the amount by which the developing unit 802 can further receive supply of toner (first amount). Thus, rotation of the piston 902 is allowed.

Figure 36:
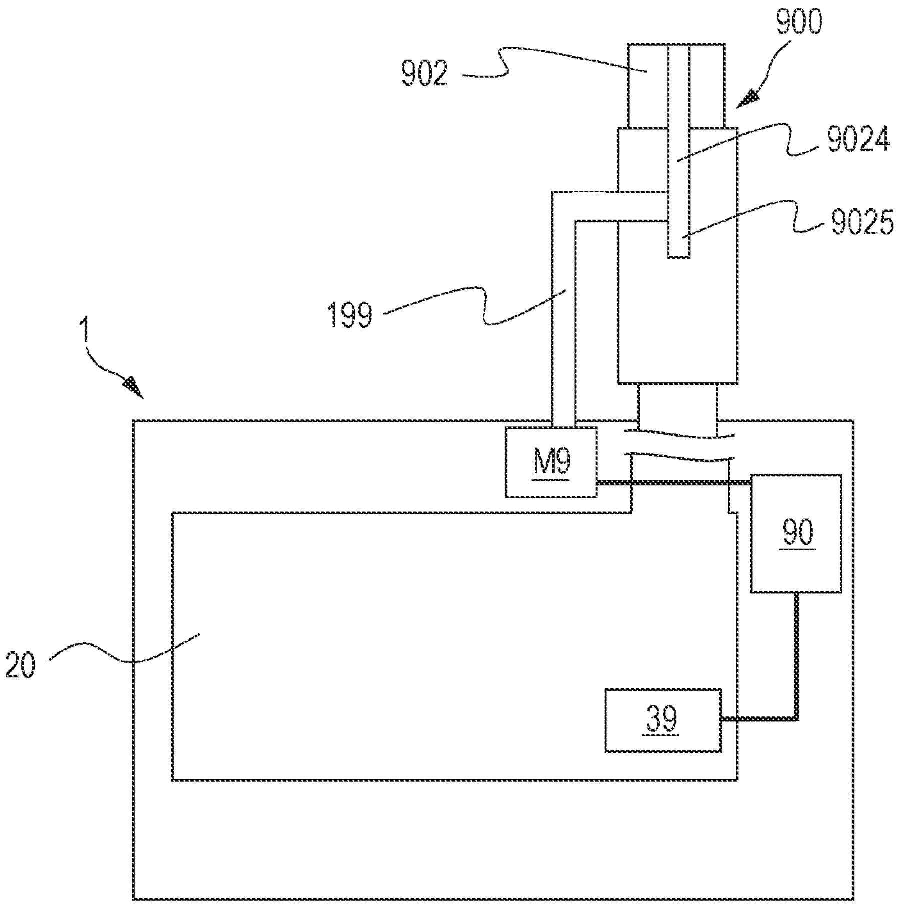
FIG. 36 is a view illustrating a rotation restriction member according to the third embodiment.

The rotation locking member 199 will be simply described with reference to a schematic drawing. FIG. 36 is a block diagram illustrating the rotation locking member 199 provided in the image forming apparatus 1. As shown in FIG. 36, the rotation locking member 199 is connected to a motor M9. The drive of the motor M9 is controlled by the control unit 90 in accordance with a detection result of the toner residual amount detector (detecting portion) 51.

When the available capacity of the developing unit 802 is sufficient in accordance with the detection result of the residual amount, the locking member 7014 (see FIG. 9A and FIG. 9B) of the process cartridge 20 is not unlocked, and the process directly shifts into supply work that will be described below.

When further supply of toner is allowed, a user further rotates the piston 902 in the R1 direction by a predetermined angle from the state shown in FIG. 29B. At this time, the distal end portion 9025 moves along the outer periphery of the outer cylinder 903. Then, the rotation restricted surface 9025*b* and the third rotation stop surface 9035*b*3 contact with each other. At this time, the contact between the distal end restricted surface 9025*a* and the second stop surface 9035*a*2 is released, and the piston 902 is able to be pushed in the P1 direction.

When the piston 902 is further pushed in the P1 direction, toner begins to be ejected through the ejection port 9011 (see FIG. 15C). At this time, the rotation restricted surface 9025*b* of the distal end portion 9025 is guided by the third rotation stop surfaces 9035*b*3. When the distal end restricted surface 9025*a* contacts with the third stop surface 9035*a*3, movement of the piston 902 in the P1 direction stops. This state is a state where ejection of the entire toner from the toner bottle unit 900 is complete (see FIG. 29C).

In other words, the piston 902 and the distal end portion 9025 are configured to be movable in the P1 direction relative to the outer cylinder 903. A position where the distal end restricted surface 9025*a* contacts with the first stop surface 9035*a*1 is a first position of the piston 902 and the distal end portion 9025. A position where the distal end restricted surface 9025*a* contacts with the third stop surface 9035*a*3 is a second position of the piston 902 and the distal end portion 9025. A position where the distal end restricted surface 9025*a* of the distal end portion 9025 contacts with the second stop surface 9035*a*2 is an intermediate position of the piston 902 and the distal end portion 9025 (a first intermediate position, and a third position).

In other words, the intermediate position is located between the first position and the second position in the P1 direction. A position where the piston 902 and the distal end portion 9025 are rotated from the intermediate position in the R1 direction and the rotation restricted surface 9025*b* and the third rotation stop surface 9035*b*3 contact with each other is a fourth position of the piston 902 and the distal end portion 9025 (second intermediate position).

As described above, the toner bottle unit 900 has a movement restriction portion that restricts movement of the piston 902 in the P1 direction when the piston 902 is located at the intermediate position. The movement restriction portion includes the distal end portion 9025 and the second stop surface 9035*a*. When the piston 902 and the distal end portion 9025 are at the intermediate position, pushing the piston 902 in the P1 direction is restricted. When the piston 902 and the distal end portion 9025 are moved from the intermediate position to the fourth position, pushing the piston 902 in the P1 direction is allowed again.

In the present embodiment, the piston 902 has the distal end portion 9025, and the outer cylinder 903 has the second stop surface 9035*a*2. However, a portion corresponding to the distal end portion 9025 may be provided on any one of the piston 902 and the outer cylinder 903, and a portion corresponding to the second stop surface 9035*a*2 may be provided on the other one of the piston 902 and the outer cylinder 903.

(8-2) Checking Push-In Status of Toner Bottle Unit

Here, a method for allowing a user to check the push status of the toner bottle unit 900 will be described with reference to FIG. 29A to FIG. 29C. Here, the push status of the toner bottle unit 900 includes the number of times the piston 902 of the toner bottle unit 900 has been pushed or the number of times the piston 902 can be pushed. Alternatively, the push status of the toner bottle unit 900 includes information on the residual amount of toner contained in the toner bottle unit 900. The present embodiment relates to the number of times the piston 902 of the toner bottle unit 900 has been pushed.

As shown in FIG. 29A, a plurality of push indicating portions (piston-side indicating portions) 9027 showing lines and a numerals are provided on the outer peripheral surface of the piston 902. The push indicating portions 9027 include a first indicating portion 90271, a second indicating portion 90272, and a third indicating portion 90273.

The number of times of pushing is inscribed, that is, “0” is inscribed at the first indicating portion 90271, “1” is inscribed at the second indicating portion 90272, and “2” is inscribed at the third indicating portion 90273.

As shown in FIG. 29A, in an initial state where toner is not ejected, an end portion 910*t* of the cylinder cover 910 coincides with the line of the first indicating portion 90271, and a user recognizes that the number of times of pushing is “0” by reading the numeral of the first indicating portion 90271.

As shown in FIG. 29B, when the piston 902 is pushed in, the distal end restricted surface 9025*a* contacts with the second stop surface 9035*a*2, and the piston 902 stops. Here, the end portion 910*t* of the cylinder cover 910 coincides with the line of the second indicating portion 90272, and the user recognizes that the number of times of pushing is “1” by reading the numeral of the second indicating portion 90272.

As shown in FIG. 29C, when the piston 902 is further pushed in by user’s pushing operation, the distal end restricted surface 9025*a* contacts with the third stop surface 9035*a*3, and the piston 902 stops. Here, the end portion 910*t* of the cylinder cover 910 coincides with the line of the third indicating portion 90273, and the user recognizes that the number of times of pushing is “2” by reading the numeral of the third indicating portion 90273.

In this way, the user is able to instantaneously grasp the push status of the piston 902 of the toner bottle unit 900 by reading the numerals of the push indicating portions 9027.

In the present embodiment, the number of times of pushing is inscribed at the push indicating portions 9027. Alternatively, the toner residual amount in the toner bottle unit 900 may be indicated as “100%”, “50%”, and “0%”. In addition, the number of the push indicating portions 9037 may be freely changed in accordance with the number of the channel portion 9035 of the outer cylinder 903.

As described above, according to the present embodiment, it is possible to supply toner in the toner bottle unit 900 in a stepwise manner in accordance with the available capacity of the process cartridge 20. Therefore, toner leakage due to supply of toner greater than or equal to the available capacity of the process cartridge 20 is prevented.

A distance in the P1 direction between the distal end restriction surfaces of the outer cylinder 903 may be freely set, with the result that it is possible to adjust a toner ejection amount for a single pushing operation. The number of the distal end restriction surfaces of the outer cylinder 903 may also be freely set, with the result that it is possible to adjust the number of steps of ejection.

Fourth Embodiment

A fourth embodiment of the present disclosure will be described. In the present embodiment, another mode of the push indicating portions of the toner bottle unit 900, described in the third embodiment, will be described. The configurations of the toner bottle unit 900, image forming apparatus 1, and process cartridge 20, other than the push indicating portions, are the same as those described in the third embodiment, so like reference signs are assigned, and the description thereof is omitted.

Figure 30C:
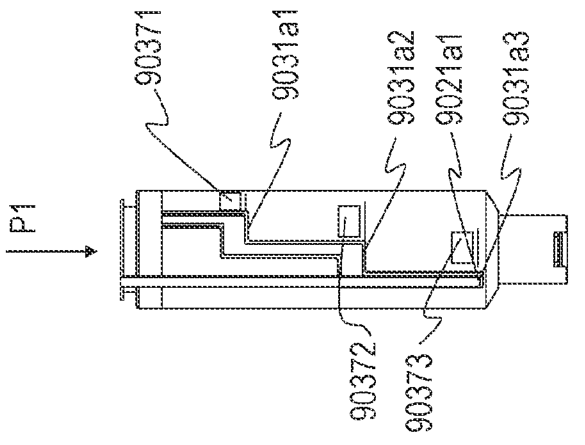
FIG. 30A to FIG. 30C are views illustrating push status indication of a toner bottle unit according to a fourth embodiment.
Figure 30B:
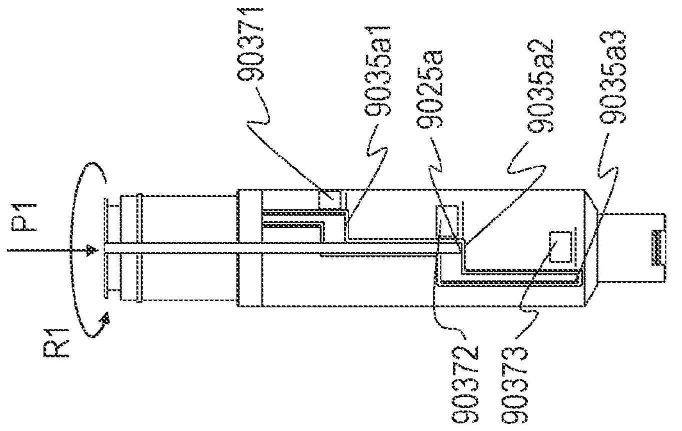
Figure 30A:
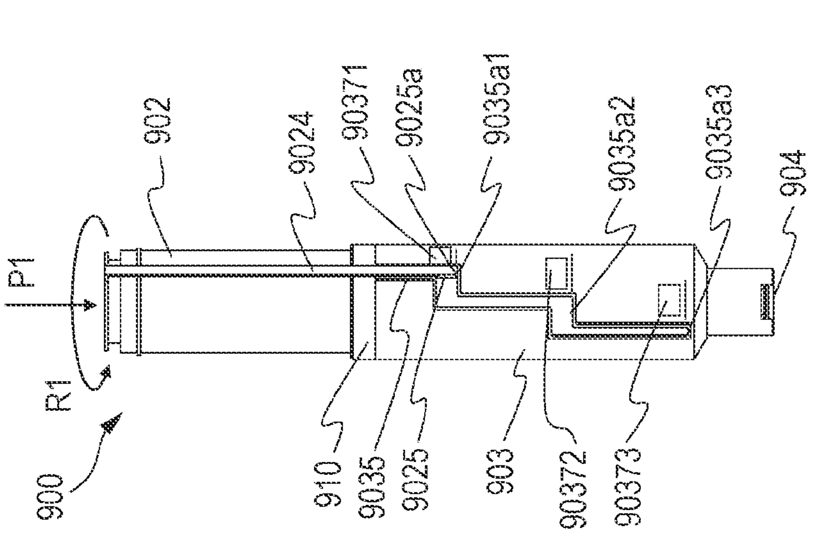

FIG. 30A, FIG. 30B, and FIG. 30C are front views of the toner bottle unit 900 illustrating the pushing operation of the toner bottle unit 900. FIG. 30A shows an initial state where toner is not ejected. FIG. 30B shows a state where a half of toner has been ejected. FIG. 30C shows a state where the entire toner has been ejected.

As shown in FIG. 30A, a plurality of push indicating portions (container-side indicating portions) 9037 each having an inscribed line and number of times of pushing are provided on the outer peripheral surface of the outer cylinder 903. The push indicating portions 9037 include a first indicating portion 90371, a second indicating portion 90372, and a third indicating portion 90373.

The number of times of pushing is inscribed, that is, “0” is inscribed at the first indicating portion 90371, “1” is inscribed at the second indicating portion 90372, and “2” is inscribed at the third indicating portion 90373.

As shown in FIG. 30A, in an initial state where toner is not ejected, the distal end restricted surface 9025*a* of the piston 902 coincides with the line of the first indicating portion 90371, and a user recognizes that the number of times of pushing is “0” by reading the number of times of pushing at the first indicating portion 90371.

As shown in FIG. 30B, when the piston 902 is pushed in by user’s pushing operation, the distal end restricted surface 9025*a* contacts with the second stop surface 9035*a*2, and the piston 902 stops. Here, the distal end restricted surface 9025*a* of the piston 902 coincides with the line of the second indicating portion 90372, and the user recognizes that the number of times of pushing is “1” by reading the number of times of pushing at the second indicating portion 90372.

As shown in FIG. 30C, when the piston 902 is further pushed in by user’s pushing operation, the distal end restricted surface 9025*a* contacts with the third stop surface 9035*a*3, and the piston 902 stops. Here, the distal end restricted surface 9025*a* of the piston 902 coincides with the line of the third indicating portion 90373, and the user recognizes that the number of times of pushing is “2” by reading the number of times of pushing at the third indicating portion 90373.

In this way, the user is able to instantaneously grasp the push status of the piston 902 of the toner bottle unit 900 by reading the push indicating portions 9037. In the present embodiment as well, the number of times of pushing is inscribed at the push indicating portions 9037. Alternatively, the toner residual amount in the toner bottle unit 900 may be indicated as “100%”, “50%”, and “0%”. In addition, the number of the push indicating portions 9037 may be freely changed in accordance with the number of the channel portion 9035 of the outer cylinder 903.

As described above, according to the present embodiment, it is possible to supply toner in the toner bottle unit 900 in a stepwise manner in accordance with the available capacity of the process cartridge 20. Therefore, toner leakage due to supply of toner greater than or equal to the available capacity of the process cartridge 20 is prevented.

In the present embodiment, by providing the push indicating portions 9037 on the outer cylinder 903, it is possible to constantly check the push indicating portions 9037 at a viewpoint in one direction even when the piston 902 is rotated, so the present embodiment is higher in visibility than the third embodiment.

Alternatively, both the push indicating portions 9027 described in the third embodiment and the push indicating portions 9037 described in the present embodiment may be provided on the toner bottle unit 900.

Fifth Embodiment

A fifth embodiment of the present disclosure will be described. In the present embodiment, another mode of the channel portion 9035 of the outer cylinder 903, described in the third embodiment or the fourth embodiment, will be described. The configurations of the toner bottle unit 900, image forming apparatus 1, and process cartridge 20, other than the outer cylinder 903, are the same as those described in the third embodiment, so like reference signs are assigned, and the description thereof is omitted.

Figure 31B:
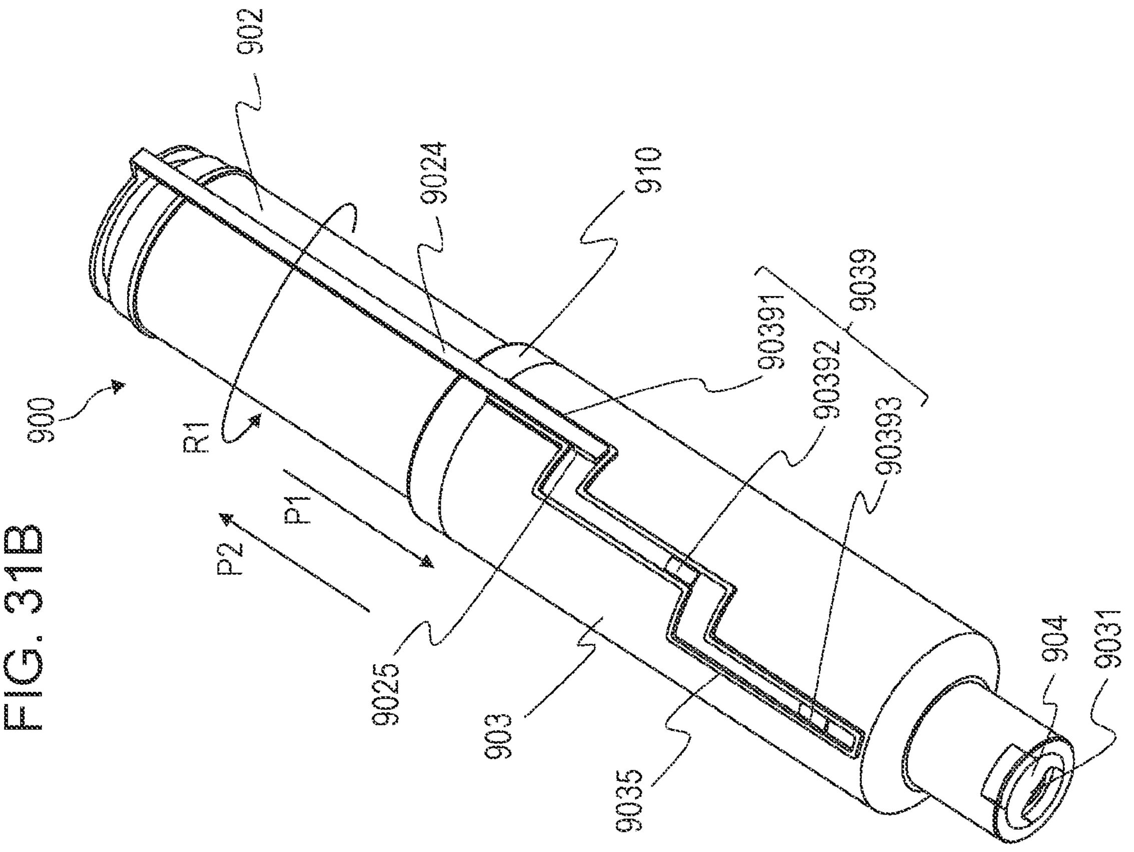
FIG. 31A and FIG. 31B are views of a toner bottle unit according to a fifth embodiment.
Figure 31A:
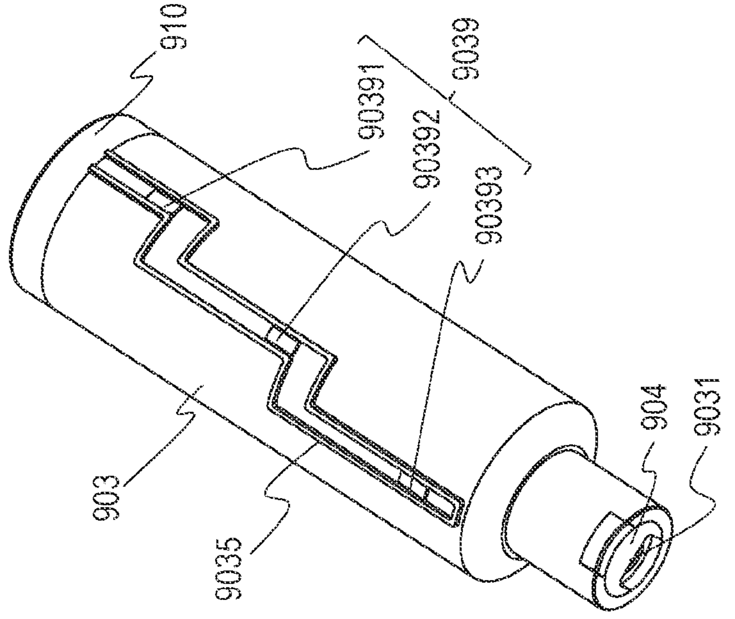

FIG. 31A is an external perspective view of the toner bottle unit 900, other than the piston 902. FIG. 31B is an external perspective view of the toner bottle unit 900 including the piston.

As shown in FIG. 31A, a plurality of resistance portions (reverse movement restriction portions) 9039 is provided in a region surrounded by the channel portion 9035 on the outer peripheral surface of the outer cylinder 903. The resistance portions 9039 include a first resistance portion 90391, a second resistance portion 90392, and a third resistance portion 90393. As shown in FIG. 31B, these resistance portions 9039 restrict movement of the piston 902 in the P1 direction by contacting with the distal end portion 9025 of the piston 902.

Here, a contact relation between the distal end portion 9025 and each of the resistance portions 9039 will be described by using an example of a state where the piston 902 is pushed in.

Figure 32B:
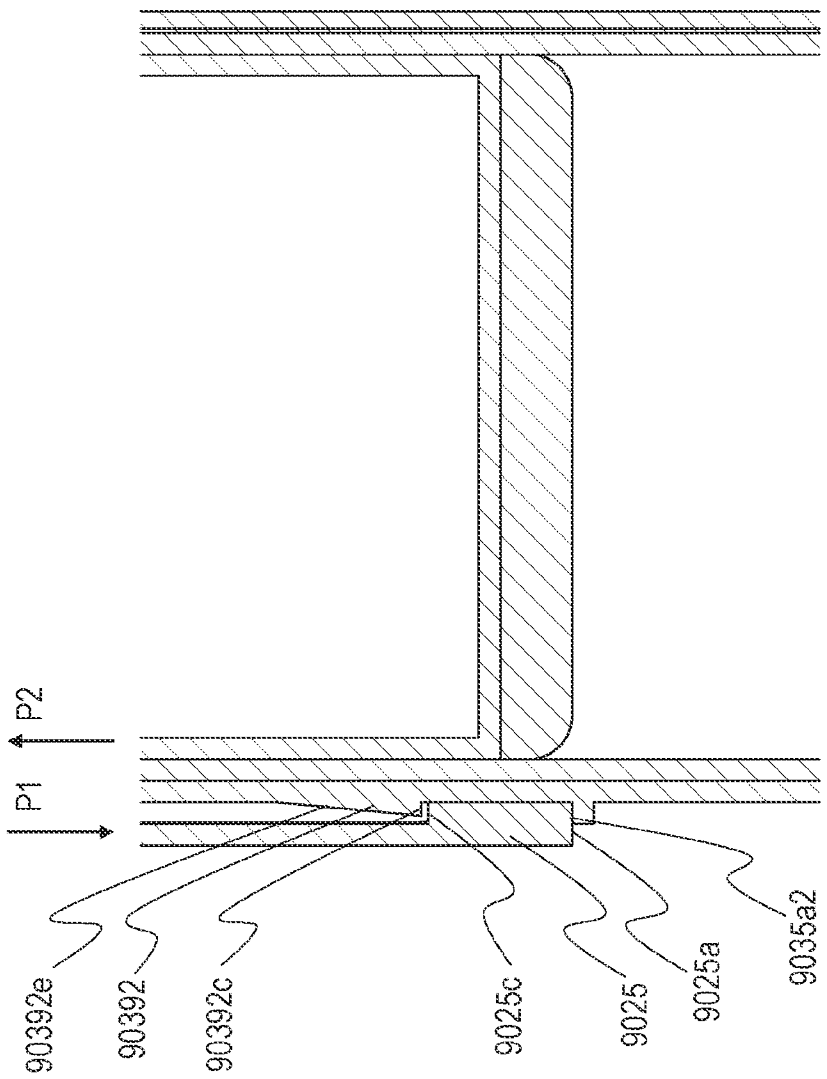
FIG. 32A and FIG. 32B are views illustrating a protruded portion of the toner bottle unit according to the fifth embodiment.
Figure 32A:
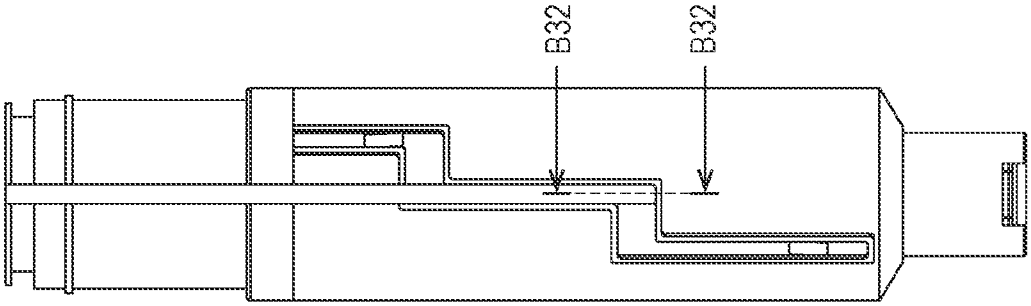

FIG. 32A is a top view of the toner bottle unit 900 when the piston 902 is pushed in one step. FIG. 32B is a cross-sectional view taken along the line B32-B32 in FIG. 32A.

As shown in FIG. 32B, the distal end portion 9025 of the piston 902 includes not only the distal end restricted surface 9025*a* that restricts movement in the P1 direction but also a reverse movement stopped surface 9025*c*) that restricts movement in the P2 direction opposite to the P1 direction. The second resistance portion 90392 provided in the outer cylinder 903 has an inclined surface 90392*e* and a reverse movement stop surface 90392*c* that contacts with the reverse movement stopped surface 9025*c*.

When the distal end portion 9025 moves in the P1 direction, the distal end portion 9025 is deformed to be lifted by the inclined surface 90392*e*. When the distal end portion 9025 directly moves in the P1 direction, the distal end portion 9025 slips off from the inclined surface 90392*e*, and then the distal end restricted surface 9025*a* contacts with the second stop surface 9035*a*2 and is not able to move in the P1 direction any more.

Here, when a user attempts to pull out the piston 902 in the P2 direction (in the direction opposite to the P1 direction), the reverse movement stopped surface 9025*c* contacts with the reverse movement stop surface 90392*c*, and movement is restricted. In this way, movement of the piston 902 in the P2 direction is restricted by the resistance portions 9039. Therefore, it is possible to avoid inconsistency between the push-in status of the piston 902 and the toner amount in the toner bottle unit 900.

The contact relation between the second resistance portion 90392 and the distal end portion 9025 is described as an example here; however, there is a similar contact relation at the first resistance portion 90391 and at the third resistance portion 90393, so the description thereof is omitted.

As described above, according to the present embodiment, it is possible to supply toner in the toner bottle unit 900 in a stepwise manner in accordance with the available capacity of the process cartridge 20. Therefore, toner leakage due to supply of toner greater than or equal to the available capacity of the process cartridge 20 is prevented.

Furthermore, in the present embodiment, by providing the resistance portions 9039 on the outer cylinder 903, it is possible to restrict movement of the piston 902 in a direction reverse to the pushing direction, so a user is able to correctly recognize the push-in status of the piston 902 and the toner amount in the toner bottle unit 900.

Sixth Embodiment

A sixth embodiment of the present disclosure will be described. In the third to fifth embodiments, the piston 902 includes the arm 9024 and the distal end portion 9025, and the outer cylinder 903 includes the channel portion 9035. In the present embodiment, a configuration in which the above relation is switched will be described.

The configurations of the toner bottle unit 900, image forming apparatus 1, and process cartridge 20, other than the outer cylinder 903 and the piston 902, are the same as those described in the third to fifth embodiments, so like reference signs are assigned, and the description thereof is omitted.

Figure 33:
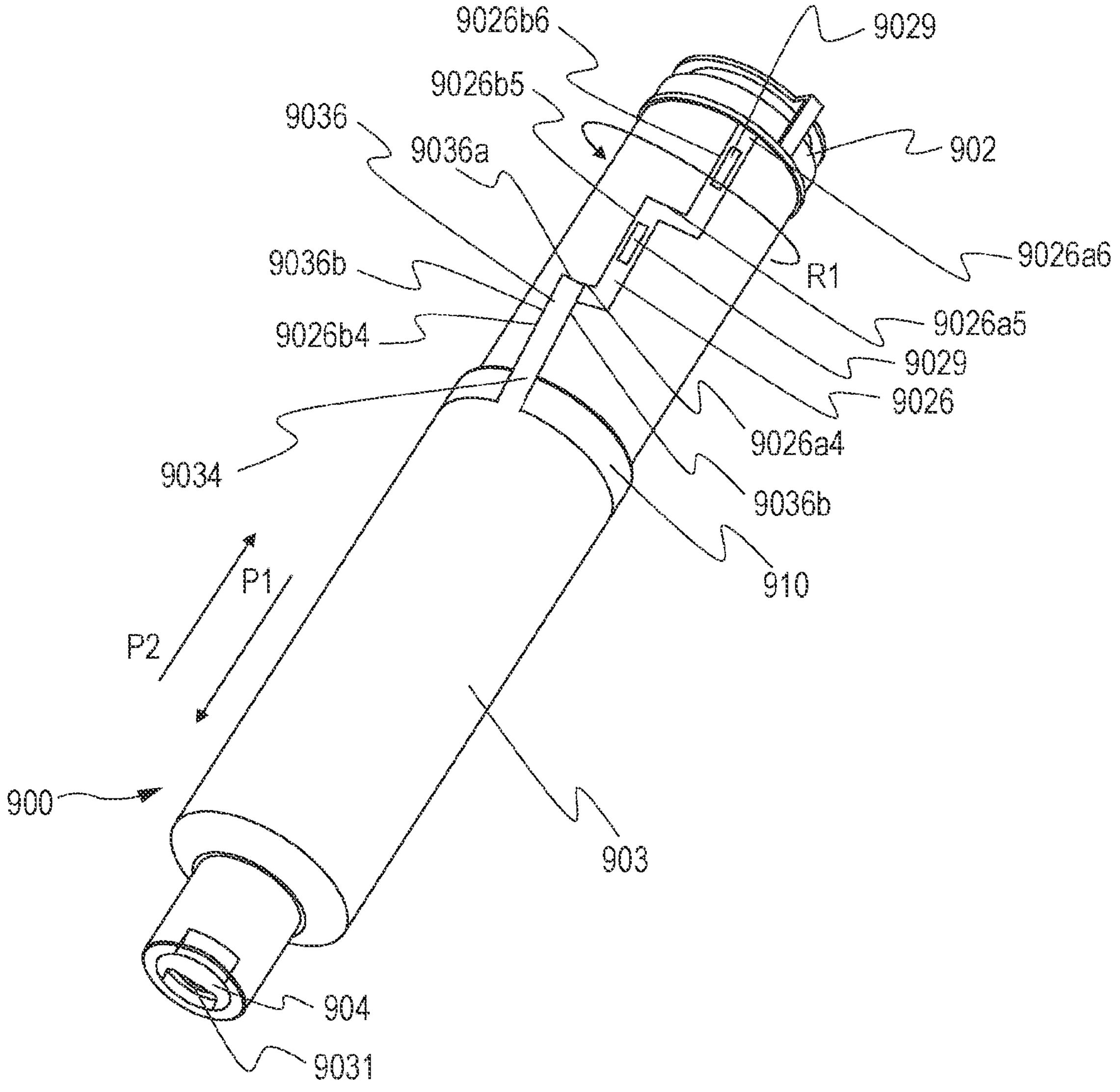
FIG. 33 is a view of a toner bottle unit according to a sixth embodiment.

FIG. 33 is an external perspective view of the toner bottle unit 900. As shown in FIG. 33, the piston 902 has a channel portion 9026 facing outward of the piston 902. A plurality of resistance portions (reverse movement restriction portions) 9029 is provided in a region surrounded by the channel portion 9026. The outer cylinder 903 has an arm 9034 extending in the P2 direction, that is, the direction opposite to the pushing direction (the P1 direction), and the arm 9034 further has a distal end portion 9036 that protrudes inward of the outer cylinder 903. The channel portion 9026 engages with the distal end portion 9036.

The resistance portions 9029, as well as the resistance portions 9039 in the fifth embodiment, are resistance portions that restrict movement of the piston 902 in the P2 direction.

Next, the arm 9034 and distal end portion 9036 of the outer cylinder 903 and the channel portion 9026 of the piston 902 will be described. The outer cylinder 903 has the arm 9034 and the distal end portion 9036. The distal end portion 9036 has a distal end restriction surface **9036*a* as a first restriction portion that restricts movement of the piston 902 in the P1 direction and rotation restriction surfaces 9036*b*** as a second restriction portion that restricts movement in the R1 direction.

The channel portion 9026 of the piston 902 has a fourth stop surface **9026*a*4, a fifth stop surface 9026*a*5, and a sixth stop surface 9026*a*6 as a first restricted portion that contacts with the distal end restriction surface 9036*a* of the distal end portion 9036 of the outer cylinder 903. The channel portion 9026 of the piston 902 has fourth rotation stop surfaces 9026*b*4, fifth rotation stop surfaces 9026*b*5, and sixth rotation stop surfaces 9026*b*6 as a second restricted portion that contacts with the rotation restriction surface 9036*b* of the distal end portion 9036 of the outer cylinder 903**.

A specific pushing operation of the piston 902 is the same as those of the third to fifth embodiments, so the description thereof is omitted.

In other words, a position where the distal end restriction surface **9036*a* contacts with the fourth stop surface 9026*a*4 is a first position of the piston 902 and the fourth stop surface 9026*a*4. A position where the distal end restriction surface 9036*a* contacts with the sixth stop surface 9026*a*6 is a second position of the piston 902 and the sixth stop surface 9026*a*6. A position where the distal end restriction surface 9036*a* contacts with the fifth stop surface 9026*a*5 is an intermediate position of the piston 902 and the fifth stop surface 9026*a*5** (a third position, and a first intermediate position).

In other words, the intermediate position is located between the first position and the second position in the P1 direction. A position where the piston 902 is rotated from the intermediate position in the R1 direction and the rotation restriction surface **9036*b* and the sixth rotation stop surface 9026*b*6 contact with each other is a fourth position of the piston 902 and the distal end portion 9025** (second intermediate position).

As described above, the toner bottle unit 900 has a movement restriction portion that restricts movement of the piston 902 in the P1 direction when the piston 902 is located at the intermediate position. The movement restriction portion includes the distal end portion 9036 and the fifth stop surface **9026*a*5. When the piston 902 and the distal end portion 9025 are at the intermediate position, pushing the piston 902 in the P1 direction is restricted. When the piston 902 and the distal end portion 9025 are moved from the intermediate position to the fourth position, pushing the piston 902** in the P1 direction is allowed again.

As described above, according to the present embodiment, it is possible to supply toner in the toner bottle unit 900 in a stepwise manner in accordance with the available capacity of the process cartridge 20. Therefore, toner leakage due to supply of toner greater than or equal to the available capacity of the process cartridge 20 is prevented.

A distance in the P1 direction between the distal end restriction surfaces of the piston 902 may be freely set, with the result that it is possible to adjust a toner ejection amount for a single pushing operation. The number of the distal end restriction surfaces of the piston 902 may also be freely set, with the result that it is possible to adjust the number of steps of ejection.

Seventh Embodiment

A seventh embodiment of the present disclosure will be described. In the present embodiment, another mode of the outer cylinder 903, described in the third to sixth embodiments, will be described. The configurations of the toner bottle unit 900, image forming apparatus 1, and process cartridge 20, other than the outer cylinder 903, are the same as those described in the third to sixth embodiments, so like reference signs are assigned, and the description thereof is omitted.

Figure 34B:
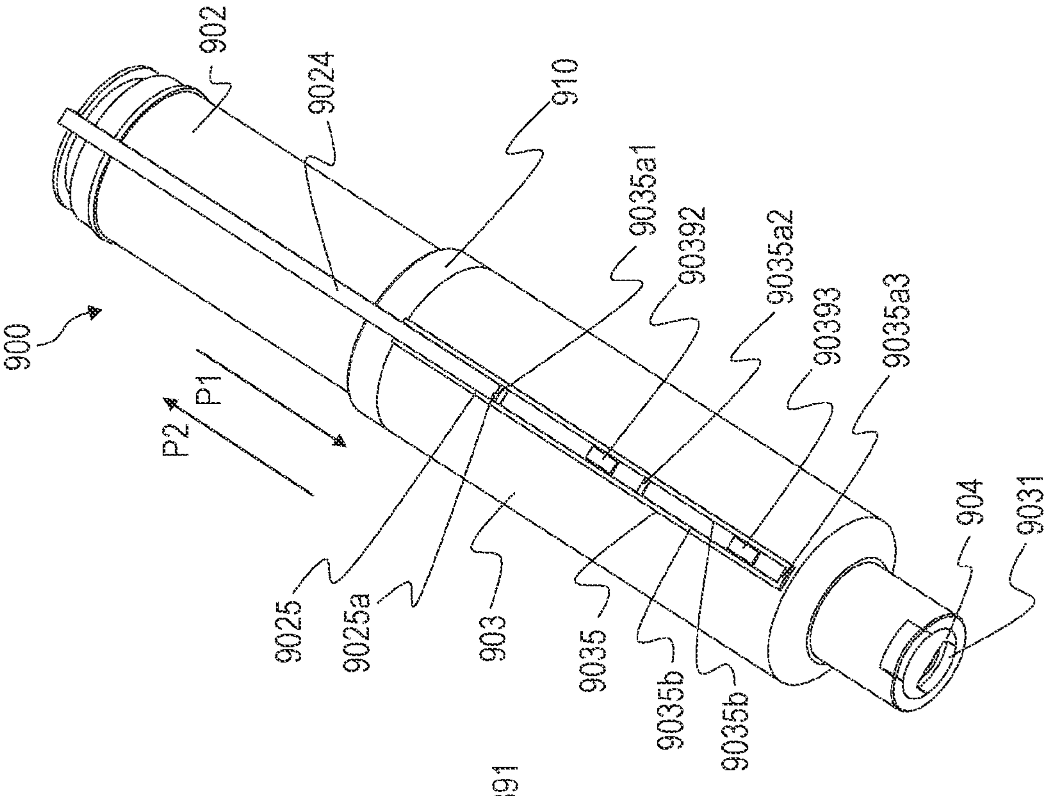
FIG. 34A and FIG. 34B are views of a toner bottle unit according to a seventh embodiment.
Figure 34A:
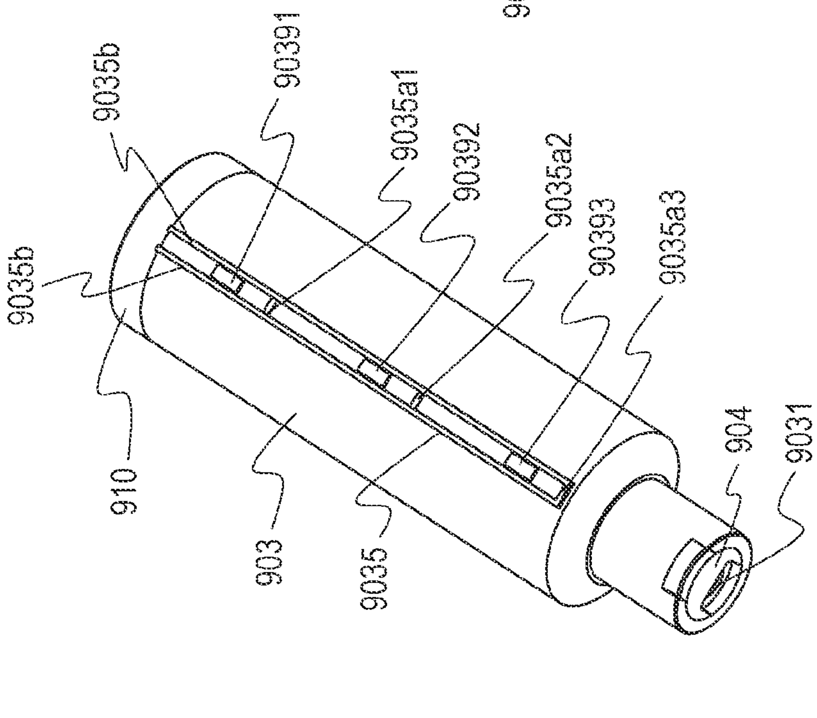

FIG. 34A is an external perspective view of the toner bottle unit 900, other than the piston 902. FIG. 34B is an external perspective view of the toner bottle unit 900 including the piston 902.

As shown in FIG. 34A, the outer cylinder 903 has the channel portion 9035. The channel portion 9035 has a first stop surface **9035*a*1, a second stop surface 9035*a*2, and a third stop surface 9035*a*3 as a first restricted portion that contacts with the distal end restricted surface 9025*a* of the distal end portion 9025 of the piston 902**.

The channel portion 9035 has rotation stop surfaces **9035*b* as a second restricted portion that contacts with the rotation restricted surfaces 9025*b* of the distal end portion 9025 of the piston 902 and restricts rotation of the piston 902 in the R1** direction.

The first resistance portion 90391, the second resistance portion 90392, and the third resistance portion 90393 are provided in a region surrounded by the channel portion 9035. The first resistance portion 90391, the second resistance portion 90392, and the third resistance portion 90393 are similar to the resistance portions 9039 in the fifth embodiment, so the description thereof is omitted.

Here, a contact relation between the channel portion 9035 and the distal end portion 9025 will be described by using an example of a state where the piston 902 is pushed in.

Figure 35A:
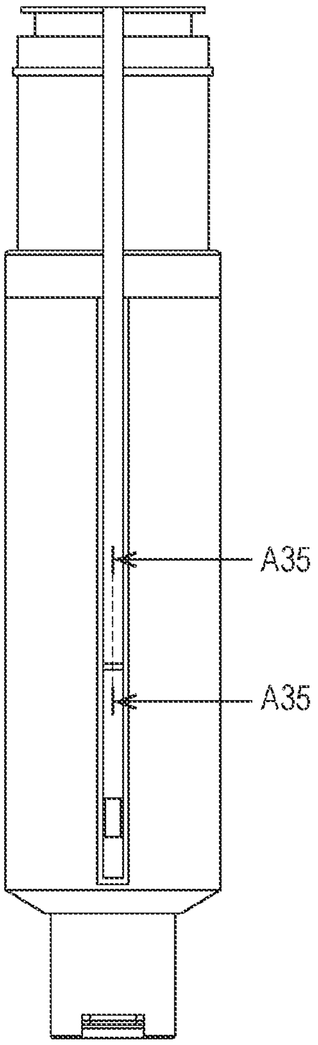
FIG. 35A and FIG. 35B are views illustrating a protruded portion of the toner bottle unit according to the seventh embodiment.
Figure 35B:
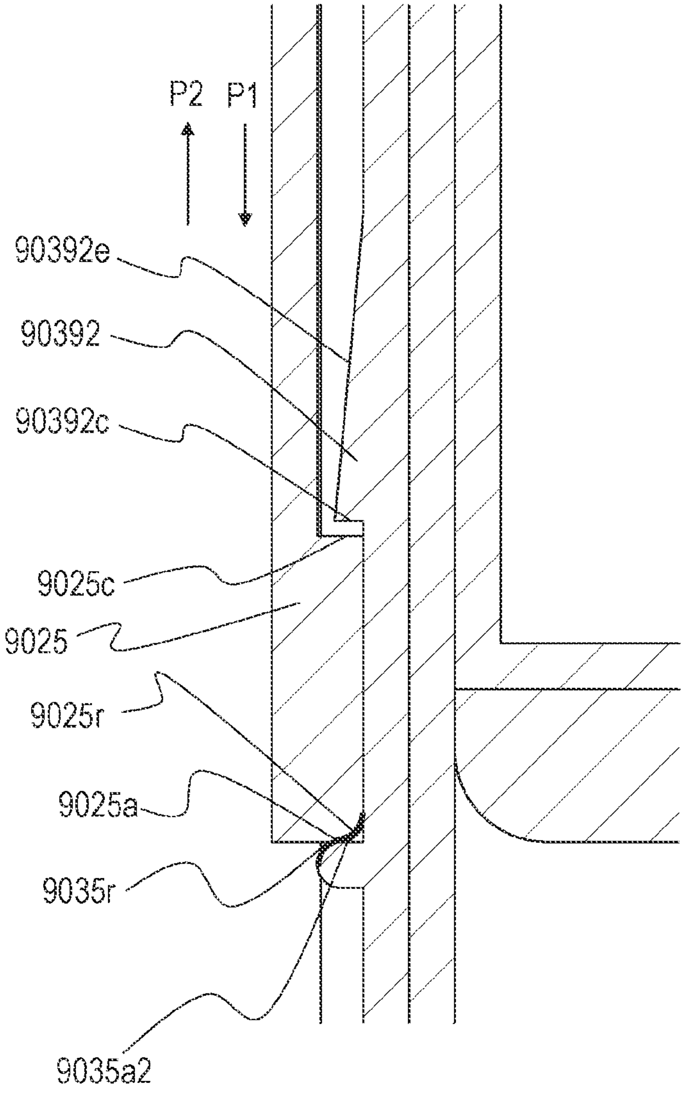

FIG. 35A is a top view of the toner bottle unit 900 when the piston 902 is pushed in one step. FIG. 35B is a cross-sectional view taken along the line A35-A35 in FIG. 35A.

As shown in FIG. 35B, the distal end portion 9025 of the piston 902 includes an R-shaped portion **9025*r* at the distal end restricted surface 9025*a* that restricts movement in the P1 direction. The channel portion 9035 of the outer cylinder 903 has an R-shaped portion 9035*r* at the second stop surface 9035*a*2**.

With the R-shaped portion **9025*r* and the R-shaped portion 9035*r*, the arm 9024 elastically deforms outward of the outer peripheral surface of the outer cylinder 903 by user's pushing force and is able to climb over the second stop surface 9035*a*2. The similar R-shaped portion is also formed at the first stop surface 9035*a*1, and the arm 9024 is able to climb over the first stop surface 9035*a*1** by user's pressing force.

More specifically, the arm 9024 deforms such that the distal end portion 9025 moves in a direction away from the outer cylinder 903. In other words, the R-shaped portion **9025*r* and the R-shaped portion 9035*r* each may be regarded as a control surface (guide surface) that controls (guides) the direction of the above-described deformation. Alternatively, only any one of the R-shaped portion 9025*r* and the R-shaped portion 9035*r* may be provided. One or both of the R-shaped portion 9025*r* and the R-shaped portion 9035*r*** may be modified as an inclined surface.

As shown in FIG. 34B, before a user pushes the piston 902 in the P1 direction, the distal end restricted surface **9025*a* and the first stop surface 9035*a*1 are in contact with each other (the first position of the piston 902**).

When the user pushes the piston 902 in the P1 direction, the arm 9024 elastically deforms, and the distal end restricted surface **9025*a* of the distal end portion 9025 climbs over the first stop surface 9035*a*1 and passes through the second resistance portion 90392. Then, when the distal end restricted surface 9025*a* contacts with the second stop surface 9035*a*2, the piston 902 once stops (the intermediate position of the piston 902). In other words, since the distal end portion 9025 contacts with the second stop surface 9035*a*2, resistance at the time of pushing the piston 902 increases. At the same time, movement of the piston 902 in the direction reverse to the P1 direction is restricted by the second resistance portion 90392. At this point in time, a half of toner contained in the toner bottle unit 900** is ejected.

In addition, when the user pushes the piston 902 in the P1 direction, the arm 9024 elastically deforms, and the distal end restricted surface **9025*a* of the distal end portion 9025 climbs over the second stop surface 9035*a*2. At this time, the distal end portion 9025 moves in the direction away from the outer cylinder 903. Then, the second stop surface 9035*a* passes through the third resistance portion 90393. Then, when the distal end restricted surface 9025*a* contacts with the third stop surface 9035*a*3, the piston 902 stops (the second position of the piston 902). At the same time, movement of the piston 902 in the direction reverse to the P1 direction is restricted by the third resistance portion 90393. At this point in time, the entire toner contained in the toner bottle unit 900** is ejected.

As described above, the toner bottle unit 900 has a movement restriction portion that restricts movement of the piston 902 in the P1 direction when the piston 902 is located at the intermediate position. The movement restriction portion includes the distal end portion 9025 and the second stop surface **9035*a*2. When the piston 902 and the distal end portion 9025 are at the intermediate position, the arm 9024 elastically deforms when the piston 902 is pushed in the P1 direction. Thus, pushing the piston 902 in the P1 direction is allowed again. As described in the sixth embodiment, the outer cylinder 903 has a portion corresponding to the distal end portion 9025 in the present embodiment, and the piston 902 has a portion corresponding to the second stop surface 9035*a*2**.

In this way, it is possible to push the piston 902 in a stepwise manner by the distal end portion 9025 of the piston 902 and the channel portion 9035 of the outer cylinder 903.

A distance in the P1 direction between the distal end restriction surfaces of the outer cylinder 903 may be freely set, with the result that it is possible to adjust a toner ejection amount for a single pushing operation. The number of the distal end restriction surfaces of the outer cylinder 903 may also be freely set, with the result that it is possible to adjust the number of steps of ejection.

As described above, according to the present embodiment, it is possible to supply toner in the toner bottle unit 900 in a stepwise manner in accordance with the available capacity of the process cartridge 20. The present embodiment does not use the operation to rotate the piston 902 as compared to the third embodiment, so it is possible to further simply supply toner from the toner bottle unit 900.

According to the embodiments of the present disclosure, it is possible to provide an image forming apparatus and a supply container (supply unit) used to supply toner to the image forming apparatus.

Eighth Embodiment

An eighth embodiment of the present disclosure will be described. When the configurations of the image forming apparatus 1 and process cartridge 20 are the same as those of the first embodiment, like reference signs are assigned, and the description thereof is omitted.

(9) Air Flow Configuration of Toner Receiving Unit

Hereinafter, a configuration that controls air flow in the toner receiving unit 801 resulting from supply of toner will be described.

(9-1) Configuration Inside Toner Receiving Unit

Figure 38:
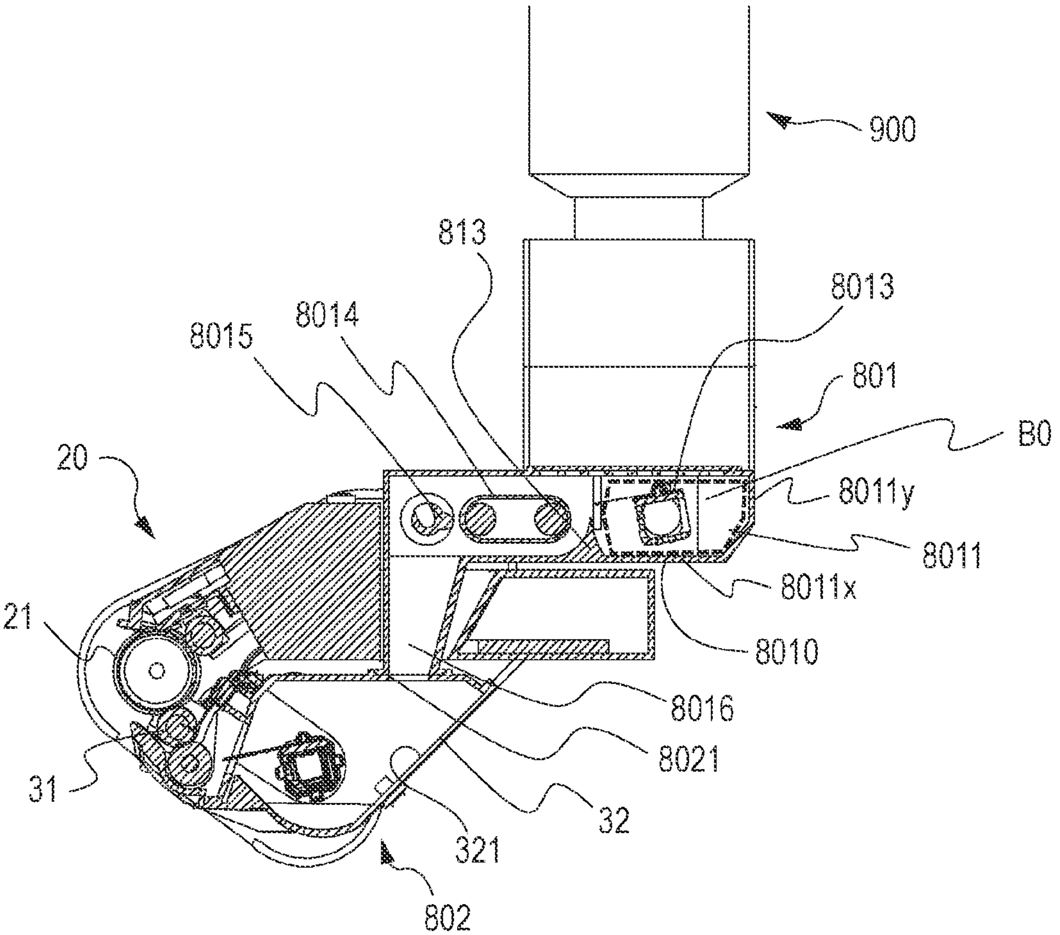
FIG. 38 is a cross-sectional view of a process cartridge according to the eighth embodiment.

FIG. 38 is a cross-sectional view showing the process cartridge 20 in a state where the toner bottle unit 900 is mounted on the toner receiving unit 801. As described above, the first conveyance member 8013, the second conveyance member 8014, and the third conveyance member 8015 that convey toner toward the developing unit 802 are installed in the toner containing portion 8011 of the toner receiving unit 801. The frame 8010 of the toner receiving unit 801 and the developer container 32 that is the frame of the developing unit 802 make up the frame of the process cartridge 20.

A partition wall 813 is provided between the first conveyance member 8013 and the second conveyance member 8014 inside the toner containing portion 8011. The partition wall 813 is a wall-shaped member that leaves a connection part for passing toner from the first conveyance member 8013 to the second conveyance member 8014 and that extends in the longitudinal direction of the process cartridge 20. The partition wall 813 forms a buffer region B0 with inner walls 8011*x*, 8011*y* of the toner containing portion 8011. The inner walls 8011*x*, 8011*y* similarly extend in the longitudinal direction. The buffer region B0 buffers toner flowing from the supply container into the process cartridge 20.

When the piston 902 (FIG. 15A to FIG. 15D) of the toner bottle unit 900 is pushed in, toner flows from the ejection port 9031 to the toner containing portion 8011 via the supply port 8012 together with air. Then, toner is conveyed by air along the buffer region B0 and disperses in the longitudinal direction. In this way, by disposing the partition wall 813, it is possible to prevent formation of steep air flow toward the developing unit 802.

(9-2) Air Outlet Configuration of Toner Receiving Unit

When the piston 902 of the toner bottle unit 900 shown in FIG. 38 is pushed in and toner is sent into the toner containing portion 8011 together with air, the internal pressure of the process cartridge 20 increases. At this time, the container of the process cartridge 20 can deform due to an increase in internal pressure, or air containing toner may jet through the supply port 8012 and, as a result, toner may leak. Then, in the present embodiment, the toner receiving unit 801 has an ventilation portion for discharging air in the cartridge. Air flowing from the supply container into the process cartridge 20 via the supply port 8012 is gas filled in the supply container together with toner and may be inert gas, such as nitrogen gas. In this case as well, when the ventilation portion is configured to be able to discharge air, the inert gas is discharged through the ventilation portion.

When the capacity of the toner bottle unit 900 is increased, larger amounts of air and toner flow into the process cartridge 20 in a short period of time. Therefore, the following configuration is also suitably applicable to a case where the capacity of the toner bottle unit 900 is increased.

In a supply container of a type in which the piston 902 is pushed in as in the case of the toner bottle unit 900, the internal pressure of the process cartridge 20 tends to increase as compared to a type in which toner is squeezed out from a bag member as in the case of the toner pack 40. Therefore, the present embodiment is particularly suitably applied to an image forming system that uses the toner bottle unit 900 as the supply container, and the toner pack 40 or other supply containers may be used.

Figure 39A:
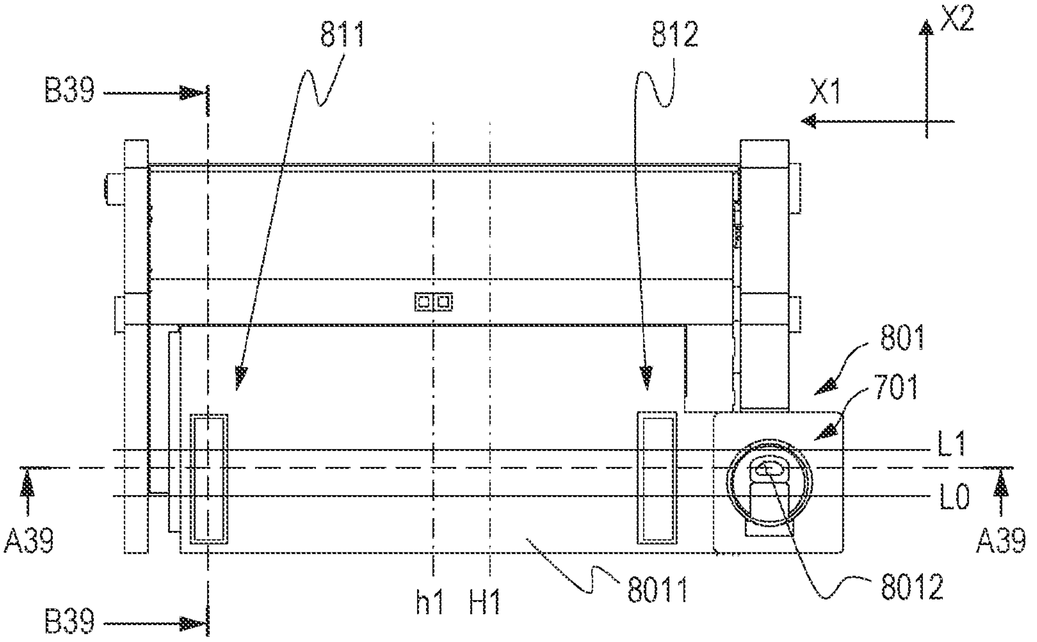
FIG. 39A to FIG. 39C are views for illustrating the air outlet configuration of the process cartridge according to the eighth embodiment.
Figure 39B:
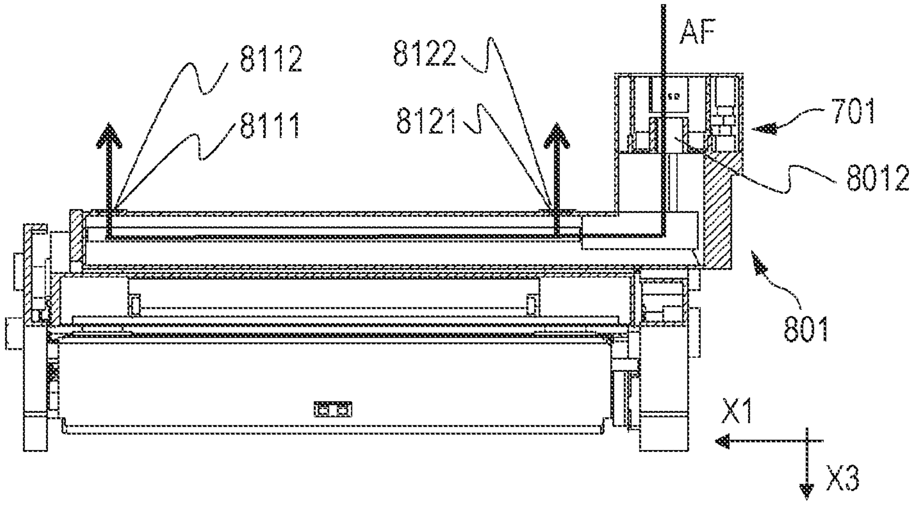
Figure 39C:
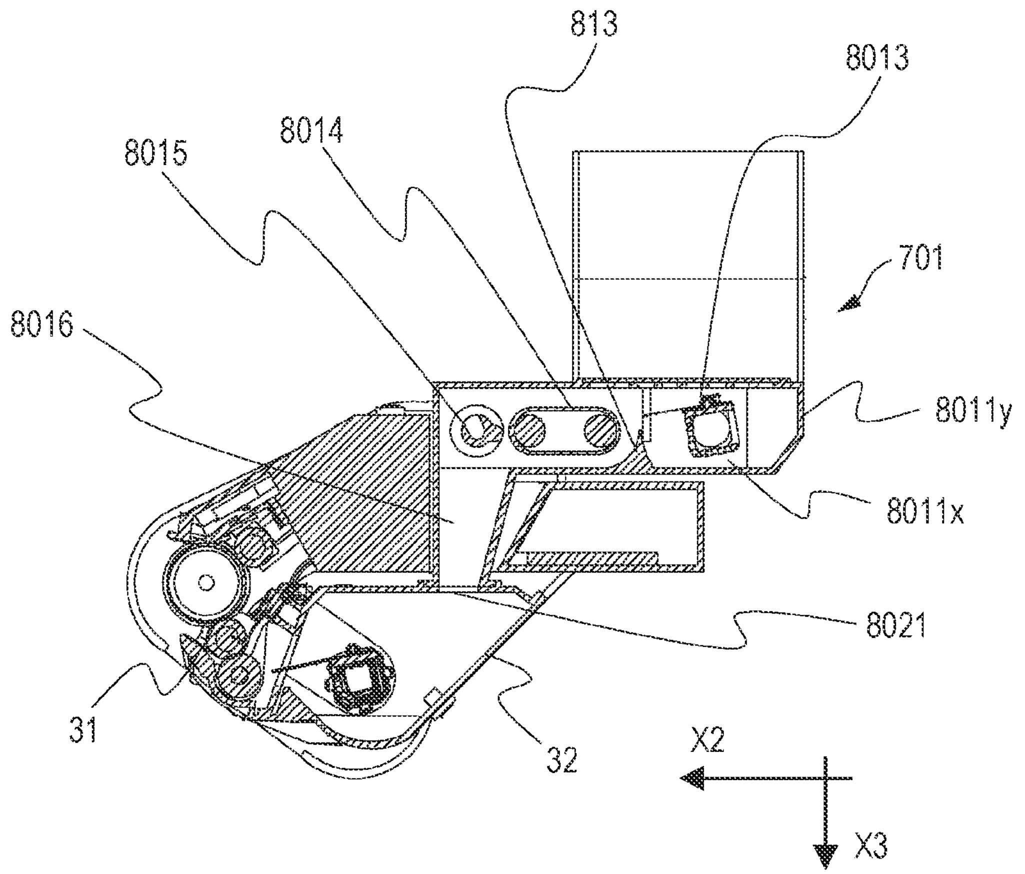
Figure 40:
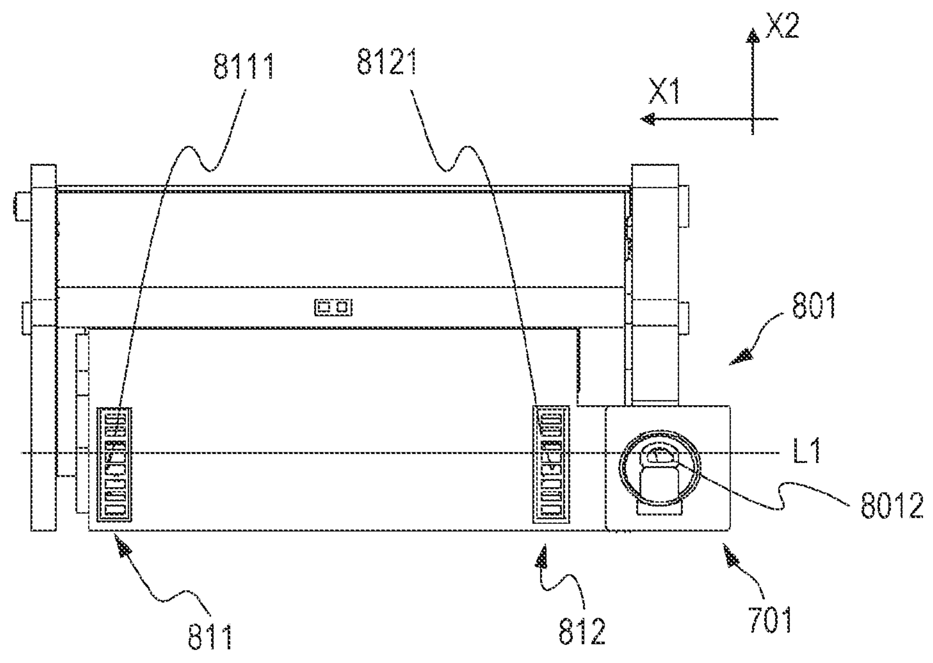
FIG. 40 is a view showing the arrangement of ventilation ports of the process cartridge according to the eighth embodiment.

FIG. 39A is a top view of the toner receiving unit 801. FIG. 39B is a cross-sectional view taken along the line A39-A39 in FIG. 39A. FIG. 39C is a cross-sectional view taken along the line B39-B39 in FIG. 39A. For the sake of easy illustration, the first conveyance member 8013, the second conveyance member 8014, and the third conveyance member 8015 are not shown in FIG. 39B. FIG. 40 is a view in which air pass filters (8112, 8122) (described later) are omitted from FIG. 39A.

The top views of the toner receiving unit 801 in the following description of FIG. 39A and FIG. 40 to FIG. 44B show a state where the toner receiving unit 801 in the same position as that at the time when the process cartridge 20 is mounted on the printer main body 100 is viewed along the vertical direction. More specifically, the top views show a state where the toner receiving unit 801 is viewed from above the toner receiving unit 801 in the vertical direction.

As shown in FIG. 39A, the first ventilation portion 811 and the second ventilation portion 812 are provided on the outer peripheral surface of the toner containing portion 8011. When viewed in the vertical direction, the first ventilation portion 811 and the second ventilation portion 812 are disposed so as to overlap a rotational axis L0 of the first conveyance member 8013 that conveys toner sent from the supply port 8012.

The first ventilation portion 811 may be disposed as far as possible from the supply port 8012 in the axial direction of the rotational axis L0 (that is, in the longitudinal direction of the toner containing portion 8011), and the second ventilation portion 812 is disposed between the first ventilation portion 811 and the supply port 8012. For example, the first ventilation portion 811 may be disposed across a center position H1 of the toner containing portion 8011 in the axial direction from the supply port 8012, and the second ventilation portion 812 may be disposed between the center position H1 of the toner containing portion 8011 and the supply port 8012. Alternatively, the first ventilation portion 811 may be disposed across a center position h1 of the developing roller 31 in the axial direction from the supply port 8012, and the second ventilation portion 812 may be disposed between the center position h1 of the developing roller 31 and the supply port 8012. Here, the developer container 32 has an opening, and part of the developing roller 31 faces the photosensitive drum 21. The center position h1 of the developing roller 31 also coincides with a center position, in the axial direction, of the opening provided in the developer container 32.

The second ventilation portion 812 is disposed so as to overlap a straight line L1 passing through the supply port 8012 and the first ventilation portion 811 when viewed in the vertical direction and forms linear air flow with a small loss. In the present embodiment, a straight line connecting the supply port 8012 and the first ventilation portion 811 by a shortest distance when viewed in the vertical direction is defined as the straight line L1.

In the relation with the partition wall 813, the first ventilation portion 811 and the second ventilation portion 812 are disposed upstream of the partition wall 813 in the movement direction of toner (see FIG. 6C) from the supply port 8012 toward the developing roller 31. In other words, the first ventilation portion 811 and the second ventilation portion 812 discharge air in the same compartment as the supply port 8012 (the buffer region B0, and see FIG. 38) within the space inside the process cartridge 20, defined by the partition wall 813.

As shown in FIG. 39B, the first ventilation portion 811 is made up of a first ventilation port 8111 that is an example of a first opening and a first air outlet filter 8112 that is an example of a first filter. The second ventilation portion 812 is made up of a second ventilation port 8121 that is an example of a second opening and a second air outlet filter 8122 that is an example of a second filter. Each of the first ventilation port 8111 and the second ventilation port 8121 has such a structure that a plurality of holes is arranged in a perpendicular direction (X2) perpendicular to the axial direction (X1) of the first conveyance member 8013 when viewed in the vertical direction. Thus, it is possible to prevent a breakage of the ventilation portion by equally dispersing air pressure on the air outlet filters. In the present embodiment, the longitudinal direction of each hole is a direction that intersects with the direction in which the holes are arranged (perpendicular direction (X2)). Thus, it is possible to stably attach the first air outlet filter 8112 and the second air outlet filter 8122. The sum of the opening areas of the holes that make up the first ventilation port 8111 is substantially equal to the sum of the opening areas of the holes that make up the second ventilation port 8121 (see FIG. 40). Each of the first air outlet filter 8112 and the second air outlet filter 8122 is an air pass filter made from a fine mesh structure that prevents passage of toner and that allows passage of air and is attached to the toner containing portion 8011 so as to cover a corresponding one of the ventilation ports.

When a user pushes in the piston 902 of the toner bottle unit 900 to eject toner, air flowing in together with toner passes through a path indicated by the arrow AF and goes out through the first ventilation portion 811 and the second ventilation portion 812. In this way, it is possible to form air flow resulting from supply of toner in the axial direction (X1) of the first conveyance member 8013. In other words, toner flowing in through the supply port 8012 located at the end portion of the toner containing portion 8011 is moved in the axial direction and supplied to the first conveyance member 8013. Thus, it is possible to smoothly proceed with conveyance of toner by the first conveyance member 8013 while avoiding deformation of the container and leakage of toner.

In the present embodiment, the opening area of the first ventilation port 8111 and the opening area of the second ventilation port 8121 are equal to each other. Alternatively, the opening areas may be different from each other. When the first ventilation port 8111 and the second ventilation port 8121 overlap the rotational axis L0 of the first conveyance member 8013 when viewed in the vertical direction, the first ventilation port 8111 and the second ventilation port 8121 may be offset from each other in the X2 direction.

The shape and number of the holes that make up each of the first ventilation port 8111 and the second ventilation port 8121 may be changed. In this case, within a range in which the air outlet filters do not break due to atmospheric pressure, the number of holes may be freely set, and each ventilation port may be made up of a single hole.

As described above, in the present embodiment, the frame of the process cartridge has the first opening and the second opening, and the openings are respectively covered with the first filter and the second filter. With this configuration, the air outlet performance of the process cartridge 20 improves, so it is possible to further reliably prevent deformation of the container and leakage of toner. With the configuration of the present embodiment, even when the amount of air flowing into the process cartridge 20 increases with an increase in the capacity of a toner bottle, it is possible to form air flow that efficiently sends toner to a first agitating member while ensuring sufficient air outlet performance.

As a modification example, a single slit (rectangular shape having an axial direction as a long-side direction) opening portion extending in the axial direction (X1) of the first conveyance member 8013 may be disposed and may be covered with a single air pass filter. In this case, it is conceivable that the opening portion is formed from the position of the first ventilation port 8111 to the position of the second ventilation port 8121 of the present embodiment in the axial direction (X1) and provided at a position that overlaps the first conveyance member 8013 when viewed in the vertical direction with respect to the perpendicular direction (X2).

Ninth Embodiment

A ninth embodiment will be described with reference to FIG. 41A and FIG. 41B. The present embodiment differs from the eighth embodiment in the disposition of the first ventilation portion 811 and the second ventilation portion 812. Like reference signs to those of the eighth embodiment are assigned to the other components having configurations and operations common to those of the eighth embodiment, and the description thereof is omitted.

Figure 41B:
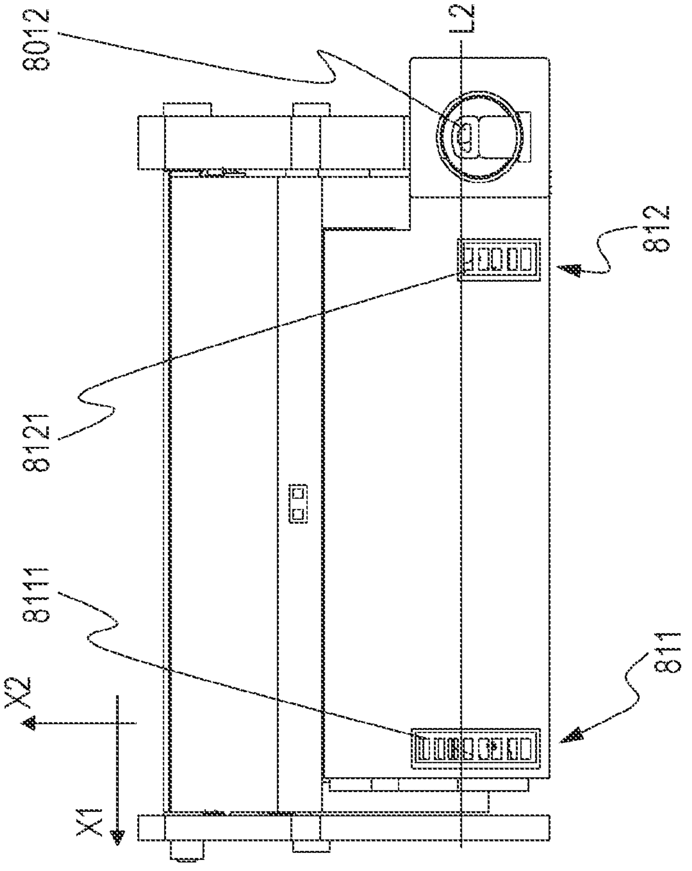
FIG. 41A and FIG. 41B are views for illustrating the air outlet configuration of a process cartridge according to a ninth embodiment.
Figure 41A:
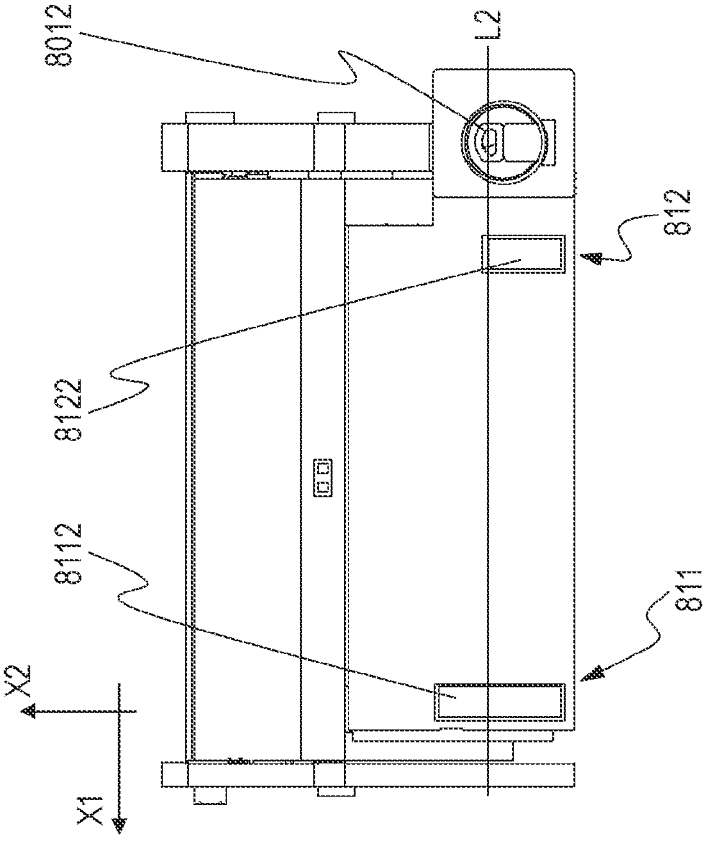

FIG. 41A is a top view of the toner receiving unit 801 according to the present embodiment. FIG. 41B is a view in which the first air outlet filter 8112 and the second air outlet filter 8122 are omitted from FIG. 41A. As shown in FIG. 41A and FIG. 41B, the first ventilation portion 811 is made up of the first ventilation port 8111 and the first air outlet filter 8112, and the second ventilation portion 812 is made up of the second ventilation port 8121 and the second air outlet filter 8122. The first ventilation port 8111 has such a structure that a plurality of holes (first holes) is arranged in the X2 direction perpendicular to the axial direction (X1) of the first conveyance member 8013 when viewed in the vertical direction. Similarly, the second ventilation port 8121 has such a structure that a plurality of holes (second holes) is arranged in the X2 direction when viewed in the vertical direction.

Here, as shown in FIG. 41B, in the present embodiment, the opening area of the first ventilation port 8111 and the opening area of the second ventilation port 8121 are different from each other. In other words, the sum of the opening areas of the holes that make up the first ventilation port 8111 is greater than the sum of the opening areas of the holes that make up the second ventilation port 8121. Therefore, air flowing in through the supply port 8012 during toner supply is more preferentially discharged from the first ventilation portion 811 than from the second ventilation portion 812. In other words, the flow rate of air flowing from the position of the second ventilation portion 812 toward the first ventilation portion 811 along the axial direction (X1) of the first conveyance member 8013 increases as compared to the eighth embodiment. Thus, it is possible to form further stable air flow to the end portion of the first conveyance member 8013 in the axial direction (X1).

For the air permeability of each of the first air outlet filter 8112 and the second air outlet filter 8122, the amount of air flowing out from the first ventilation portion 811 may be greater than that from the second ventilation portion 812, and, for example, the air permeability of the first air outlet filter 8112 may be higher than that of the second air outlet filter 8122. The shape and number of the holes that make up each of the first ventilation port 8111 and the second ventilation port 8121 may be changed as in the case of the eighth embodiment.

As described above, according to the ninth embodiment as well, it is possible to further reliably prevent deformation of the container and leakage of toner by enhancing the air outlet performance of the process cartridge 20. Even when the amount of air flowing into the process cartridge 20 increases with an increase in the capacity of a toner bottle, it is possible to form air flow that sends toner to a position apart from the supply port while ensuring sufficient air outlet performance.

Tenth Embodiment

A tenth embodiment will be described. The present embodiment differs from the eighth embodiment in the configuration regarding the air permeability of each of the first ventilation portion 811 and the second ventilation portion 812. Like reference signs to those of the eighth embodiment are assigned to the other components having configurations and operations common to those of the eighth embodiment, and the description thereof is omitted.

Figure 42B:
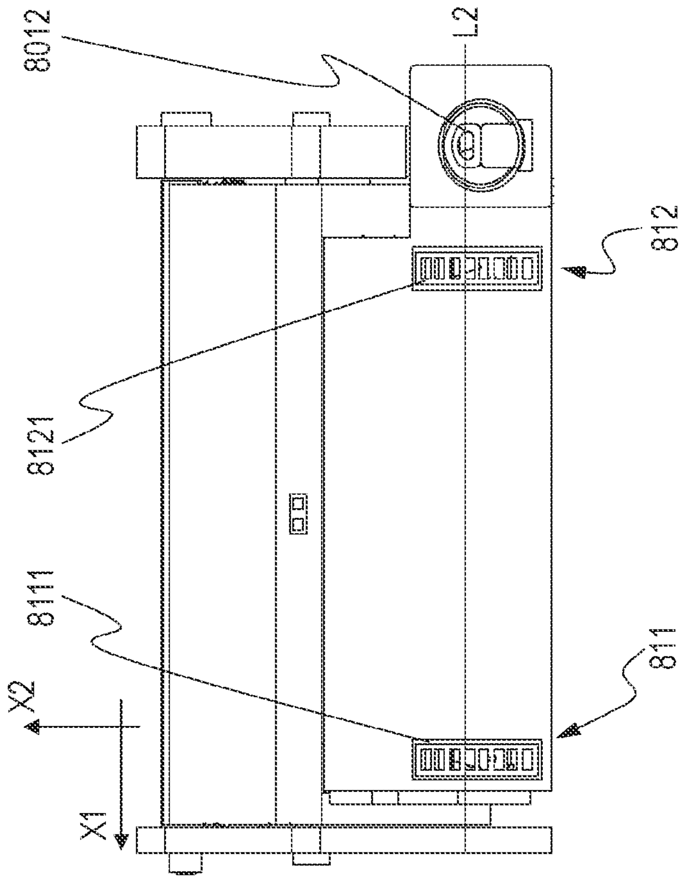
FIG. 42A and FIG. 42B are views for illustrating the air outlet configuration of a process cartridge according to a tenth embodiment.
Figure 42A:
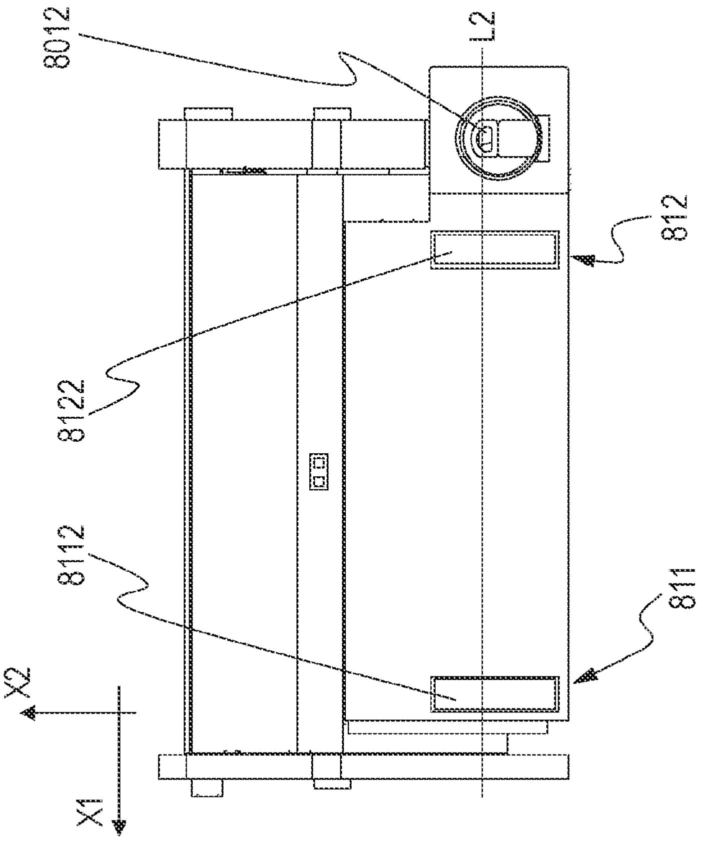

FIG. 42A is a top view of the toner receiving unit 801 according to the present embodiment. FIG. 42B is a view in which the first air outlet filter and the second air outlet filter are omitted from FIG. 42A. As shown in FIG. 42A and FIG. 42B, the first ventilation portion 811 is made up of the first ventilation port 8111 and the first air outlet filter 8112, and the second ventilation portion 812 is made up of the second ventilation port 8121 and the second air outlet filter 8122. As shown in FIG. 42A, the first ventilation port 8111 and the second ventilation port 8121 have equal opening areas.

Here, the first air outlet filter 8112 and the second air outlet filter 8122, shown in FIG. 42B, are different in air permeability from each other. The first air outlet filter 8112 has a rougher mesh structure than the second air outlet filter 8122 and is higher in air permeability than the second air outlet filter 8122. In other words, the first air outlet filter 8112 as a first filter in the present embodiment is made of a material having a higher air permeability than the second air outlet filter 8122 as a second filter.

Thus, air flowing in through the supply port 8012 is preferentially discharged from the first ventilation portion 811. In other words, the flow rate of air flowing from the position of the second ventilation portion 812 toward the first ventilation portion 811 along the axial direction (X1) of the first conveyance member 8013 increases as compared to the eighth embodiment. Therefore, it is possible to suppress, for example, a situation in which most of inflow air goes out through the second ventilation portion 812 and air flow that sends toner does not reach the end portion of the first conveyance member 8013 in the axial direction.

As long as the amount of air flowing out from the first ventilation portion 811 is greater than that from the second ventilation portion 812, for example, the opening area of the second ventilation port 8121 may be greater than that of the first ventilation port 8111 instead of the configuration in which the opening areas of the first ventilation port 8111 and the second ventilation port 8121 are equal to each other. In contrast, with a combination of the ninth embodiment and the tenth embodiment, discharge of air from the first ventilation portion 811 may be further facilitated by reducing the opening area of the first ventilation port 8111 as compared to the second ventilation port 8121. The shape and number of the holes that make up each of the first ventilation port 8111 and the second ventilation port 8121 may be changed as in the case of the eighth embodiment.

As described above, according to the tenth embodiment as well, it is possible to further reliably prevent deformation of the container and leakage of toner by enhancing the air outlet performance of the process cartridge 20. Even when the amount of air flowing into the process cartridge 20 increases with an increase in the capacity of a toner bottle, it is possible to form air flow that sends toner to a position apart from the supply port while ensuring sufficient air outlet performance.

Eleventh Embodiment

An eleventh embodiment will be described. The present embodiment differs from the eighth embodiment in the disposition of the first ventilation portion 811 and the second ventilation portion 812. Like reference signs to those of the eighth embodiment are assigned to the other components having configurations and operations common to those of the eighth embodiment, and the description thereof is omitted.

Figure 43B:
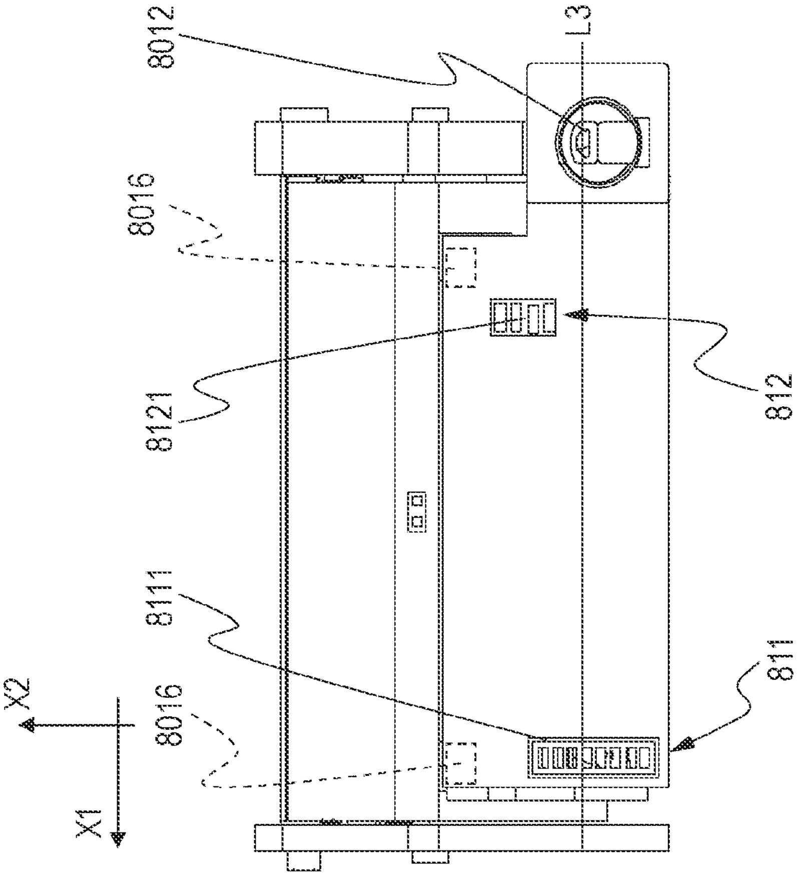
FIG. 43A and FIG. 43B are views for illustrating the air outlet configuration of a process cartridge according to an eleventh embodiment.
Figure 43A:
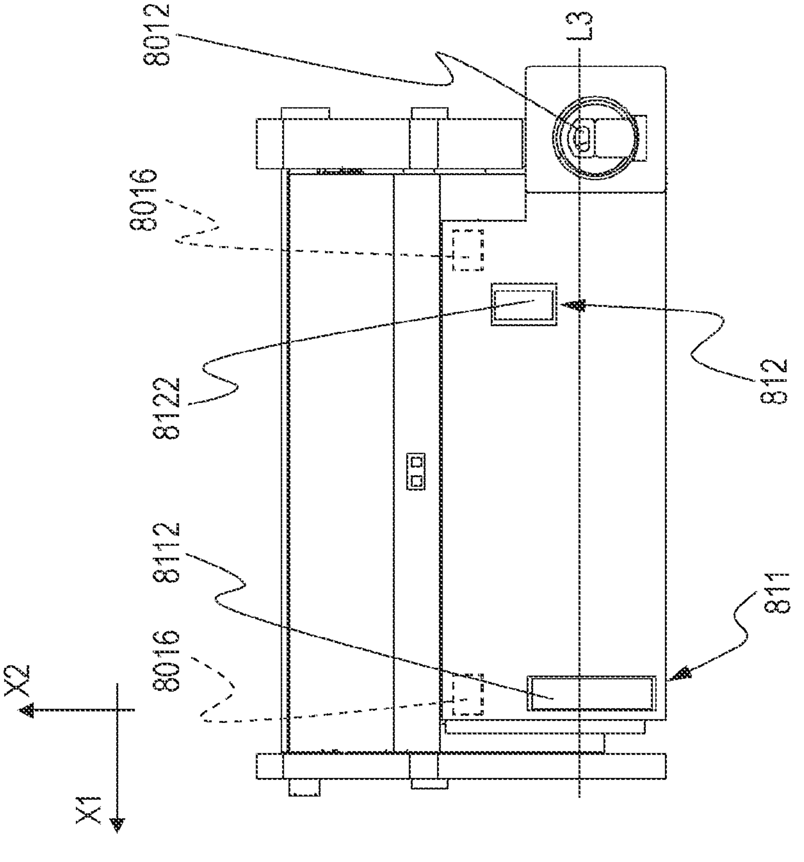

FIG. 43A is a top view of the toner receiving unit 801. FIG. 43B is a view in which the first air outlet filter and the second air outlet filter are omitted from FIG. 43A. As shown in FIG. 43A and FIG. 43B, the first ventilation portion 811 is disposed so as to overlap the rotational axis L0 of the first conveyance member 8013 when viewed in the vertical direction and is disposed as far as possible from the supply port 8012 in the axial direction (X1) of the first conveyance member 8013. The second ventilation portion 812 is located between the first ventilation portion 811 and the supply port 8012 in the axial direction (X1) of the first conveyance member 8013.

Here, the second ventilation portion 812 of the present embodiment is disposed between the ejection port 8016 and supply port 8012 of the toner receiving unit 801 in the X2 direction when viewed in the vertical direction. The ejection port 8016 is a communication portion (see FIG. 38) that communicates the toner containing portion 8011 of the toner receiving unit 801 as a first containing portion with a toner containing chamber 321 in the developer container 32 as a second containing portion. In other words, the second ventilation port 8121 that is a second opening of the present embodiment is located between the supply port 8012 and the ejection port 8016 as the communication portion in the perpendicular direction (X2) perpendicular to the rotational axis of the first conveyance member 8013.

Thus, it is possible to form air flow that sends toner to the first conveyance member 8013 with the first ventilation portion 811 and to form air flow in a direction to approach the ejection port 8016 in the X2 direction with the second ventilation portion 812. At this time, since the second ventilation portion 812 is disposed at the above-described position, it is possible to discharge air before the ejection port 8016, so it is possible to suppress clogging of the ejection port 8016 with toner pouring into the ejection port 8016.

The shape and number of the holes that make up each of the first ventilation port 8111 and the second ventilation port 8121 may be changed as in the case of the eighth embodiment. For the opening areas of the first ventilation port 8111 and second ventilation port 8121 and the first air outlet filter 8112 and the second air outlet filter 8122, the ninth and tenth embodiments may be applied in combination.

As described above, according to the eleventh embodiment as well, it is possible to further reliably prevent deformation of the container and leakage of toner by enhancing the air outlet performance of the process cartridge 20. Even when the amount of air flowing into the process cartridge 20 increases with an increase in the capacity of a toner bottle, it is possible to prevent clogging of the ventilation ports with toner while ensuring sufficient air outlet performance.

Modification Example

Figure 44B:
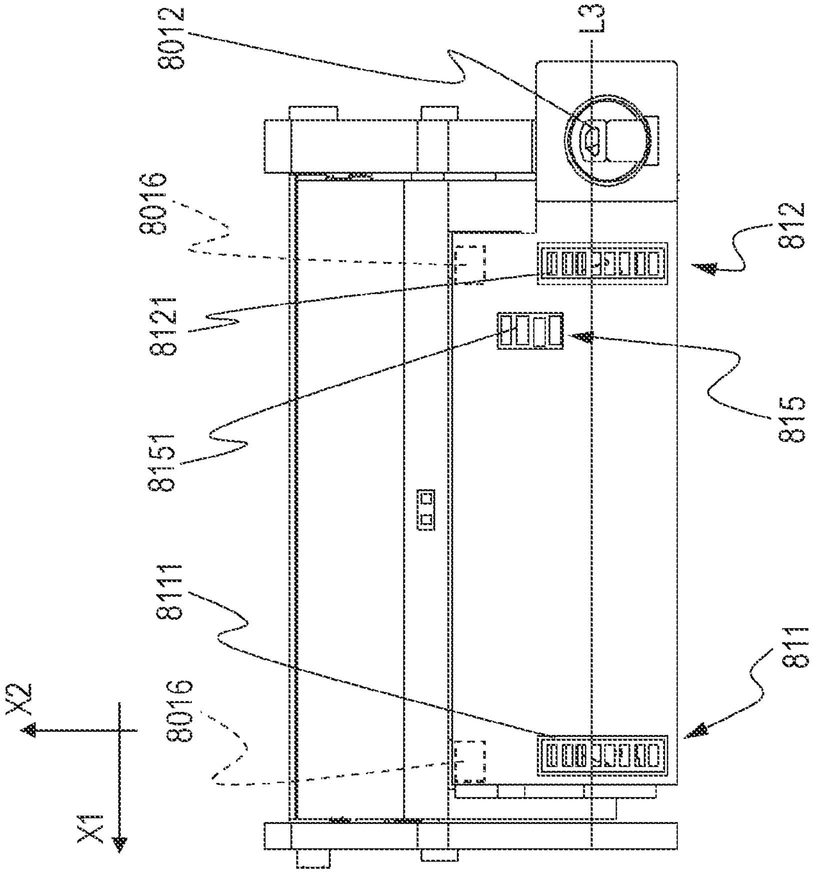
FIG. 44A and FIG. 44B are views for illustrating a modification example of the eleventh embodiment.
Figure 44A:
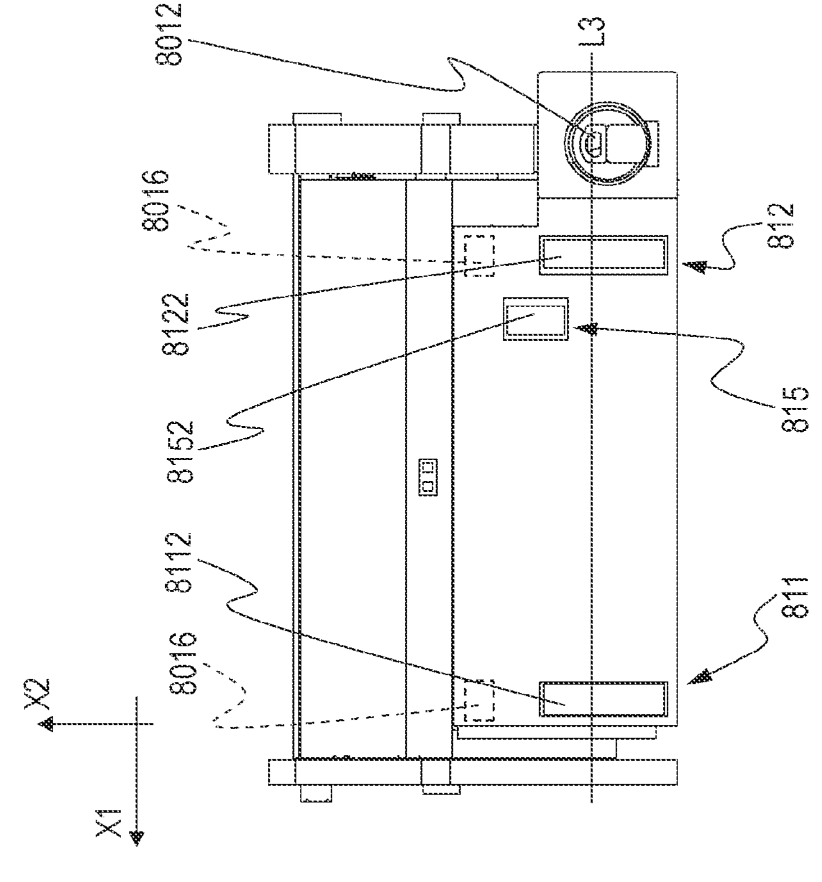

An ventilation portion similar to the second ventilation portion in the present embodiment may be added to the eighth embodiment as an intermediate ventilation portion 815 as shown in FIG. 44A and FIG. 44B. In this modification example, the intermediate ventilation portion 815 as a third ventilation portion is provided between the first ventilation portion 811 and the second ventilation portion 812 in the axial direction (X1) of the first conveyance member 8013. The intermediate ventilation portion 815 is made up of an intermediate ventilation port 8151 as a third opening and an intermediate air outlet filter 8152 as a third filter attached so as to cover the intermediate ventilation port 8151.

Not limited to the example of the disposition of FIG. 44A and FIG. 44B, three or more ventilation portions may be disposed in the process cartridge 20.

Twelfth Embodiment

A twelfth embodiment will be described. The present embodiment differs from the eighth embodiment in the configuration of the filters provided at the ventilation portions. Like reference signs to those of the eighth embodiment are assigned to the other components having configurations and operations common to those of the eighth embodiment, and the description thereof is omitted.

Figure 45:
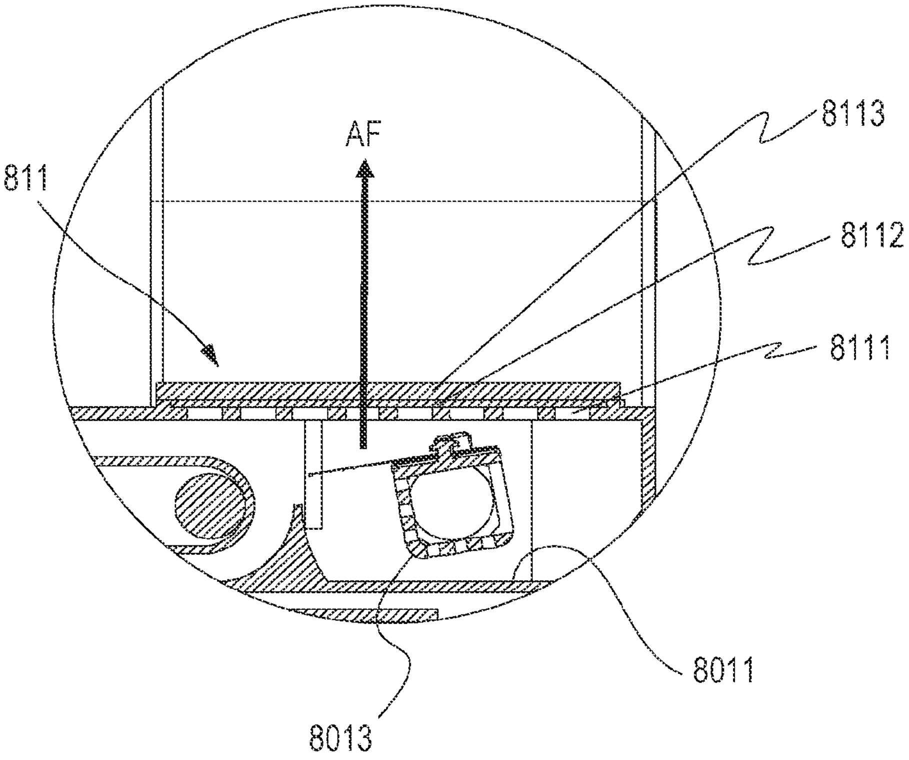
FIG. 45 is a view for illustrating the air outlet configuration of a process cartridge according to a twelfth embodiment.

FIG. 45 is a cross-sectional view of the first ventilation portion 811 described in the eighth embodiment. As shown in FIG. 45, the first ventilation portion 811 has such a double structure that, in a direction in which air goes through (arrow AF), the first air outlet filter 8112 is installed downstream of the first ventilation port 8111 and a first protection sheet 8113 is installed further downstream of the first air outlet filter 8112. The first protection sheet 8113 is a nonwoven sheet formed by entangling fibers. The first protection sheet 8113 traps toner and particles (dust or the like) smaller than toner and prevents passage of these foreign substances. The second ventilation portion 812 (not shown) also has such a double structure that a second air outlet filter 8122 and a second protection sheet are provided downstream of the second ventilation port 8121.

According to the present embodiment, by adding the protection sheet outside the air outlet filter (downstream of the air outlet filter), it is possible to further reliably prevent toner from scattering to the outside of the process cartridge 20. In addition, by trapping foreign substances, such as dust, that attempts to enter from the outside of the toner receiving unit 801 with the protection sheet, it is possible to suppress a decrease in air outlet performance due to foreign substances deposited in the air outlet filter.

The filter configuration of the present embodiment is applicable to part or all of the air outlet filters in the eighth to eleventh embodiments and their modification examples.

Thirteenth Embodiment

A thirteenth embodiment will be described. The present embodiment differs from the eighth embodiment in that a plurality of weight members that prevent agglomeration of toner inside the supply container is contained. Like reference signs to those of the eighth embodiment are assigned to the other components having configurations and operations common to those of the eighth embodiment, and the description thereof is omitted.

Hereinafter, the toner bottle unit 900 will be described as an example of the supply container. When the toner bottle unit 900 is stored in the same position or when the toner bottle unit 900 receives vibrations or the like of transport in the same position, toner filled in the toner bottle unit 900 gradually agglomerates by its own weight and decreases in flowability.

As described with reference to FIG. 15D, the inner cylinder 901 of the toner bottle unit 900 contains the spherical weight member 905 for making it easy to eject toner by loosening agglomerated toner. Before toner is supplied from the toner bottle unit 900 to the process cartridge 20, a user may shake the toner bottle unit 900 to agitate toner. At this time, inside the toner bottle unit 900, the weight member 905 freely moves around relative to the inner cylinder 901 to repeatedly contact with toner, thus mixing toner with air in the toner containing portion 9014 while loosening agglomerated toner. With this configuration, flowability of toner improves, and ejection of toner from the toner bottle unit 900 is more smoothly performed.

However, it is conceivable that toner strongly agglomerates during storage or during transport. In this case, when the number of times or speed by which a user shakes the toner bottle unit 900 is insufficient, ejection of toner may begin without eliminating agglomeration of toner, and poor ejection may occur. When the amount of toner filled is increased by increasing the capacity of the toner bottle unit 900 as well, poor ejection due to agglomeration of toner may occur.

Figure 46C:
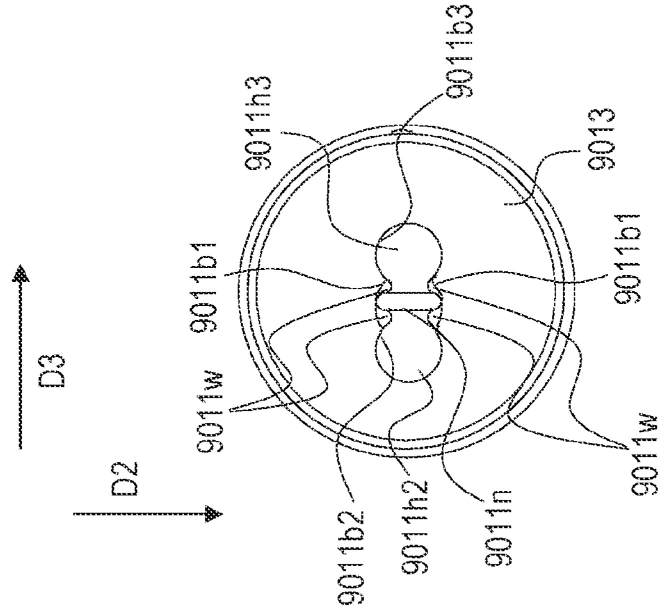
FIG. 46A to FIG. 46C are views for illustrating a toner bottle unit according to a thirteenth embodiment.
Figure 46B:
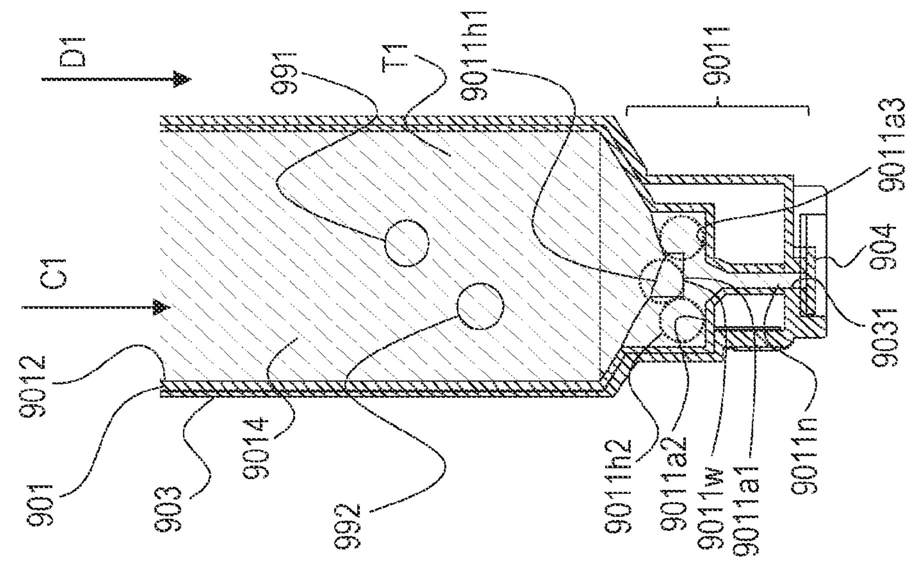
Figure 46A:
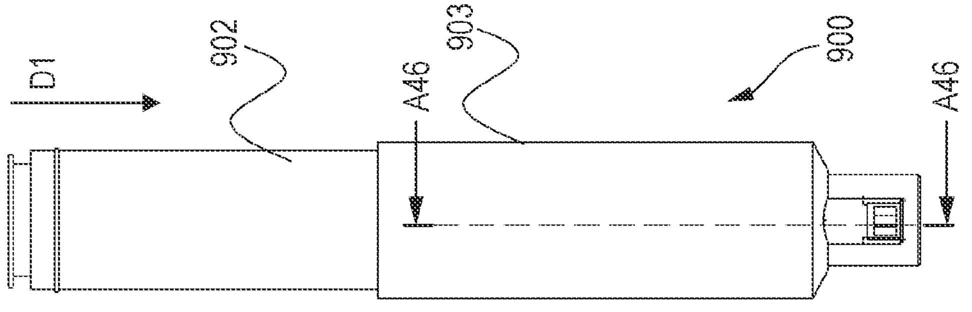

Then, in the present embodiment, a plurality of weight members is disposed inside the toner bottle unit 900. FIG. 46A is a front view of the toner bottle unit 900. FIG. 46B is a cross-sectional view taken along the line A46-A46 in FIG. 46A. FIG. 46C is a view of the ejection port when viewed in the direction of the arrow C1 shown in FIG. 46B. In the drawing, the direction of the arrow D1 is a mounting and detaching direction of the toner bottle unit 900 and is a pushing direction of the piston 902. The direction of the arrow D2 and the direction of the arrow D3 each are a direction perpendicular to the D1 direction. The direction of the arrow D2 is perpendicular to the direction of the arrow D3. When the D1 direction is defined as a first direction, the D2 direction and the D3 direction are respectively an example of a second direction and an example of a third direction.

As described above, the inner cylinder 901 of the toner bottle unit 900 includes the toner containing portion 9014, the bottom portion 9013, the opening portion 9012, and the ejection port 9011 and is fitted to the outer cylinder 903 (FIG. 46A and FIG. 46B). The ejection port 9011 together with the ejection port 9031 of the outer cylinder 903 makes up the ejection port of the toner bottle unit 900. The piston 902 as a pushing member is slidably fitted to the inner cylinder 901 via the opening portion 9012. The inner cylinder 901 and the outer cylinder 903 make up the frame of the supply container (toner container) according to the present embodiment.

Here, the toner bottle unit 900 of the present embodiment contains a first weight member 991 as a first movable member and a second weight member 992 as a second movable member. The first weight member 991 and the second weight member 992 are spheres made of metal. The first weight member 991 and the second weight member 992 have the same size and specific gravity.

The first weight member 991 and the second weight member 992 are encapsulated in the toner containing portion 9014 together with toner T1 and are configured not to slip off to the outside of the toner bottle unit 900 through the ejection port 9011. Inside the toner containing portion 9014, the first weight member 991 and the second weight member 992 are freely movable without restraint from the inner cylinder 901. In other words, the first weight member 991 and the second weight member 992 each are able to freely (independently) move in the first direction (D1 direction), the second direction (D2 direction), and the third direction (D3 direction) relative to the frame of the toner bottle unit 900. In other words, the degree of freedom of each of the first weight member 991 and the second weight member 992 is six. In other words, the first weight member 991 and the second weight member 992 each are able to move in any of the D1 direction, the D2 direction, and the D3 direction relative to the frame of the toner bottle unit 900. For example, the first weight member 991 and the second weight member 992 each are able to move in the D1 direction even when the first weight member 991 and the second weight member 992 each do not move in the D2 direction or the D3 direction relative to the frame of the toner bottle unit 900. The first weight member 991 and the second weight member 992 each are able to move in the D1 direction and the D2 direction even when the first weight member 991 and the second weight member 992 each do not move in the D2 direction relative to the frame of the toner bottle unit 900. The first weight member 991 and the second weight member 992 each are able to move in the D1 direction, the D2 direction, and the D3 direction relative to the frame of the toner bottle unit 900. In addition, the first weight member 991 and the second weight member 992 each are able to rotate around any of an axis extending in the D1 direction, an axis extending in the D2 direction, and an axis extending in the D3 direction.

As shown in FIG. 46B and FIG. 46C, the ejection port 9011 has an opening portion 9011*n* that communicates with the outside of the toner bottle unit 900, a first accommodation portion 9011*h*1, a second accommodation portion 9011*h*2, and a third accommodation portion 9011*h*3. The opening portion 9011*n* and the first accommodation portion 9011*h*1, the second accommodation portion 9011*h*2, and the third accommodation portion 9011*h*3 communicate with each other and make up a flow path of toner. These accommodation portions function as accommodation portions that accommodate the weight members (991, 992) (retract space where the weight members retract) at the time when the toner bottle unit 900 ejects toner.

As shown in FIG. 46B and FIG. 46C, the second accommodation portion 9011*h*2 has a linear movement restriction surface 9011*a*2 that restricts movement of the weight member in the D1 direction, and a rolling restriction surface 9011*b*2 that restricts movement of the weight member in the D2 direction and the D3 direction. The rolling restriction surface 9011*b*2 has a circular arc shape having substantially the same diameter as the spherical diameter of the weight member and has an inner peripheral surface having a central angle greater than or equal to 180° when viewed in the direction of the arrow C1.

The third accommodation portion 9011*h*3 also has a linear movement restriction surface 9011*a*3 that restricts movement of the weight member in the D1 direction, and a rolling restriction surface 9011*b*3 that restricts movement of the weight member in the D2 direction and the D3 direction. The rolling restriction surface 9011*b*3 has a circular arc shape having substantially the same diameter as the spherical diameter of the weight member and has an inner peripheral surface having a central angle greater than or equal to 180° when viewed in the direction of the arrow C1. The linear movement restriction surface 9011*a*2 and the linear movement restriction surface 9011*a*3 are provided in the same plane in the D1 direction.

The first accommodation portion 9011*h*1 has protruded portions 9011*w* having a linear movement restriction surface 9011*a*1 that restricts movement of the weight member in the D1 direction, and a rolling restriction surface 9011*b*1 that restricts movement of the weight member in the D2 direction and the D3 direction. The rolling restriction surface 9011*b*1 has a circular arc shape having substantially the same diameter as the spherical diameter of the weight member and has an inner peripheral surface having a central angle greater than or equal to 180° when viewed in the direction of the arrow C1. Each protruded portion 9011*w* protrudes in the D2 and D3 directions so as not to close the opening portion 9011*n* when viewed in the direction of the arrow C1 (FIG. 46C). The linear movement restriction surface 9011*a*1 made up of the protruded portions 9011*w* is disposed at a position spaced apart from the opening portion 9011*n* relative to the linear movement restriction surface 9011*a*2 and the linear movement restriction surface 9011*a*3 so as not to close the opening portion 9011*n* in the D1 direction (FIG. 46B).

Each of the first weight member 991 and the second weight member 992 can be accommodated in any one of the first accommodation portion 9011*h*1, the second accommodation portion 9011*h*2, and the third accommodation portion 9011*h*3 (see FIG. 46B, and the positions during accommodation are represented by the dotted lines). In a state where each of the first weight member 991 and the second weight member 992 is accommodated in any one of the accommodation portions (9011*h*1, 9011*h*2, 9011*h*3), movement of the weight member in the second direction (D2) and the third direction (D3), other than the first direction (D1), is restricted.

With the above-described linear movement restriction surfaces (9011*a*1 to 9011*a*3) and the rolling restriction surfaces (9011*b*1 to 9011*b*3), leaving of the weight member (991, 992) once accommodated in the accommodation portion (9011*h*1 to 9011*h*3) from the accommodation portion is restricted. Therefore, even when the pressure of toner around the ejection port 9011 increases as a result of pushing the piston 902, a situation in which the weight member slips off from the accommodation portion to impede ejection of toner is prevented.

In the present embodiment, the three accommodation portions (9011*h*1, 9011*h*2, 9011*h*3) that each can accommodate at least one movable member are provided for the two movable members (991, 992). In addition, each accommodation portion is configured to communicate with the opening portion 9011*n* of the ejection port 9011. In this way, by providing the accommodation portions greater in number than the weight members, even when the weight members are accommodated in two of the three accommodation portions, the flow path of toner from the toner containing portion 9014 to the opening portion 9011*n* of the ejection port 9011 is ensured.

Flow Path During Ejection of Toner

A flow path (movement path) of toner at the time when toner is ejected from the toner bottle unit 900 will be described by way of an example of a combination of accommodation positions of the weight members 991, 992. Of FIG. 47A to FIG. 47F, FIG. 47A, FIG. 47C, and FIG. 47E are cross-sectional views around the ejection port 9011 of the toner bottle unit 900, and FIG. 47B, FIG. 47D, and FIG. 47F are views when the ejection port 9011*s* viewed in the D1 direction.

Figure 47A:
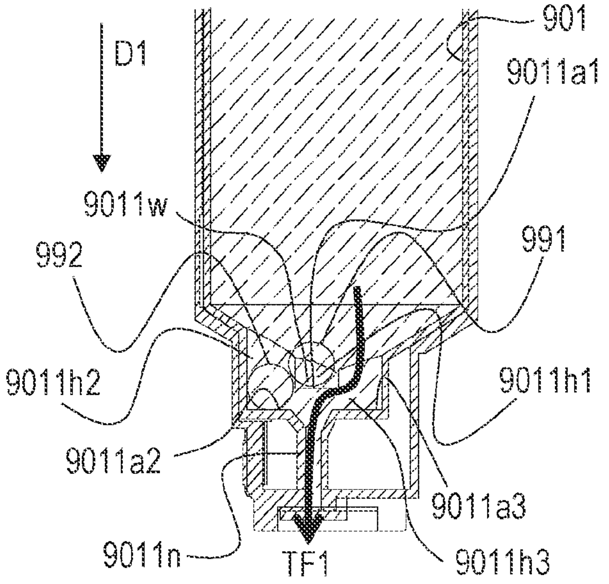
FIG. 47A to FIG. 47F are views for illustrating an accommodation portion of the toner bottle unit according to the thirteenth embodiment.
Figure 47B:
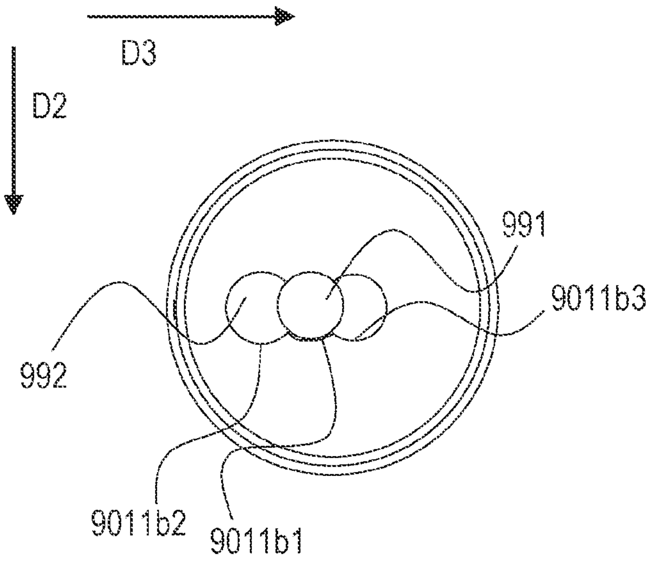

FIG. 47A and FIG. 47B show a case where the first weight member 991 is accommodated in the first accommodation portion 9011*h*1 and the second weight member 992 is accommodated in the second accommodation portion 9011*h*2. In this case, toner T1 in the inner cylinder 901 is not able to pass through the first accommodation portion 9011*h*1 and the second accommodation portion 9011*h*2; however, a movement path TF1 connecting the third accommodation portion 9011*h*3 and the opening portion 9011*n* remains. Therefore, when a user pushes the piston 902 shown in FIG. 46A in the D1 direction to apply pressure to the inside of the inner cylinder 901, the toner T1 passes through the third accommodation portion 9011*h*3 and is ejected through the opening portion 9011*n*.

Figure 47C:
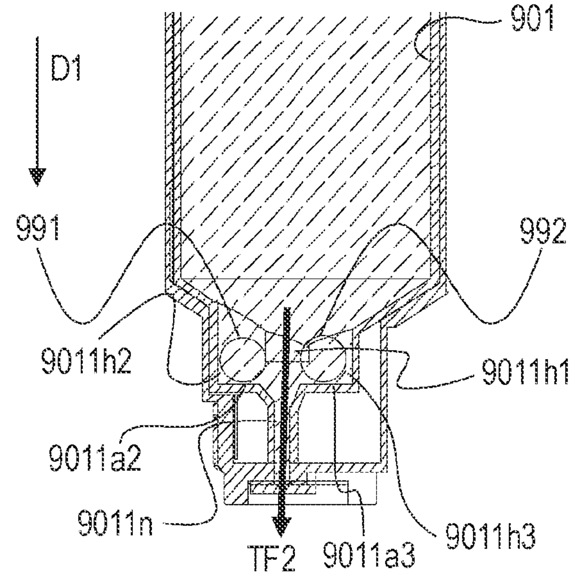
Figure 47D:
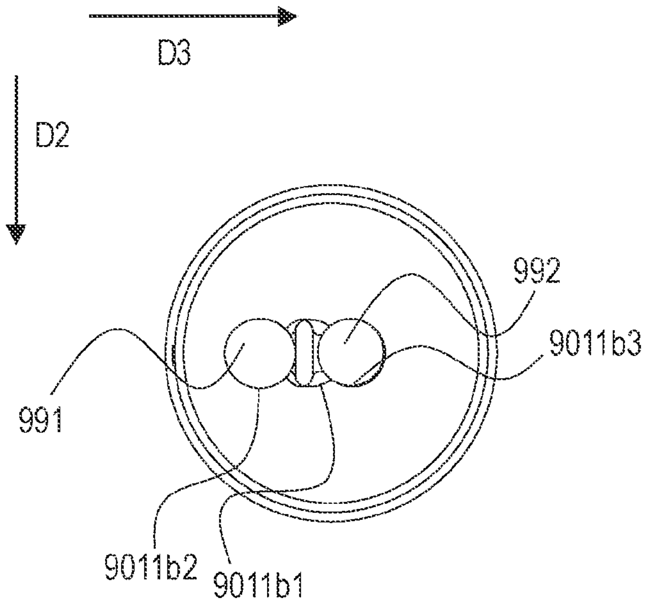

FIG. 47C and FIG. 47D show a case where the first weight member 991 is accommodated in the second accommodation portion 9011*h*2 and the second weight member 992 is accommodated in the third accommodation portion 9011*h*3. In this case, toner T1 in the inner cylinder 901 is not able to pass through the second accommodation portion 9011*h*2 and the third accommodation portion 9011*h*3; however, a movement path TF2 connecting the first accommodation portion 9011*h*1 and the opening portion 9011*n* remains. Therefore, when a user pushes the piston 902 shown in FIG. 46A in the D1 direction to apply pressure to the inside of the inner cylinder 901, the toner T1 passes through the first accommodation portion 9011*h*1 and is ejected through the opening portion 9011*n*.

Figure 47E:
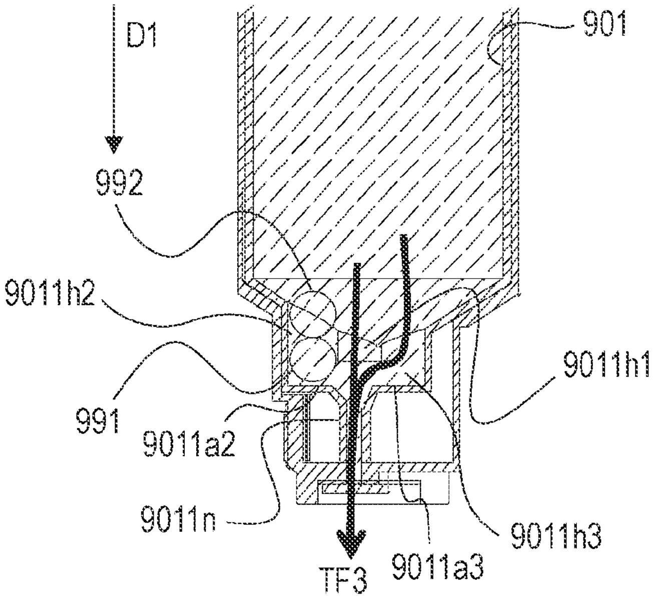
Figure 47F:
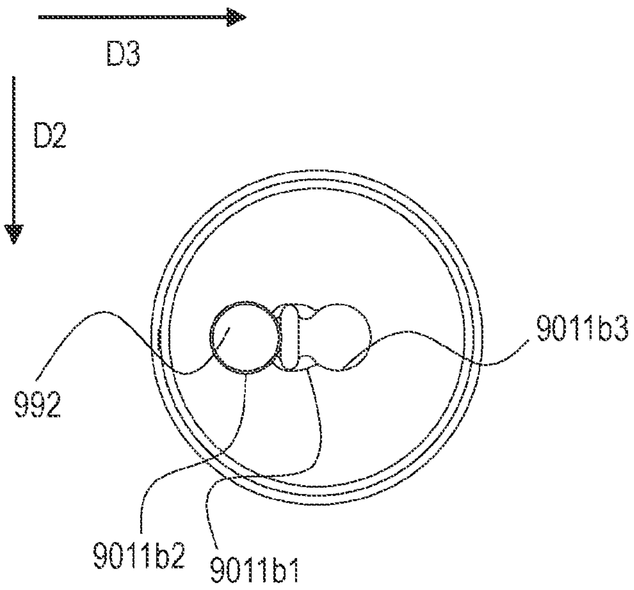

FIG. 47E and FIG. 47F show a case where the first weight member 991 and the second weight member 992 are accommodated in the second accommodation portion 9011*h*2 so as to be stacked. In this case, toner T1 in the inner cylinder 901 is not able to pass through the second accommodation portion 9011*h*2; however, a movement path TF3 connecting both the first accommodation portion 9011*h*1 and the third accommodation portion 9011*h*3 with the opening portion 9011*n* remains. Therefore, when a user pushes the piston 902 shown in FIG. 46A in the D1 direction to apply pressure to the inside of the inner cylinder 901, the toner T1 passes through the first accommodation portion 9011*h*1 or the third accommodation portion 9011*h*3 and is ejected through the opening portion 9011*n*.

In this way, by disposing the three accommodation portions for the two weight members, a toner ejection path is reliably ensured. In any case, at least one toner ejection path is ensured.

In any one of the above-described cases, the weight members (991, 992) are accommodated in the accommodation portions (9011*h*1, 9011*h*2, 9011*h*3) so as not to contact with the piston 902.

Behavior of Weight Members During Toner Supply

Next, toner supply operation at the time of supplying toner from the toner bottle unit 900 to the toner receiving unit 801 shown in FIG. 9A and FIG. 9B will be described.

Figures 48A, 48B, 48C, 48D, 48E:
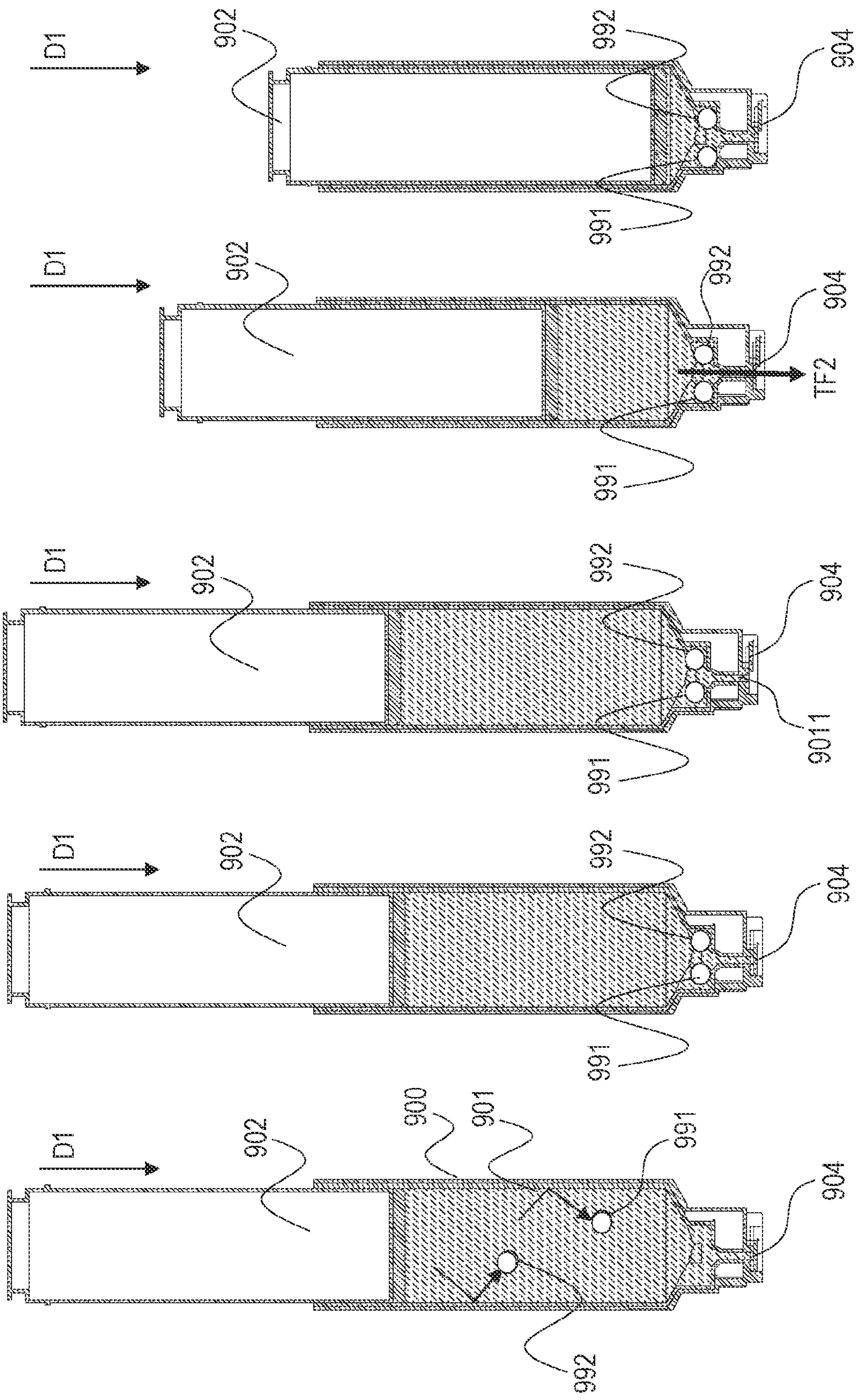
FIG. 48A to FIG. 48E are views for illustrating behaviors of weight members according to the thirteenth embodiment.

FIG. 48A is a cross-sectional view of the toner bottle unit 900 when a user is shaking the toner bottle unit 900. FIG. 48B is a cross-sectional view of the toner bottle unit 900 after the user finishes shaking the toner bottle unit 900 and just before the toner bottle unit 900 is attached to the supply container mounting portion 701 of the toner receiving unit 801. FIG. 48C is a cross-sectional view of the toner bottle unit 900 after the user attaches the toner bottle unit 900 to the supply container mounting portion 701 and rotates the toner bottle unit 900. FIG. 48D is a cross-sectional view of the toner bottle unit 900 in a state of the process of pushing the piston 902. FIG. 48E is a cross-sectional view of the toner bottle unit 900 after the piston 902 is pushed to the end.

As shown in FIG. 48A, when the user shakes the toner bottle unit 900, the first weight member 991 and the second weight member 992 freely move around inside the inner cylinder 901 due to user's shaking operation and repeatedly contact with toner to loosen agglomerated toner. At this time, the first weight member 991 and the second weight member 992 are able to move so as to contact with the inner wall of the inner cylinder 901 or the piston 902.

After sufficiently shaking the toner bottle unit 900, the user determines the position of the toner bottle unit 900 such that the shutter member 904 is faced downward in the vertical direction as shown in FIG. 48B. Then, the first weight member 991 and the second weight member 992 each fall in the gravitational direction and each are accommodated in any one of the accommodation portions (9011*h*1, 9011*h*2, 9011*h*3).

Subsequently, as shown in FIG. 48C, when the user mounts the toner bottle unit 900 on the supply container mounting portion 701 of the toner receiving unit 801 and rotates the toner bottle unit 900 by a predetermined angle, the shutter member 904 opens as described above. Thus, the ejection port 9011 communicates with the supply port 8012 of the supply container mounting portion 701. Then, as shown in FIG. 48D, when the user starts pushing the piston 902, toner moves to the opening portion 9011*n* via the accommodation portion (the first accommodation portion 9011*h*1 in the illustrated example) not occupied by the weight members 991, 992 and is ejected through the opening portion 9011*n*.

When the user mounts the toner bottle unit 900 on the supply container mounting portion 701 of the toner receiving unit 801, the weight members (991, 992) may be in a state of being floated in toner. In this case as well, after the start of pushing the piston 902, the weight members move together with toner and are accommodated in the accommodation portions. Therefore, regardless of the timing at which the weight members are accommodated in the accommodation portions, toner is smoothly ejected.

As shown in FIG. 48E, after pushing the piston 902 to the end and finishing ejection of toner, the user rotates the toner bottle unit 900 by the predetermined angle. Thus, the shutter member 904 closes, and communication between the ejection port 9011 and the supply port 8012 is interrupted. After that, the user pulls out the toner bottle unit 900 from the supply container mounting portion 701 and detaches the toner bottle unit 900 from the image forming apparatus 1, with the result that toner supply operation completes.

As described above, according to the present embodiment, it is possible to effectively loosen toner in the toner bottle unit 900 with the plurality of movable members.

In the present embodiment, the first weight member 991 and the second weight member 992 that are examples of the movable members are metal spheres having the same shape; however, the configuration is not limited thereto. Alternatively, the first weight member 991 and the second weight member 992 may be, for example, a combination of different sizes, different shapes, different specific gravities, different materials, or the like. At least part of the movable members may be made of a resin material, or the movable members may be, for example, formed by coating the surfaces of metal spheres with a resin. To penetrate in between particles of toner T to agitate the toner T, the density of each of the first weight member 991 and the second weight member 992 may be higher than the density of toner. Therefore, the material of each of the first weight member 991 and the second weight member 992 may be a metal. The first weight member 991 and the second weight member 992 contact with toner T1, so the material of each of the first weight member 991 and the second weight member 992 may be a rustproof material. For example, stainless steel, brass, lead, or the like may be used. Rustproofing (for example, resin coating or rustproof plating) may be applied to the first weight member 991 and the second weight member 992.

In the present embodiment, the first weight member 991 and the second weight member 992 each are freely movable in the first direction (D1), the second direction (D2), and the third direction (D3) inside the inner cylinder 901; however, as long as the first weight member 991 and the second weight member 992 are able to contact with toner to loosen the toner, movement of each of the first weight member 991 and the second weight member 992 may be limited in a specific direction.

Image Forming System

The supply container including the configuration described in the present embodiment may be combined with the image forming apparatus including the configuration described in any one of the eighth to twelfth embodiments. In other words, in the eighth to twelfth embodiments, air outlet performance is improved by providing the plurality of ventilation portions in the frame of the process cartridge, so it is possible to stably discharge air even with an increase in the capacity of the supply container. According to the thirteenth embodiment, the plurality of movable members is disposed inside the supply container, so it is possible to further reliably prevent agglomeration of toner even with an increase in the amount of toner contained in the supply container. By combining these configurations, it is possible to provide a highly-convenient image forming system that eliminates inconvenience due to an increase in capacity while reducing the frequency of toner supply by increasing the capacity of the supply container.

According to the embodiments of the present disclosure, a cartridge, a supply container, and an image forming apparatus are provided.

The configurations described in the embodiments may be combined where appropriate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge configured to be attachable to a main body of an image forming apparatus and configured to receive toner supplied from a supply container, the cartridge comprising:

- a supply port configured to receive the toner supplied from the supply container;
- a shutter member configured to be movable between a first position and a second position, the supply port being covered with the shutter member when the shutter member is located at the first position, the supply port being exposed when the shutter member is located at the second position; and
- a locking member configured to be movable between a lock position and an unlock position, movement of the shutter member from the first position to the second position being restricted when the locking member is located at the lock position, movement of the shutter member from the first position to the second position being allowed when the locking member is located at the unlock position; and
- a frame covering the locking member so that the locking member is not accessible from an outside of the cartridge, wherein

- the locking member is moved from the lock position to the unlock position by using electric power supplied from the main body.

2. The cartridge according to claim 1, wherein, when no electric power is supplied from the main body, the locking member is located at the lock position.

3. The cartridge according to claim 2, further comprising:

- a receiving portion used to receive electric power from the main body; and
- a coil portion electrically connected to the receiving portion, wherein
- the locking member is configured to, when electric power is supplied from the main body to the receiving portion, move from the lock position to the unlock position by magnetic force generated by the coil portion.

4. The cartridge according to claim 1, further comprising an urging member configured to urge the locking member from the unlock position toward the lock position.

5. The cartridge according to claim 1, wherein the frame covers the locking member so that the locking member is not exposed to an outside of the cartridge.

6. The cartridge according to claim 5, further comprising:

- a receiving portion configured to receive the electric power,
- wherein the receiving portion is exposed to the outside of the cartridge from the frame.

7. The cartridge according to claim 1, further comprising:

- a mounting portion to which the supply container is attached, wherein
- the shutter member is configured to move from the first position to the second position by displacing the supply container attached to the mounting portion.

8. An image forming apparatus comprising:

- the cartridge according to claim 1; and
- the main body including a power supply and a control unit configured to control the power supply, wherein
- the control unit is configured to control the power supply such that, when an amount of toner contained in the cartridge is less than a first amount, electric power is supplied from the main body to the cartridge.

9. The image forming apparatus according to claim 8, further comprising a residual amount detection portion configured to detect the amount of toner contained in the cartridge.

10. The image forming apparatus according to claim 8, wherein

- the supply container includes a storage member in which information on an amount of toner contained in the supply container is stored, and
- the control unit is configured to, when the amount of toner contained in the supply container is greater than a second amount, control the power supply such that electric power is supplied from the main body to the cartridge.

11. The cartridge according to claim 1, wherein the locking member is located at the lock position in a state where the cartridge is detached from the main body of the image forming apparatus.

* * * * *